US012712617B2

(12) United States Patent
Lin et al.

(10) Patent No.: US 12,712,617 B2
(45) Date of Patent: Aug. 18, 2026

(54) PRIORITY OF CHANNEL STATE INFORMATION REPORT

(71) Applicant: Ofinno, LLC, Reston, VA (US)

(72) Inventors: Huifa Lin, Reston, VA (US); Hyoungsuk Jeon, Centreville, VA (US); Esmael Hejazi Dinan, McLean, VA (US); Ali Cagatay Cirik, Chantilly, VA (US); Hua Zhou, Vienna, VA (US); Yuan Zhu, Cupertino, CA (US); Mohammad Ghadir Khoshkholgh Dashtaki, Reston, VA (US); Yunjung Yi, Vienna, VA (US); Kyungmin Park, Vienna, VA (US); Taehun Kim, Fairfax, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/532,712

(22) Filed: Feb. 6, 2026

(65) Prior Publication Data

US 2026/0230143 A1 Aug. 6, 2026

Related U.S. Application Data

(60) Provisional application No. 63/754,898, filed on Feb. 6, 2025.

(51) Int. Cl.
*H04B 17/373* (2015.01)
*H04B 7/06* (2006.01)
(Continued)

(52) U.S. Cl.
CPC ......... *H04B 7/0626* (2013.01); *H04B 17/328* (2023.05); *H04B 17/346* (2023.05); *H04B 17/3913* (2015.01); *H04W 76/20* (2018.02)

(58) Field of Classification Search
CPC .. H04B 7/0626; H04B 17/328; H04B 17/346; H04B 17/3913; H04W 76/20
See application file for complete search history.

(56) References Cited

U.S. PATENT DOCUMENTS

| | | | | |
|---|---|---|---|---|
| 12,356,227 | B2 * | 7/2025 | Rahman | H04L 5/0048 |
| 2025/0386231 | A1 * | 12/2025 | Li | H04W 24/02 |

FOREIGN PATENT DOCUMENTS

| | | | |
|---|---|---|---|
| WO | 2023206114 | A1 | 11/2023 |
| WO | 2024072301 | A1 | 4/2024 |

(Continued)

OTHER PUBLICATIONS

CMCC (Discussion on specification support for beam management, R1-2409499, Nov. 22, 2024) .*

(Continued)

*Primary Examiner* — Lakeram Jangbahadur
(74) *Attorney, Agent, or Firm* — Brett K. Gardner; Kavon Nasabzadeh; Jacob L. Mangan

(57) ABSTRACT

A wireless device determines a priority value of a first channel state information (CSI) report, using: a first parameter having a value of zero based on the first CSI report being initiated by the wireless device; a second parameter, associated with a report quantity of the first CSI report, having a value of zero based on the first CSI report comprising a predicted layer 1 reference signal received power (L1-RSRP); a third parameter that is an index of a serving cell; and a fourth parameter that is a configuration identifier of the first CSI report. The wireless device transmits the first CSI report based on: the priority value being smaller than a second priority value of a second CSI report; and a transmission, via a first resource, of the first CSI report overlapping in time with a transmission, via a second resource, of the second CSI report.

20 Claims, 34 Drawing Sheets

(51) Int. Cl.

| | |
|---|---|
| ***H04B 17/309*** | (2015.01) |
| ***H04B 17/318*** | (2015.01) |
| ***H04B 17/391*** | (2015.01) |
| ***H04W 76/20*** | (2018.01) |

(56) References Cited

FOREIGN PATENT DOCUMENTS

WO 2024169757 A1 8/2024
WO 2024172403 A1 8/2024

OTHER PUBLICATIONS

3GPP TS 38.212 V18.5.0 (Dec. 2024); Technical Specification; 3rd Generation Partnership Project; Technical Specification Group Radio Access Network; NR; Multiplexing and channel coding; (Release 18).
3GPP TS 38.213 V18.5.0 (Dec. 2024); Technical Specification; 3rd Generation Partnership Project; Technical Specification Group Radio Access Network; NR; Physical layer procedures for control; (Release 18).
3GPP TS 38.214 V18.5.0 (Dec. 2024); Technical Specification; 3rd Generation Partnership Project; Technical Specification Group Radio Access Network; NR; Physical layer procedures for data; (Release 18).
3GPP TS 38.331 V18.4.0 (Dec. 2024); Technical Specification; 3rd Generation Partnership Project; Technical Specification Group Radio Access Network; NR; Radio Resource Control (RRC) protocol specification; (Release 18).
R1-2409395; 3GPP TSG-RAN WG1 Meeting #119; Orlando, US, Nov. 18-22, 2024; Agenda Item: 9.1.1; Source: Huawei, HiSilicon; Title: Discussion on AI/ML for beam management; Document for: Discussion and Decision.
R1-2409447; 3GPP TSG RAN WG1 #118bis; Orlando, US, Nov. 18-22, 2024; Source: Quectel; Title: Discussion on AI/ML for Beam Management; Agenda item: 9.1.1; Document for: Discussion.
R1-2409455; 3GPP TSG RAN WG1 #119; Orlando, USA, Nov. 18-22, 2024; Agenda Item:9.1.1; Source: InterDigital, Inc.; Title: Discussion on AI/ML for beam management; Document for: Discussion and Decision.
R1-2409479; 3GPP TSG RAN WG1 #119; Orlando, US, Nov. 18-22, 2024; Agenda item: 9.1.1; Title: Discussion on AI/ML-based beam management; Source: ZTE Corporation, Sanechips; Document for: Discussion and Decision.
R1-2409499; 3GPP TSG RAN WG1 #119; Orlando, US, Nov. 18-22, 2024; Source: CMCC; Title: Discussion on specification support for beam management; Agenda item: 9.1.1; Document for: Discussion & Decision.
R1-2409569; 3GPP TSG RAN WG1 #119; Orlando, United States, Nov. 18-22, 2024; Source: Kyocera; Title: Specification Support for AI/ML for Beam Management; Agenda item: 9.1.1; Document for: Discussion and Decision.
R1-2409581; 3GPP TSG RAN WG1 #119; Orlando, US, Nov. 18-22, 2024; Agenda item: 9.1.1; Source: Samsung; Title: Discussion for supporting AI/ML based beam management; Document for: Discussion and Decision.
R1-2409625; 3GPP TSG RAN WG1 #119; Orlando, US, Nov. 18-22, 2024; Agenda Item: 9.1.1; Source: Spreadtrum, UNISOC; Title: Discussion on AIML for beam management; Document for: Discussion and decision.
R1-2409668; 3GPP TSG RAN WG1 #119; Orlando, US, Nov. 18-22, 2024; Source: vivo; Title: Specification support for beam management; Agenda Item: 9.1.1; Document for: Discussion and Decision.
R1-2409741; 3GPP TSG RAN WG1 #119; Orlando, USA, Nov. 18-22, 2024; Source: Intel Corporation; Title: Specification support for beam management; Agenda item: 9.1.1; Document for: Discussion and Decision.
R1-2409780; 3GPP TSG-RAN WG1 Meeting #119; Orlando, USA, Nov. 18-Nov. 22, 2024; Agenda Item: 9.1.1; Source: NVIDIA; Title: Specification support for AI-enabled beam management; Document for: Discussion.
R1-2409787; 3GPP TSG-RAN WG1 Meeting #119; Orlando, US, Nov. 18-22, 2024; Agenda Item: 9.1.1; Source: Apple Inc.; Title: Discussion on AI/ML-based beam management; Document for: Discussion/Decision.
R1-2409840; 3GPP TSG RAN WG1 Meeting #119; Orlando, US, Nov. 18-22, 2024; Source: Ruijie Networks; Title: Discussion on specification support for beam management; Agenda Item: 9.1.1; Document for: Discussion and decision.
R1-2409855; 3GPP TSG RAN WG1 #119; Orlando, US, Nov. 18-22, 2024; ; Agenda item: 9.1.1; Source: NEC; Title: Discussion on specification support for beam management; Document for: Discussion and Decision.
R1-2409877; 3GPP TSG RAN WG1 119; Orlando, US, Nov. 18-22, 2024; Agenda Item: 9.1.1; Source: Xiaomi; Title: Discussion on AI/ML for beam management; Document for: Discussion and Decision.
R1-2409925; 3GPP TSG RAN WG1 #119; Orlando, US, Nov. 18-22, 2024; Source: CATT, CBN; Title: Discussion on AI/ML-based beam management; Agenda Item: 9.1.1; Document for: Discussion and Decision.
R1-2409957; 3GPP TSG-RAN WG1 #119; Orlando, USA, Nov. 18-22, 2024; Agenda Item: 9.1.1; Source: Panasonic; Title: Discussion on specification support for beam management; Document for: Discussion.
R1-2409960; 3GPP TSG RAN WG1#119; Orlando, US, Nov. 18-22, 2024; ; Agenda Item:9.1.1; Source: Transsion Holdings; Title:Discussion on specification support for AI/ML beam management; 22-1206EP is already Alex case—FA sent Draft response we should respond as soon as possible as deadline to file is Feb. 23 and decision.
R1-2409985; 3GPP TSG-RAN WG1 Meeting #119; Orlando, USA, Nov. 18-22, 2024; Agenda item: 9.1.1; Source: Nokia; Title: AI/ML for Beam Management; Document for: Discussion and Decision.
R1-2409994; 3GPP TSG RAN WG1 #119; Orlando, US, Nov. 18-22, 2024; Agenda item: 9.1.1; Source: China Telecom; Title: Discussion on AI/ML for beam management; Document for: Discussion.
R1-2410018; 3GPP TSG RAN WG1#119; Orlando, US, Nov. 18-22, 2024; Agenda Item: 9.1.1; Source: Lenovo; Title: AI/ML specification support for beam management; Document for: Discussion.
R1-2410029; 3GPP TSG RAN WG1 Meeting #119; Orlando, US, Nov. 18-22, 2024; Agenda Item: 9.1.1; Source: Futurewei; Title: Discussion on specification support for AI/ML-based beam management; Document for: Discussion and decision.
R1-2410048; 3GPP TSG RAN WG1 Meeting #119; Orlando, US, Nov. 18-22, 2024; Source: Fujitsu; Title: Discussion on specification support on AI/ML for beam management; Agenda item: 9.1.1; Document for: Discussion and Decision.
R1-2410101; 3GPP TSG RAN WG1 #119; Orlando, US, Nov. 18-22, 2024; Source: OPPO; Title: On specification for AI/ML-based beam management; Agenda Item: 9.1.1; Document for: Discussion.
R1-2410149; 3GPP TSG RAN WG1 #119; Orlando, US, Nov. 18-22, 2024; Agenda Item: 9.1.1; Source: Google; Title: ML based Beam Management; Document for: Discussion/Decision.
R1-2410174; 3GPP TSG-RAN WG1 Meeting #119; Orlando, US, Nov. 18-22, 2024; Agenda Item: 9.1.1; Source: Honor; Title: Discussion on AI/ML for beam management; Document for: Discussion.
R1-2410193; 3GPP TSG RAN WG1 #119; Orlando, US, Nov. 18-22, 2024; Agenda item: 9.1.1; Source: LG Electronics; Title: Discussions on AI/ML for beam management; Document for: Discussion and Decision.
R1-2410204; 3GPP TSG RAN WG1 Meeting #119; Orlando, US, Nov. 18-22, 2024; Source: TCL; Title: Discussion on AI/ML beam management; Agenda Item: 9.1.1; Document for: Discussion and Decision.

(56) References Cited

OTHER PUBLICATIONS

R1-2410216; 3GPP TSG RAN WG1 #119; Orlando, US, Nov. 18-22, 2024; Agenda Item: 9.1.1; Source: Sony; Title: Discussion on specification support for beam management; Document for: Discussion/ Decision.
R1-2410255; 3GPP TSG RAN WG1 #119; Orlando, USA, Nov. 18-22, 2024; Agenda Item: 9.1.1; Source: Fraunhofer HHI, Fraunhofer IIS; Title: Specification support for beam management; Document for: Discussion & Decision.
R1-2410257; 3GPP TSG RAN WG1 #119; Orlando, US, Oct. 18-22, 2024; Agenda item: 9.1.1; Source: ETRI; Title: Discussion on specification support for beam management; Document for: Discussion.
R1-2410344; 3GPP TSG RAN WG1 #119; Orlando, US, Nov. 18-22, 2024; Agenda item: 9.1.1; Source: KT Corp.; Title: Discussion on AI/ML based beam management; Document for: Discussion and Decision.
R1-2410347; 3GPP TSG RAN WG1 #119.; Orlando, US, Nov. 18-22, 2024; Source: Meta; Title: AI/ML for Beam Management; Agenda item: 9.1.1; Document for: Discussion and Decision.
R1-2410354; 3GPP TSG-RAN WG1 Meeting #119; Orlando, US, Nov. 18-Nov. 22, 2024; Agenda Item: 9.1.1; Source: Ericsson ; Title: AI/ML for beam management; Document for: Discussion.
R1-2410359; 3GPP TSG RAN WG1 #119; Orlando, US, Nov. 18-22, 2024; Source: Sharp; Title: Discussions on specification support for beam management; Agenda Item: 9.1.1; Document for: Discussion and Decision.
R1-2410367; 3GPP TSG RAN WG1 #119; Orlando, US, Nov. 18-22, 2024; Source: CAICT; Title: Discussions on AI/ML for beam management; Agenda Item: 9.1.1; Document for: Discussion / Decision.
R1-2410376; 3GPP TSG RAN WG1 #119; Orlando, US, Nov. 18-22, 2024; Source: NTT Docomo, Inc.; Title: Discussion on AI/ML for beam management; Agenda Item: 9.1.1; Document for: Discussion and Decision.
R1-2410466; 3GPP TSG-RAN WG1 Meeting #119; Orlando, Florida, USA, Nov. 18-22, 2024; Agenda item: 9.1.1; Source: Qualcomm Incorporated; Title: Discussion on AI/ML for beam management; Document for: Discussion and Decision.
R1-2410504; 3GPP TSG RAN WG1 #119; Orland, US, Nov. 18-22, 2024; Agenda Item: 9.1.1 Specification support for beam management; Source: KDDI; Title: Specification support for beam management; Document for: Discussion and decision.
R1-2410519; 3GPP TSG RAN WG1 #119; Orlando, FL, USA, Nov. 18-22, 2024; Agenda Item: 9.1.1; Source: MediaTek Inc.; Title: Discussion on specification support for AIML-based beam management; Document for: Discussion & Decision.
R1-2410547; 3GPP TSG RAN WG1 #119; Orlando, US, Nov. 18-22, 2024; Agenda Item: 9.1.1; Source: ITL; Title: Specification support for AI/ML beam management; Document for: Discussion and decision.
R1-2410587; 3GPP TSG-RAN WG4 Meeting # 119; Orlando, US, Nov. 18-22, 2024; Agenda item: 9.1.1; Source: National Taiwan University; Title: On Associated ID for Beam Management Use Case; Document for: Approval.
3GPP TS 38.211 V18.4.0 (Sep. 2024); Technical Specification; 3rd Generation Partnership Project; Technical Specification Group Radio Access Network; NR; Physical channels and modulation; (Release 18).
Extended European Search Report mailed Jun. 30, 2026 in EP Patent Application No. 26157066.7.

* cited by examiner

100
Wireless Device 106
RAN 104
CN 102
DN(s)

150
UE 156A
UE 156B
UEs 156
Uu
Uu
gNB 160A
gNB 160B
ng-eNB 162A
ng-eNB 162B
Xn
Xn
Xn
Xn
NG-RAN 154
NG
NG
NG
NG
AMF 158A
UPF 158B
AMF/UPF 158
5G-CN 152
DN(s)

Logical Channels
Transport Channels
Physical Channels
Physical Signals

PCCH
BCCH
CCCH
DCCH
DTCH
PCH
BCH
DL-SCH
DCI
PBCH
PDSCH
PDCCH
PSS/SSS
CSI-RS
DM-RS
PT-RS
Downlink CCCH
DCCH
DTCH
UL-SCH
RACH
UCI
PUSCH
PUCCH
PRACH
DM-RS
PT-RS
SRS
Uplink 1 Frame (10 ms)

0 1 2 3 4 5 6 7 8 9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

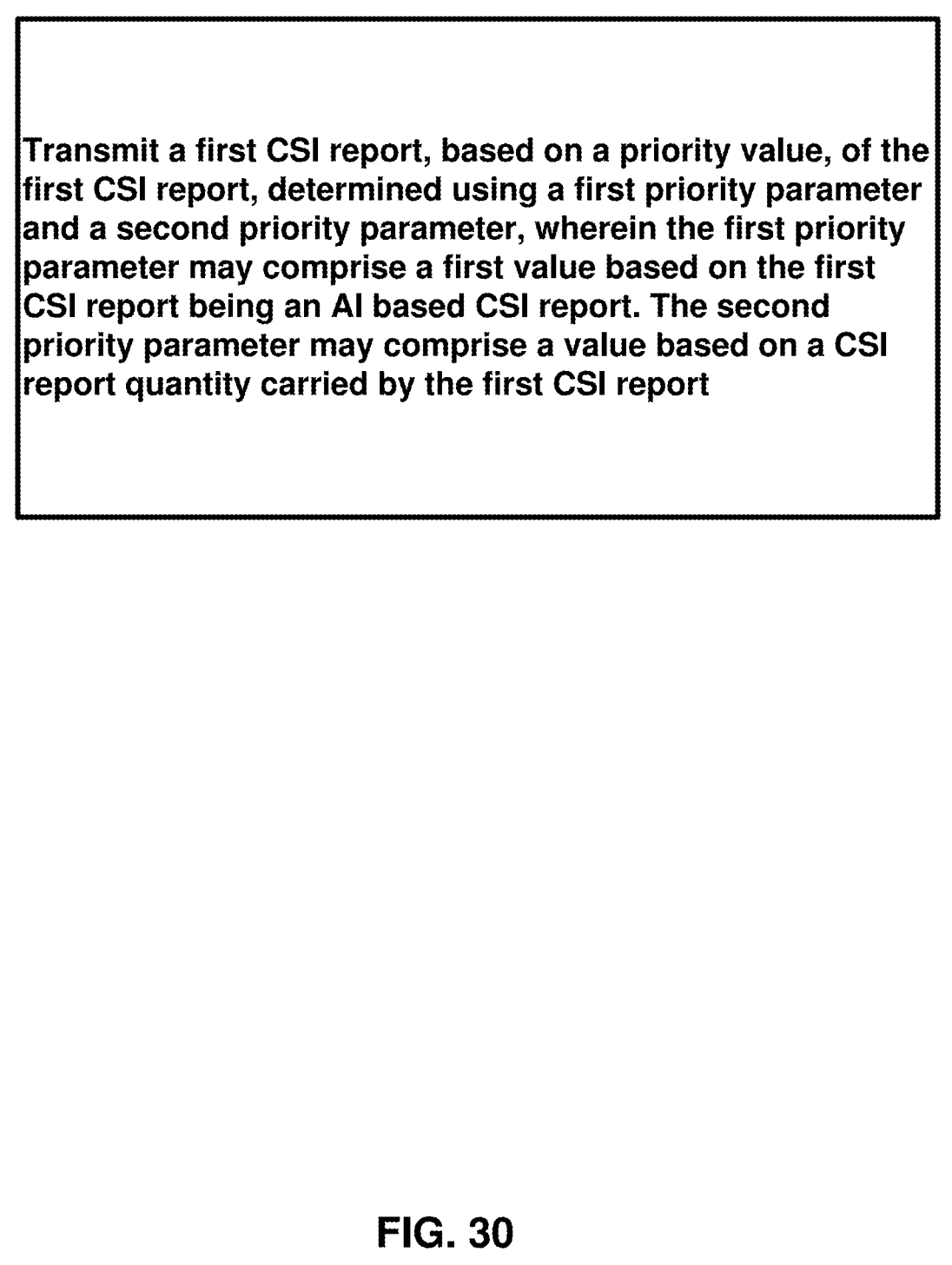

Transmit a first CSI report, based on a priority value, of the first CSI report, determined using a first priority parameter and a second priority parameter, wherein the first priority parameter may comprise a first value based on the first CSI report being an AI based CSI report. The second priority parameter may comprise a value based on a CSI report quantity carried by the first CSI report

FIG. 30

PRIORITY OF CHANNEL STATE INFORMATION REPORT

CROSS-REFERENCE TO RELATED APPLICATIONS

This application claims the benefit of U.S. Provisional Application No. 63/754,898, filed Feb. 6, 2025, which is hereby incorporated by reference in its entirety.

BRIEF DESCRIPTION OF THE DRAWINGS

Examples of several of the various embodiments of the present disclosure are described herein with reference to the drawings.

FIG. 30 illustrates an aspect of an example embodiment according to the present disclosure.

DETAILED DESCRIPTION

Figure 1A:
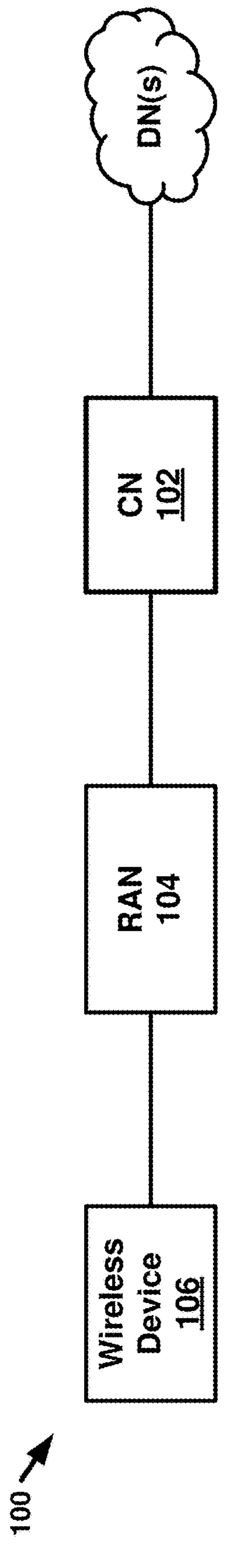
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect or implement the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
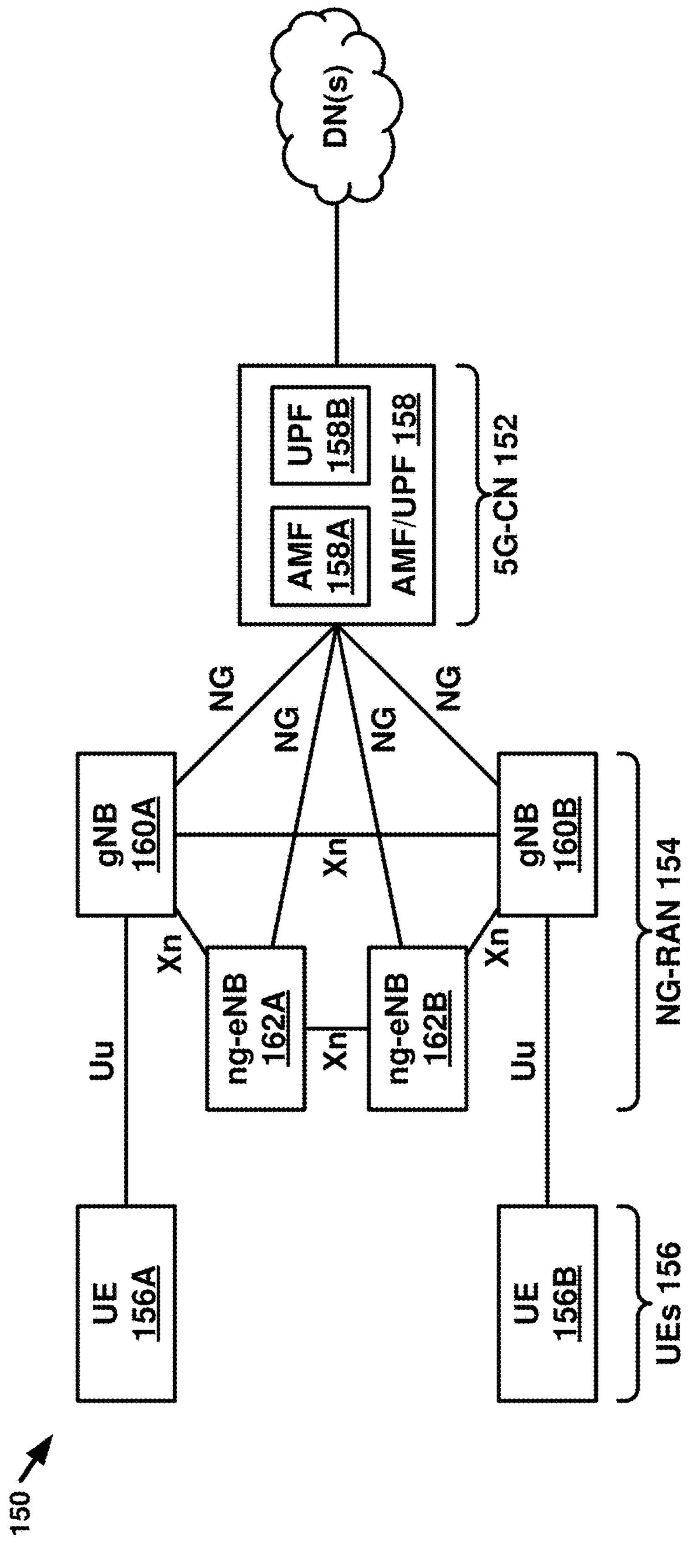

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
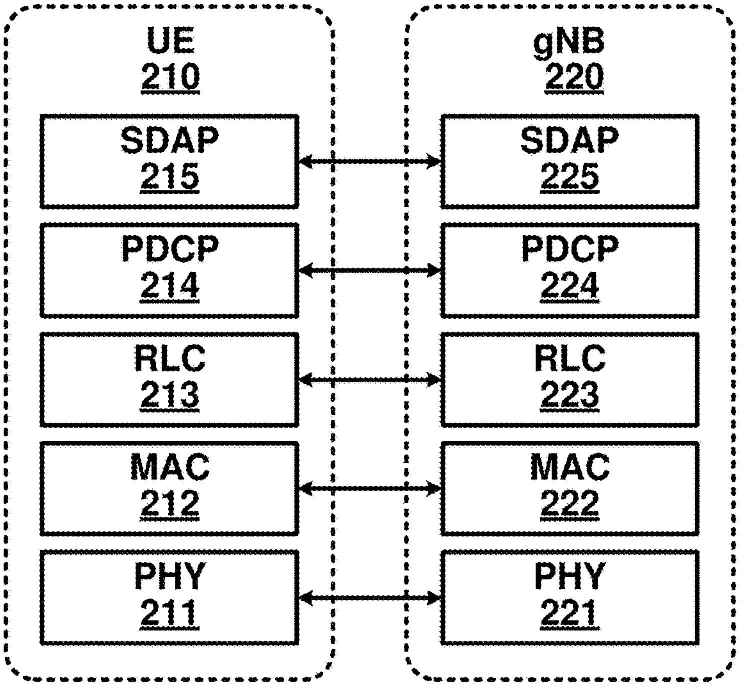
FIG. 2A and FIG. 2B respectively illustrate a New Radio (NR) user plane and control plane protocol stack.
Figure 2B:
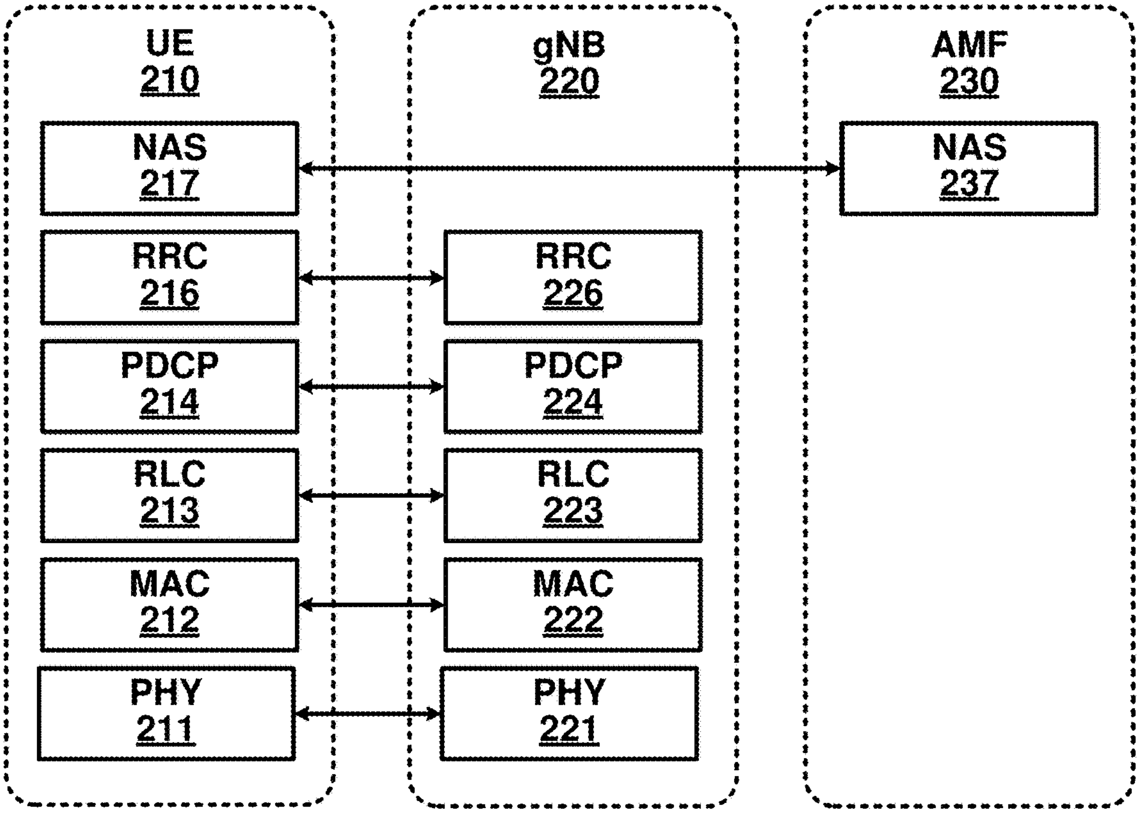

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise medium access control (MAC) layers (MACs) 212 and 222 (also referred to as media access control layers), radio link control (RLC) layers (RLCs) 213 and 223, packet data convergence protocol (PDCP) layers (PDCPs) 214 and 224, and service data application protocol (SDAP) layers (SDAPs) 215 and 225. Together, these four protocols may make up layer 2, or the data link layer, of the OSI model.

Figure 3:
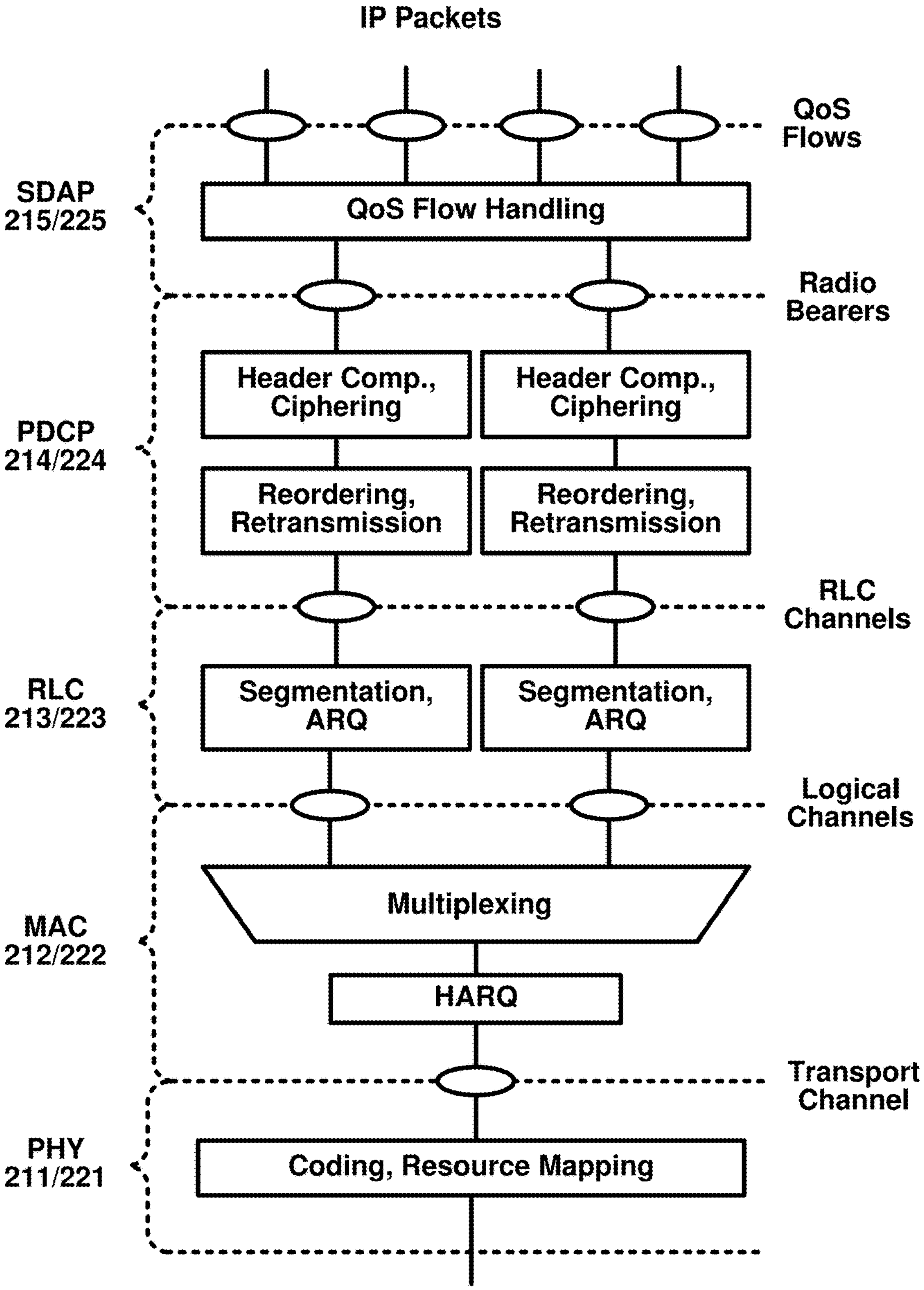
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
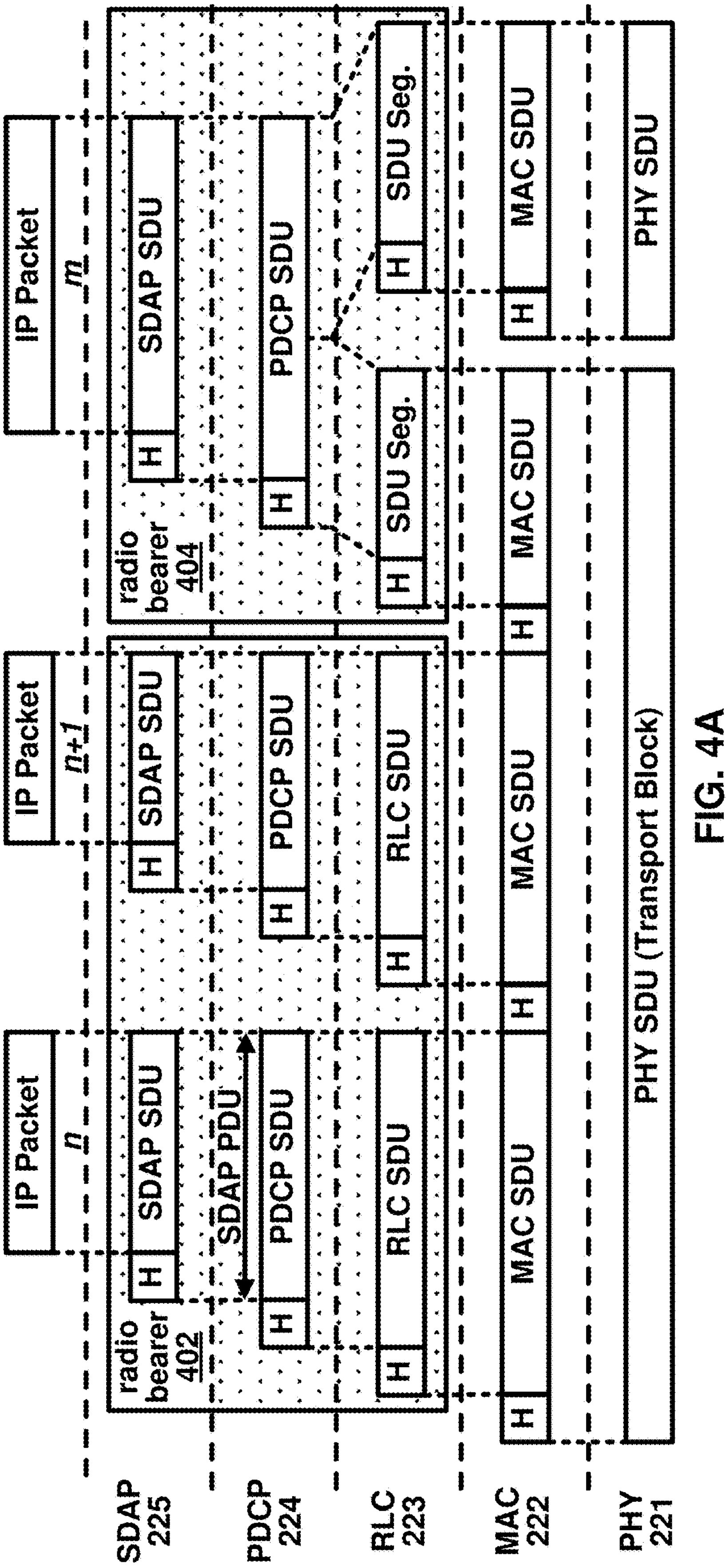
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
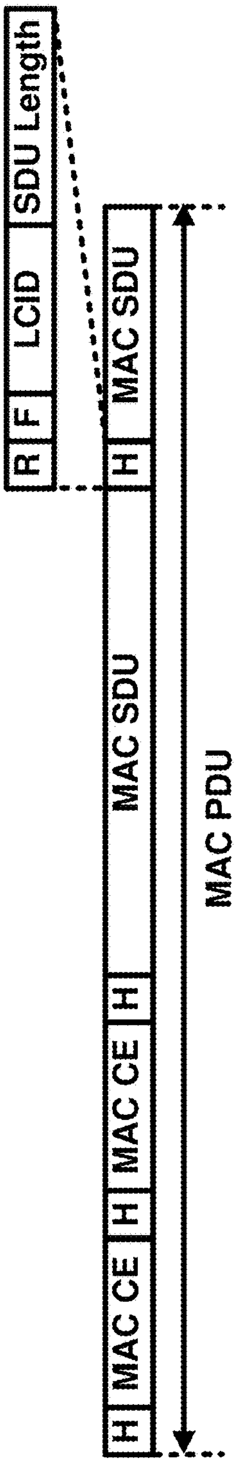
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
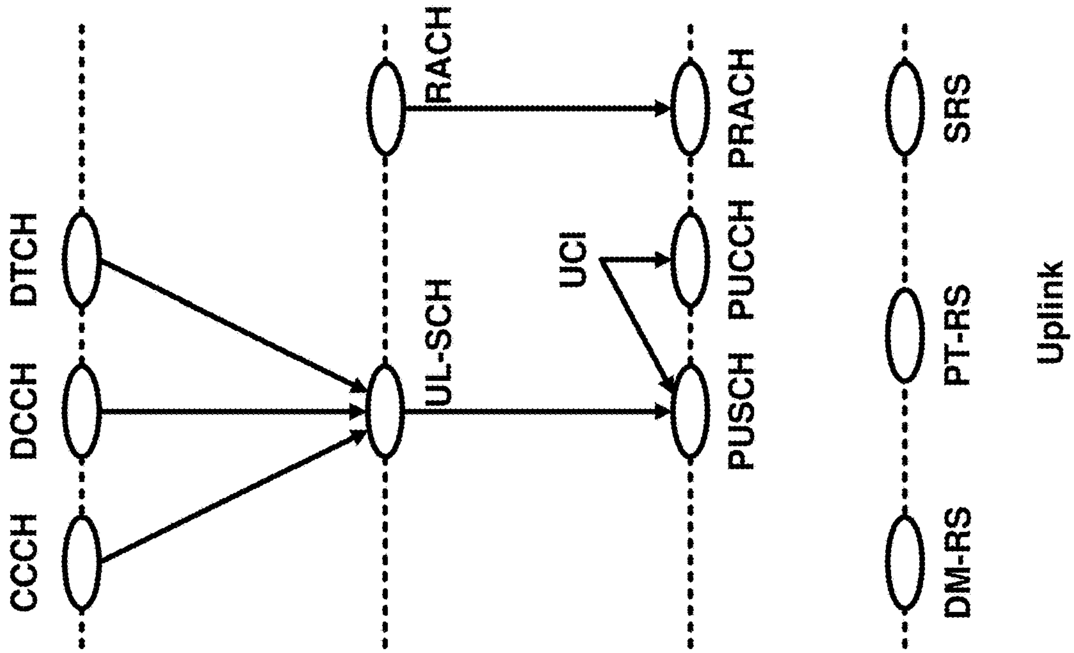
FIG. 5A and FIG. 5B respectively illustrate a mapping between logical channels, transport channels, and physical channels for the downlink and uplink.
Figure 5A:
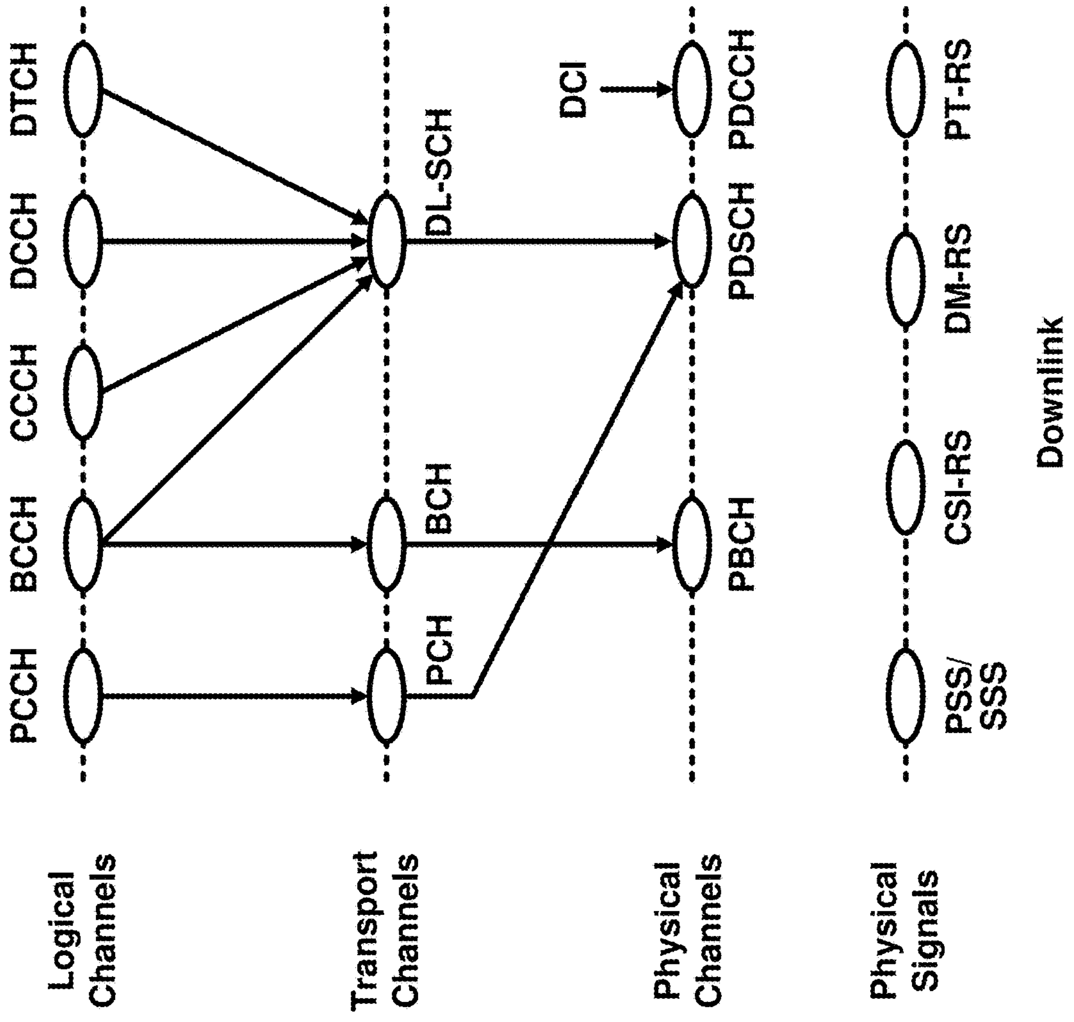

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
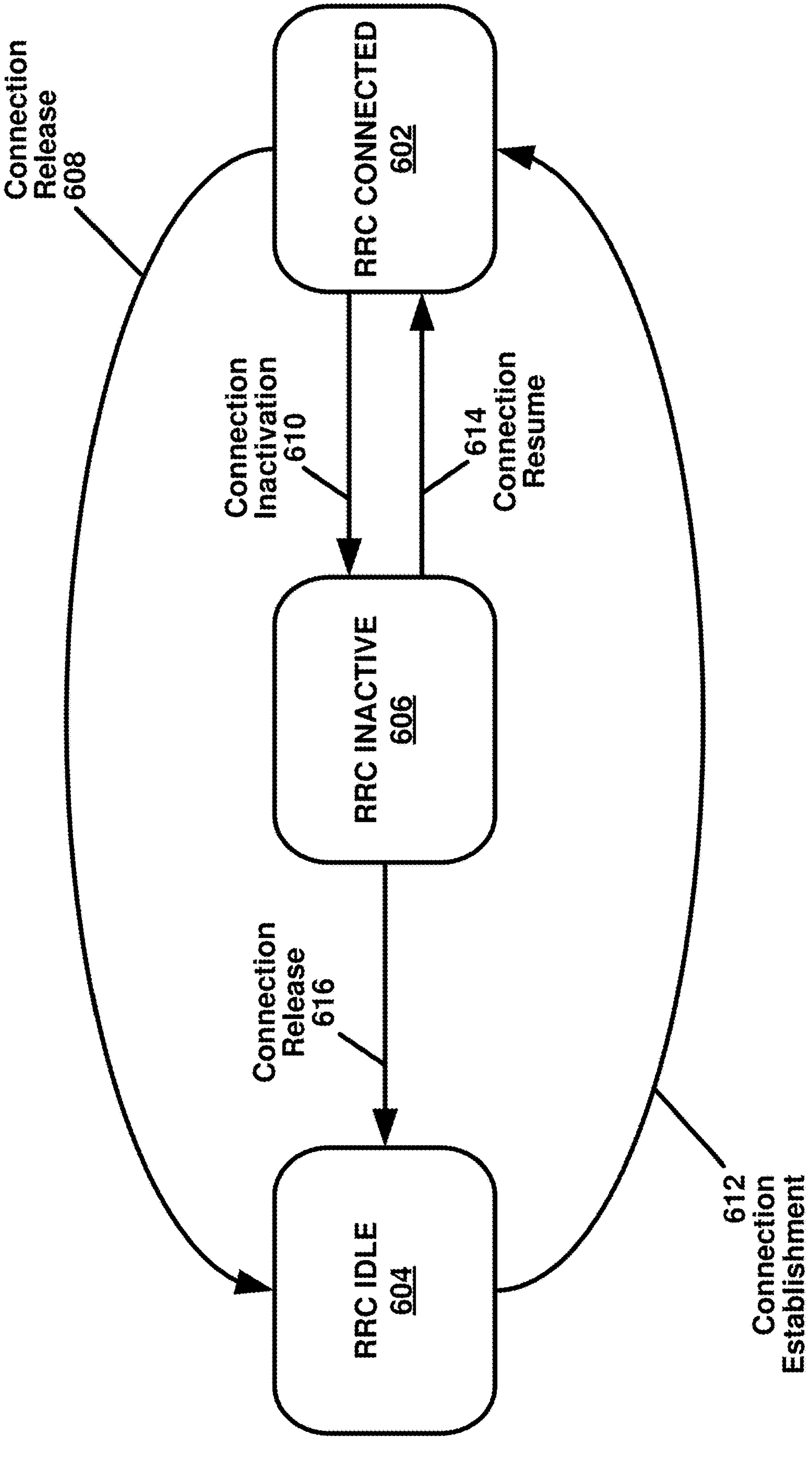
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
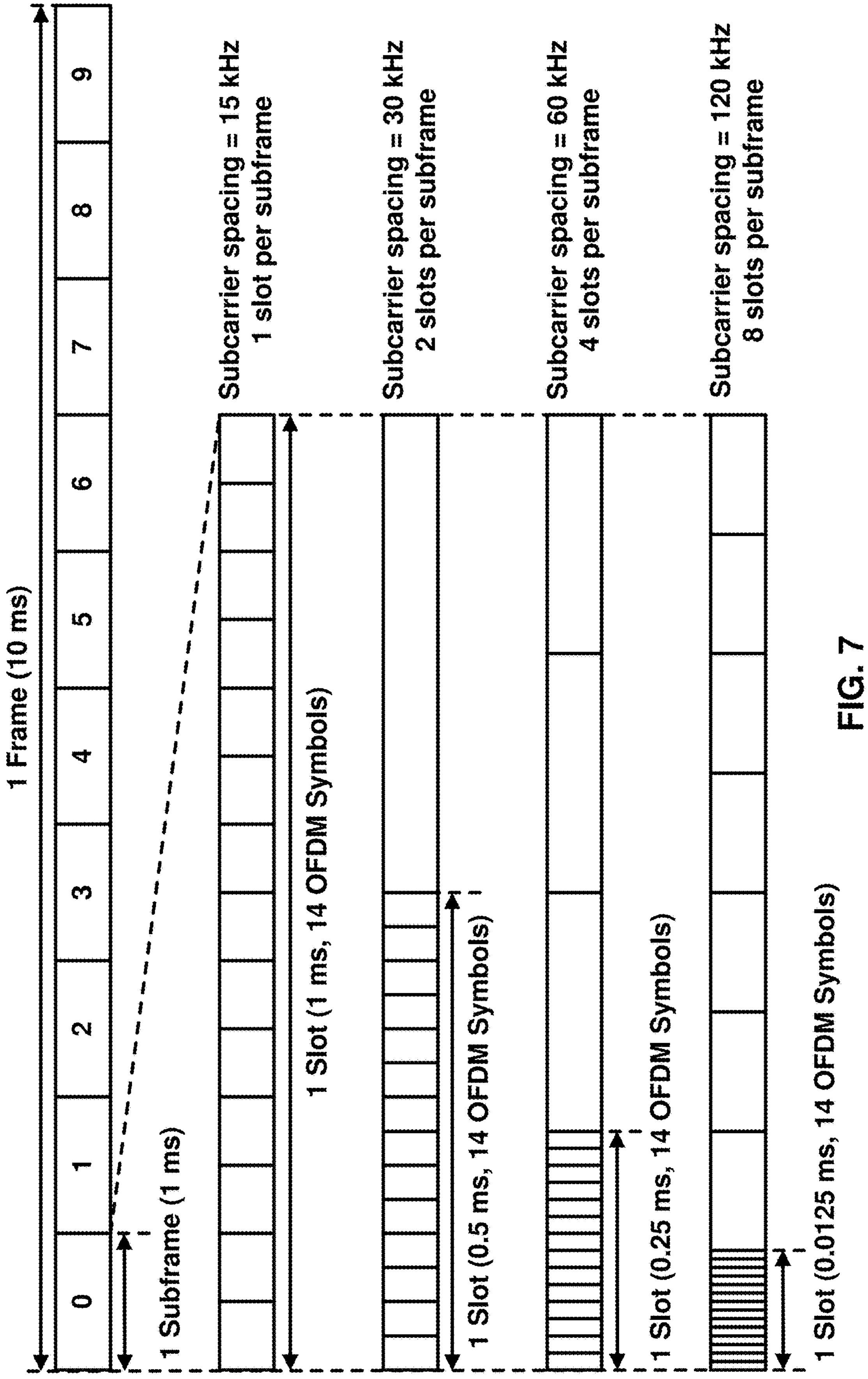
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 KHz/2.3 μs; 60 KHz/1.2 μs; 120 KHz/0.59 μs; and 240 KHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
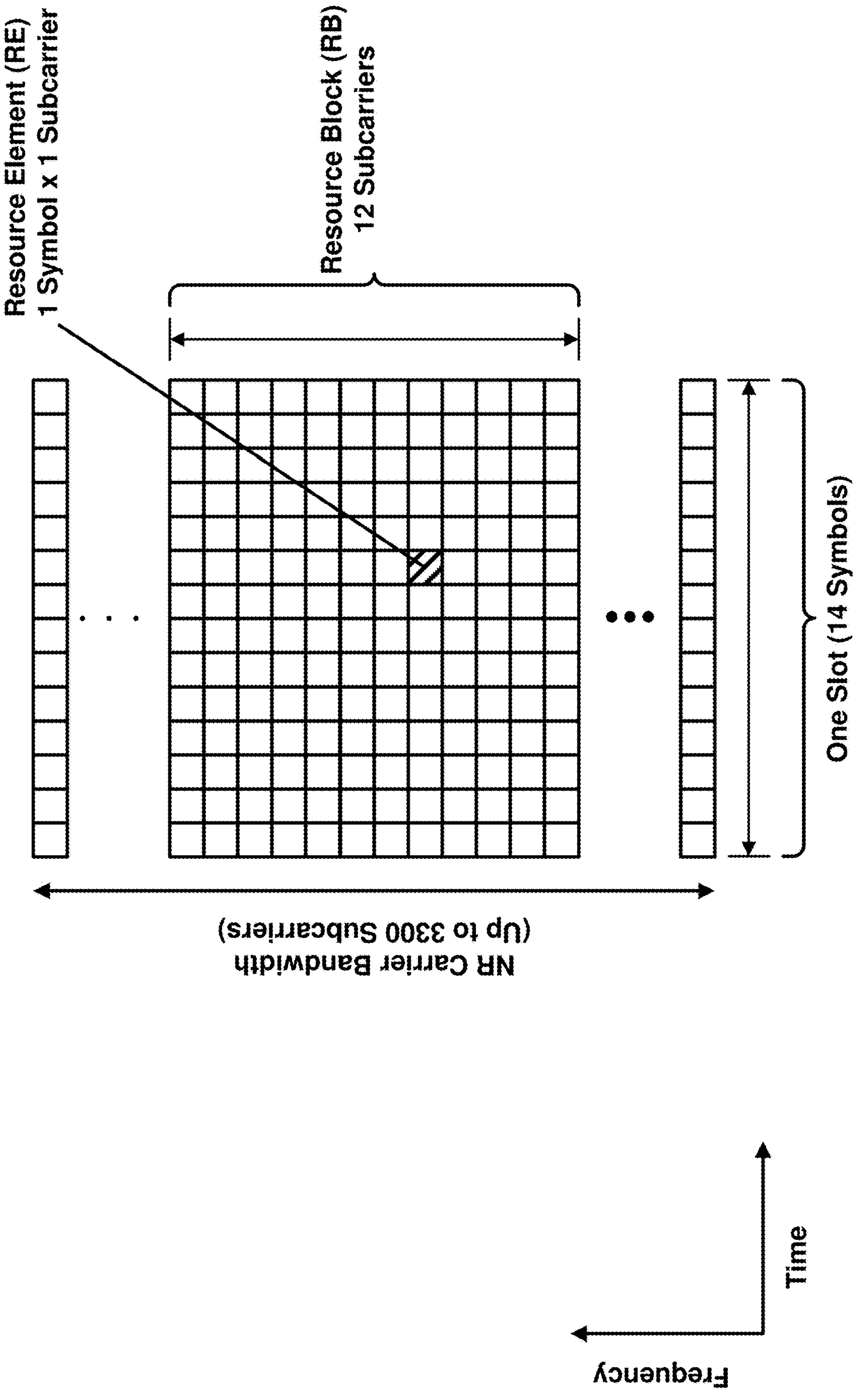
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
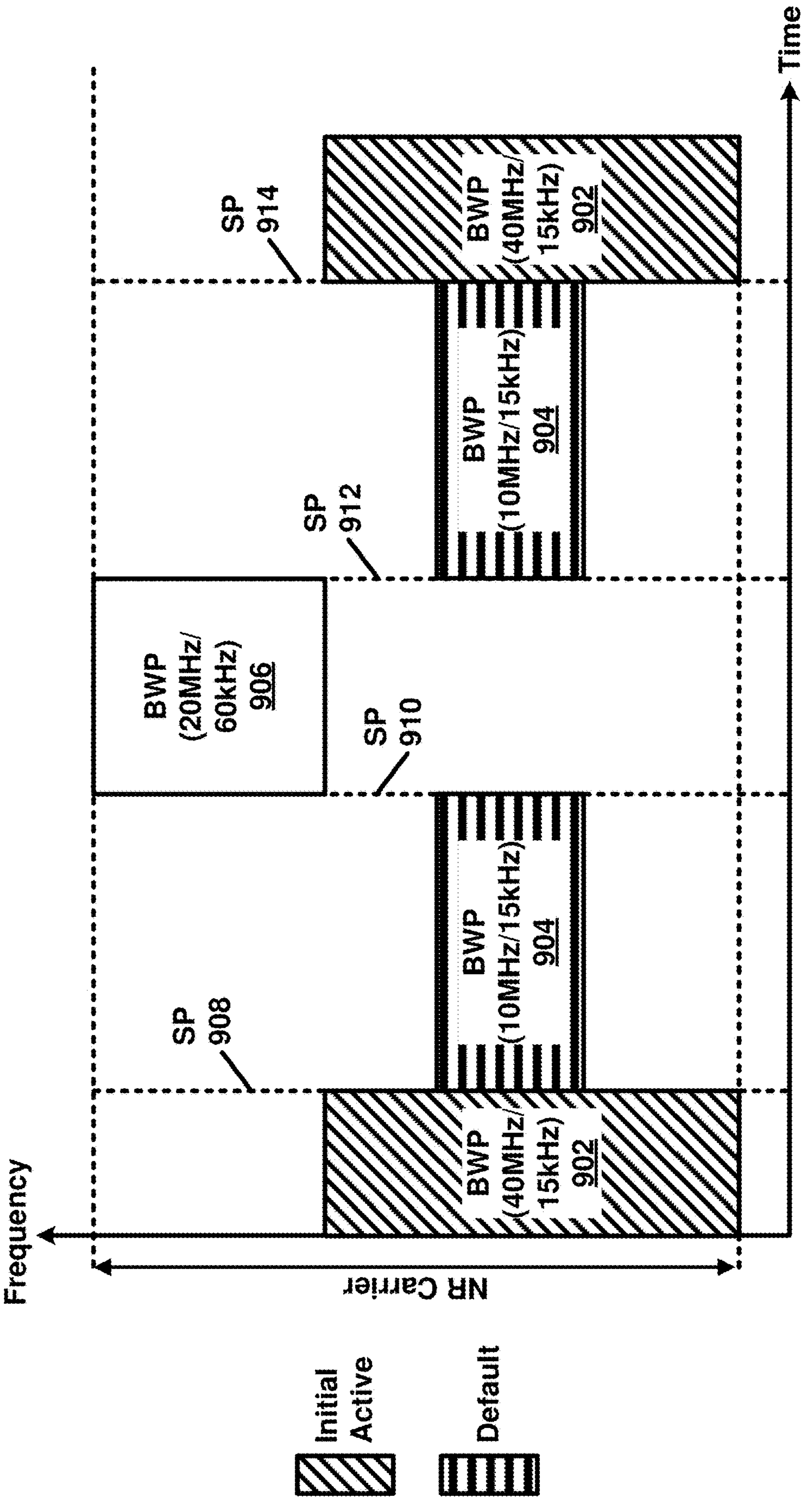
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
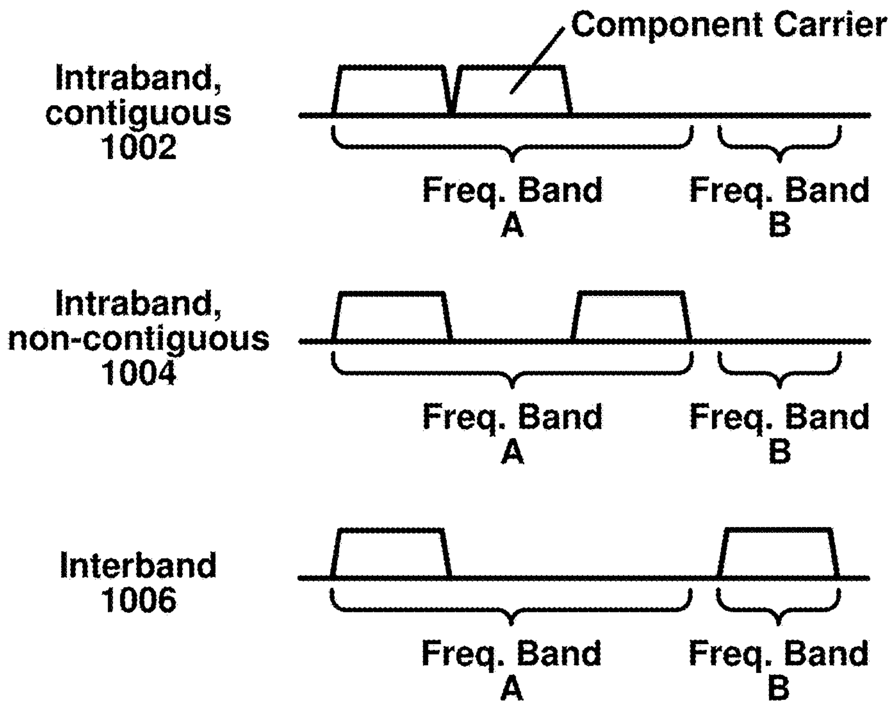
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
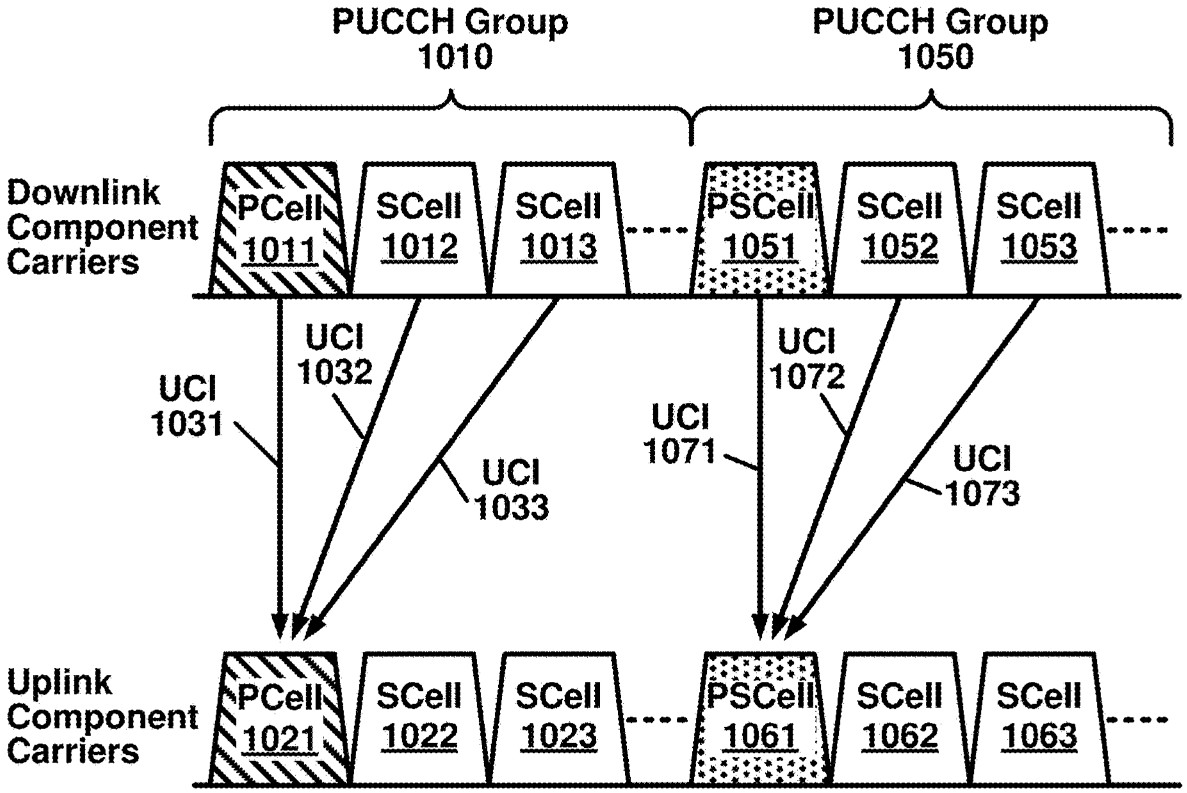
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
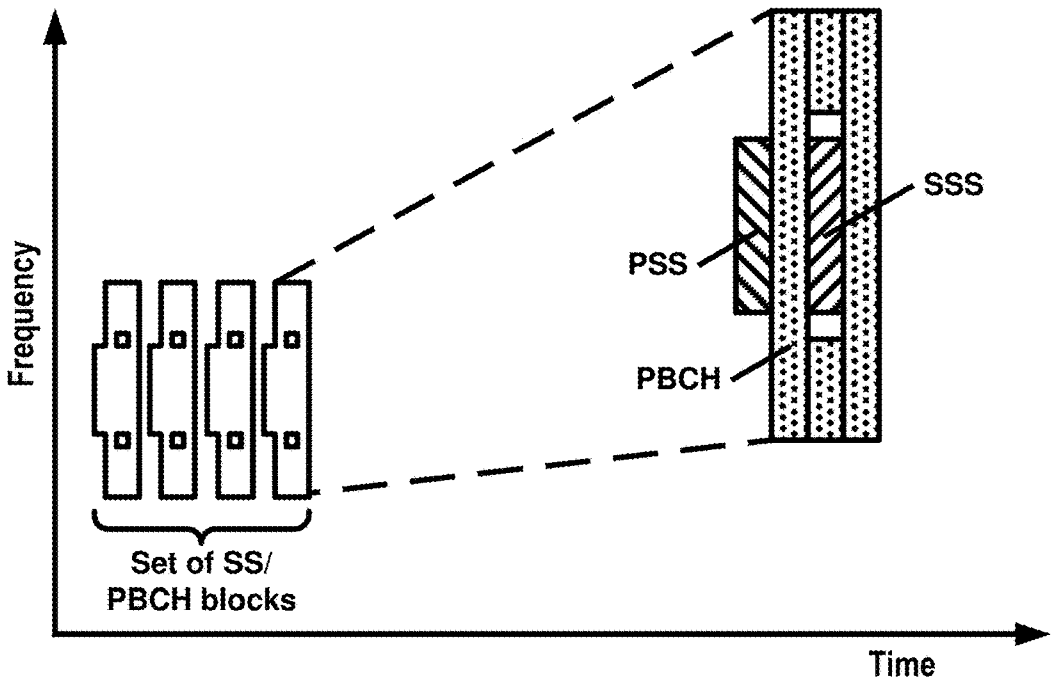
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g., a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g., maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS) and generate a beam measurement report. The UE may perform the downlink beam measurement procedure after an RRC connection is set up with a base station.

Figure 11B:
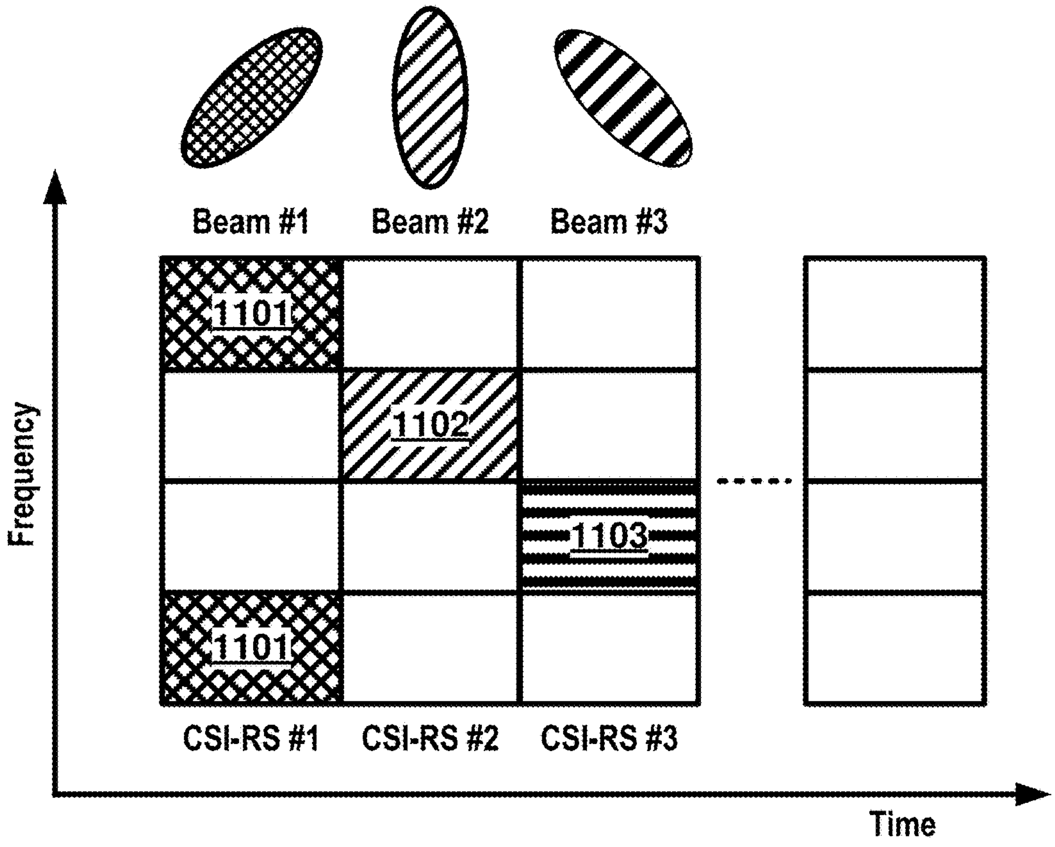
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
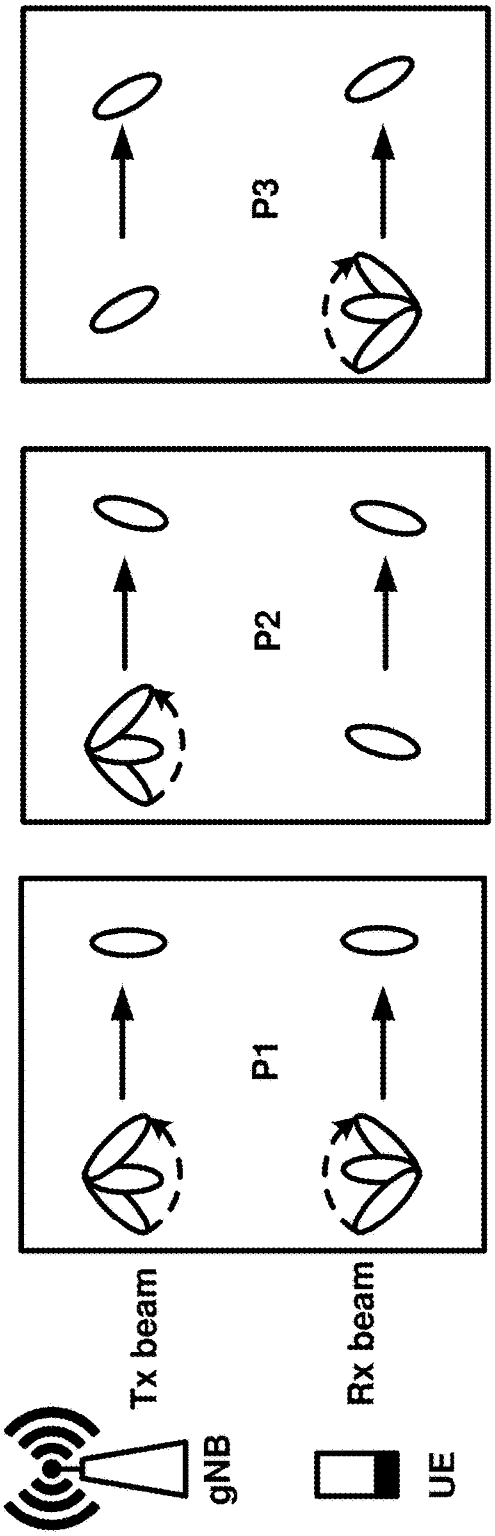
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
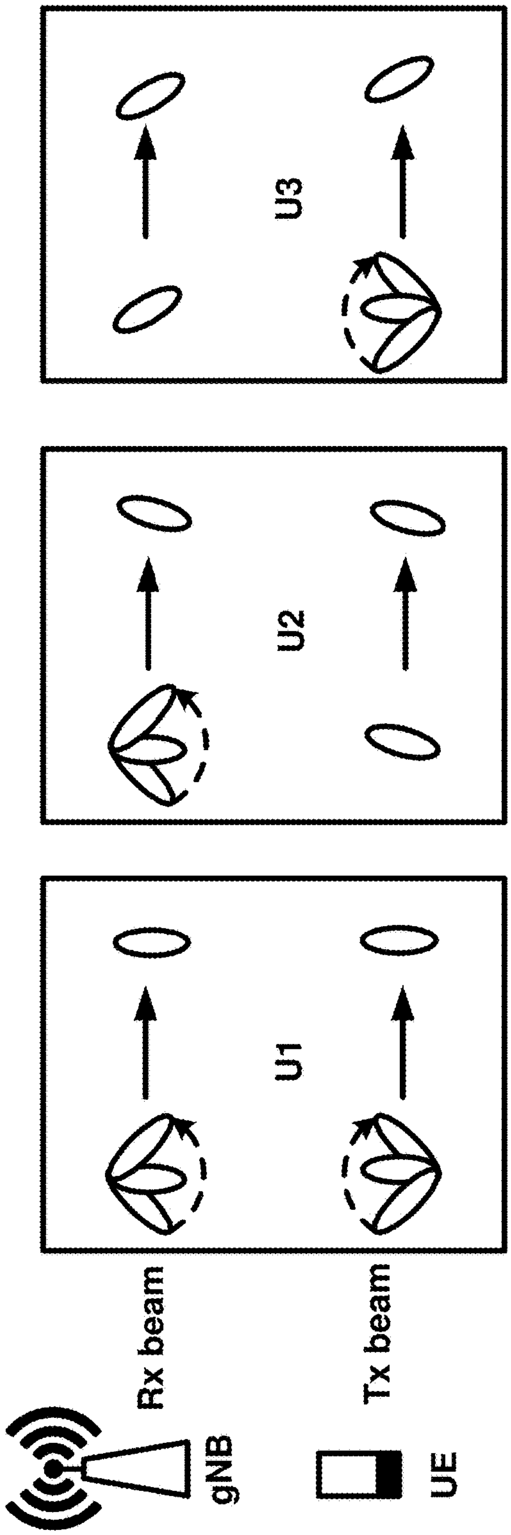

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
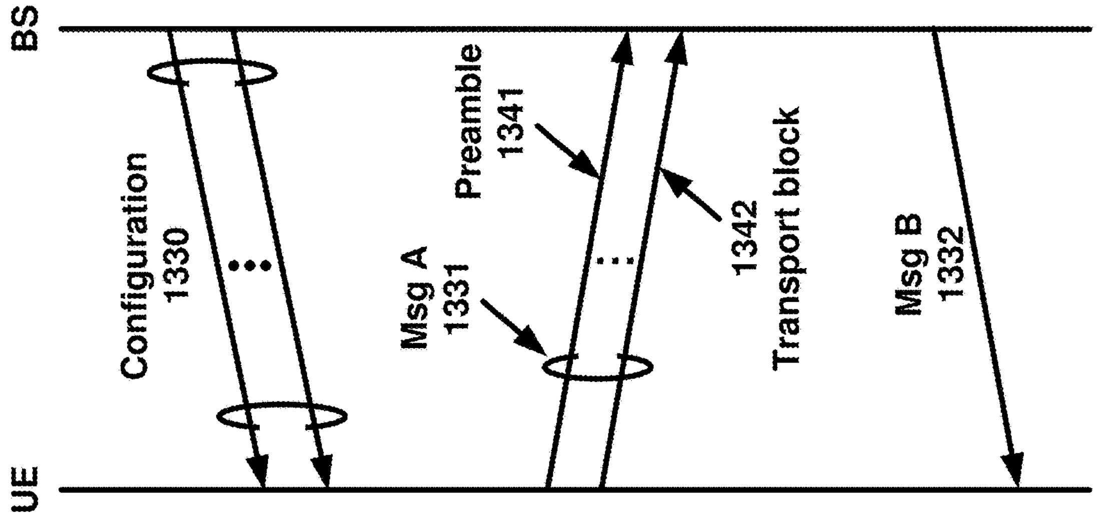
FIG. 13A, FIG. 13B, and FIG. 13C respectively illustrate a four-step contention-based random access procedure, a two-step contention-free random access procedure, and another two-step random access procedure.
Figure 13B:
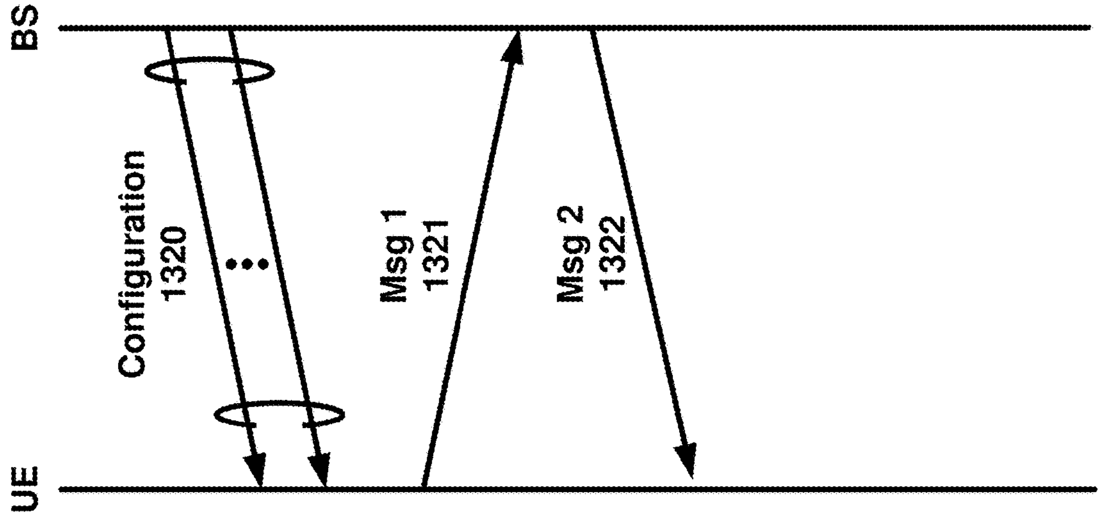
Figure 13A:
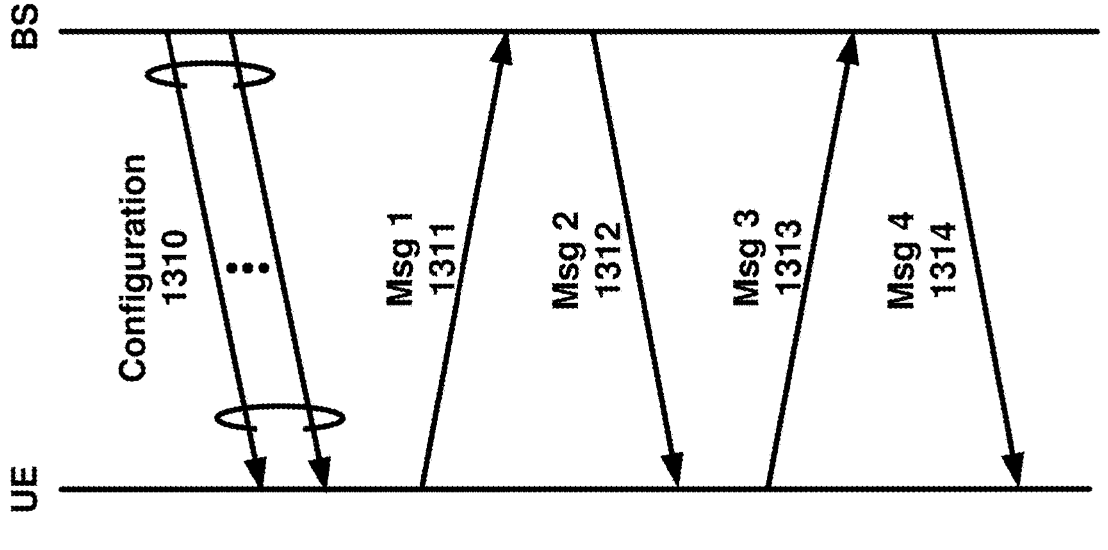

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preamble TransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
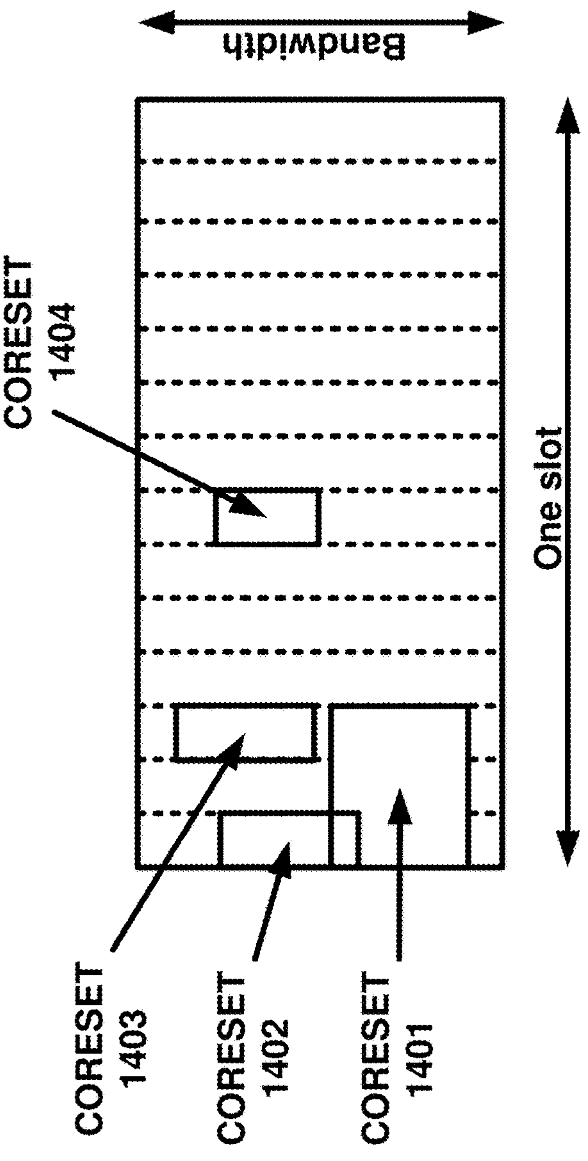
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
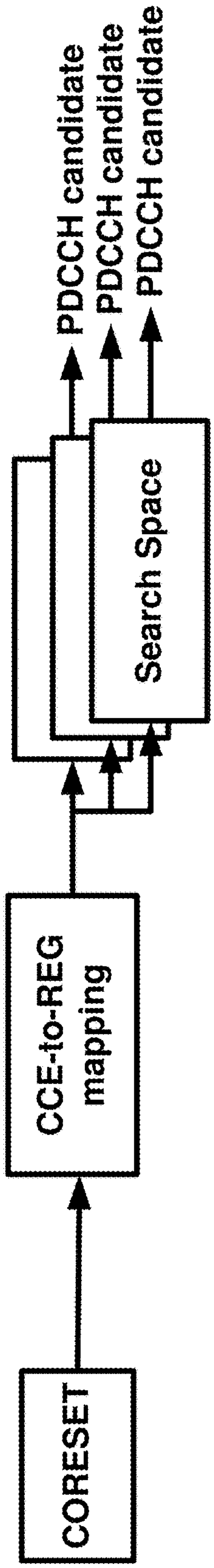
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
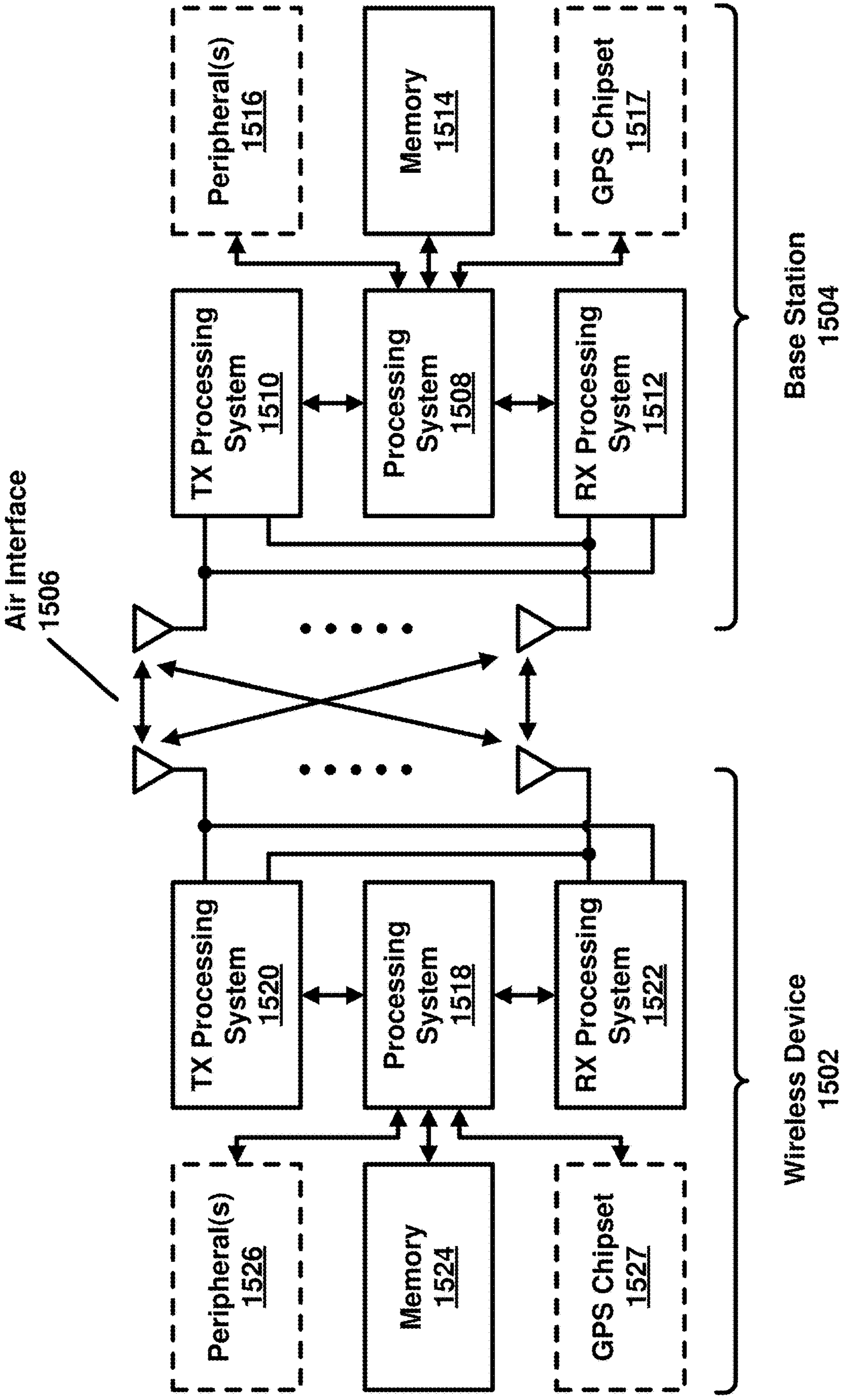
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
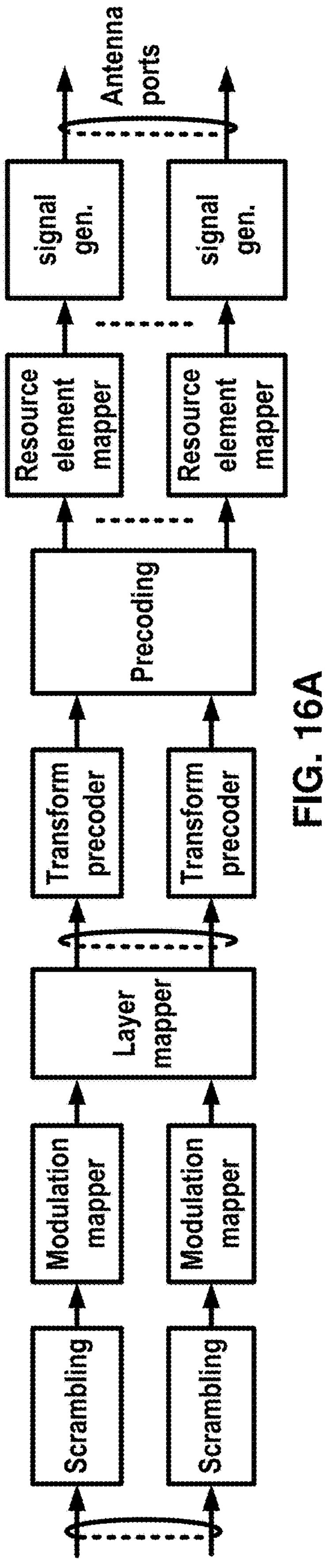
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP- OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

Figure 16B:
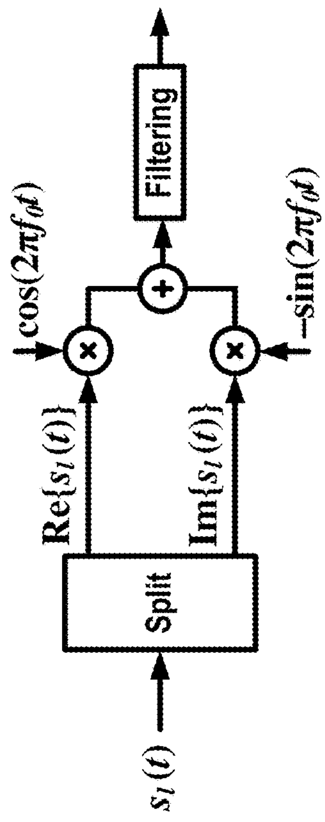

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

Figure 16D:
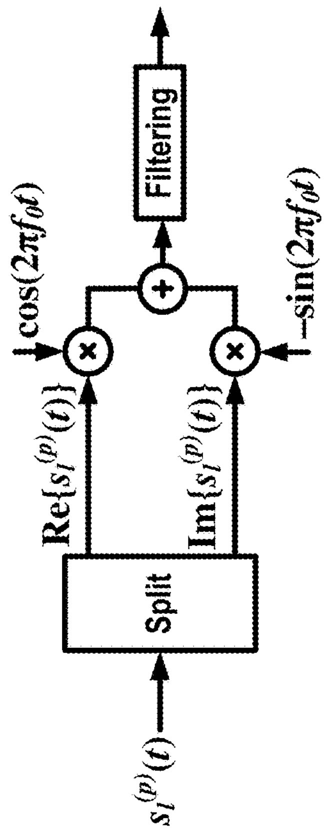
Figure 16C:
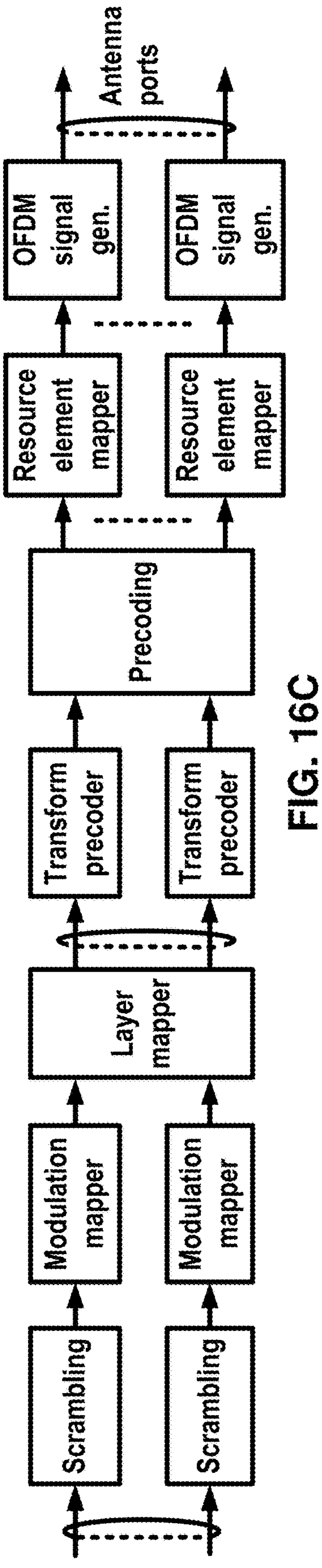

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g., RRC messages) comprising configuration parameters of a plurality of cells (e.g., primary cell, secondary cell). The wireless device may communicate with at least one base station (e.g., two or more base stations in dual connectivity) via the plurality of cells. The one or more messages (e.g., as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g., the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry (or expiration) of a random access response window timer, the time difference between two time stamps may be used. When a timer is restarted, a process for measurement of time window may be restarted. Other example implementations may be provided to restart a measurement of a time window.

Figure 17:
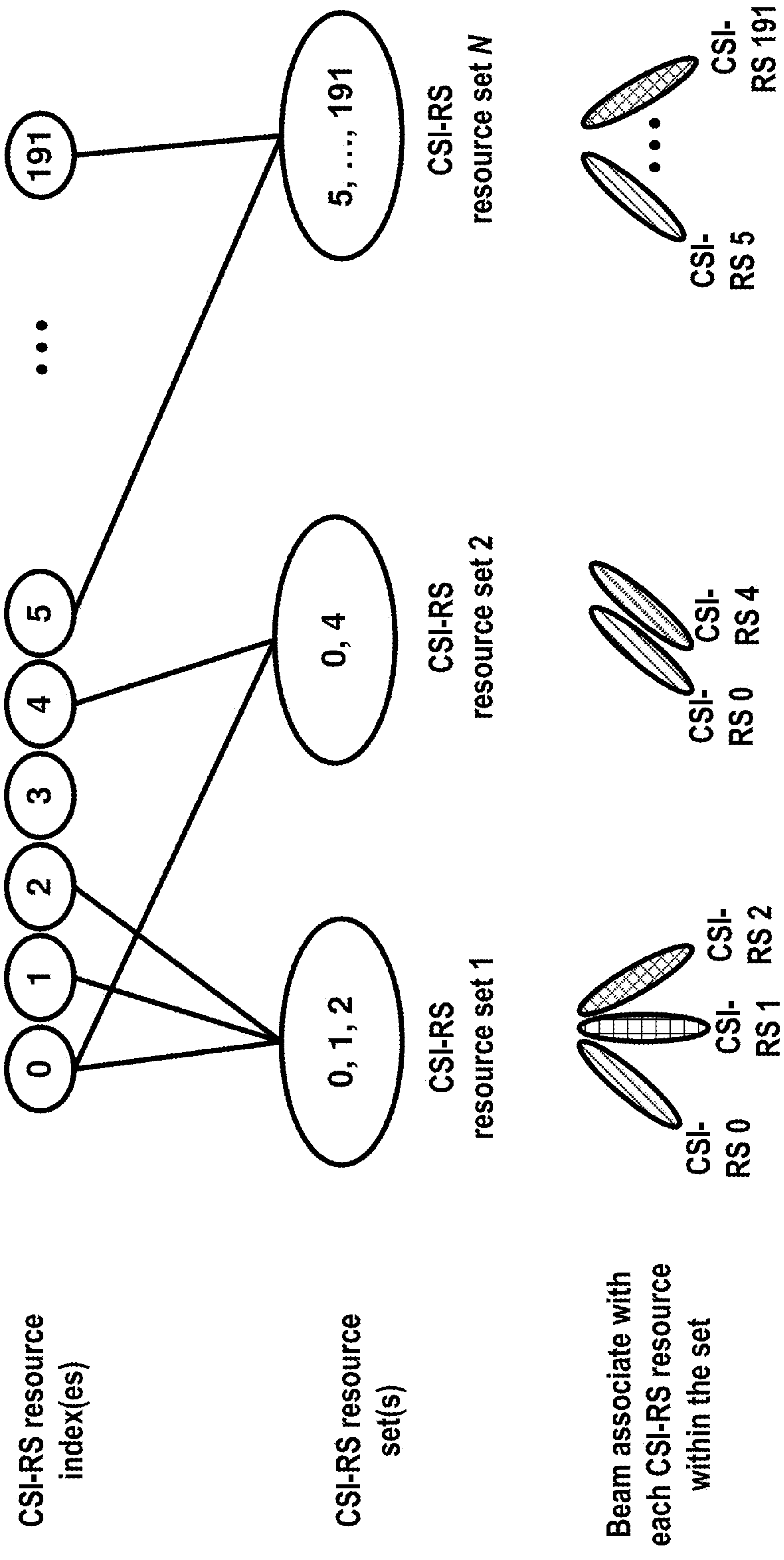
FIG. 17 illustrates an aspect of an example embodiment according to the present disclosure.

FIG. 17 illustrates an example of CSI-RS as per an aspect of an embodiment of the present disclosure.

In an example, a wireless device may receive, from a base station, one or more RRC messages comprising one or more configuration parameters of CSI-RS resource sets. The one or more configuration parameters may comprise CSI-ResourceConfig. A CSI-RS resource set (e.g., each CSI-RS resource set) of the CSI-RS resource sets may comprise a plurality of CSI-RS resources. Configuration of CSI-RS resource set may enable the base station to transmit per CSI-RS resource set indication for saving signaling overhead.

In an example, the base station may indicate (e.g., configure) a plurality of CSI-RS resource sets (e.g., a CSI-RS resource set 1, a CSI-RS resource set 2, . . . , a CSI-RS resource set N). A (e.g., each) CSI-RS resource set may comprise overlapping CSI-RS resources or non-overlapping CSI-RS resources. For example, the CSI-RS resource set 1 may comprise a CSI-RS resource 0, a CSI-RS resource 1, and a CSI-RS resource 2. The CSI-RS resource set 2 may comprise the CSI-RS resource 0 and a CSI-RS resource 4. The CSI-RS resource set N may comprise a CSI-RS resource 5, . . . , and a CSI-RS resource 191.

In an example, an RRC parameter may configure a CSI-RS resource set with a repetition indicator (e.g., 'repetition' in NZP-CSI-RS-ResourceSet). For example, the base station may set the repetition indicator, of the CSI-RS resource set, to 'off'. The base station may transmit, (one or more CSI-RSs via) a CSI-RS resource, of the CSI-RS resource set, with different spatial domain filters (or transmission/transmit (Tx) beams).

In an example, based on (e.g., by using measurements of) CSI-RS resource(s) in different beams, the base station and/or the wireless device may perform beam management (e.g., the P2 procedure). For example, the base station may set the repetition indicator, of the CSI-RS resource set, to 'on'. The base station may transmit, (one or more CSI-RSs via) a CSI-RS resource, of the CSI-RS resource set, with the same (e.g., a single) spatial domain filter (or transmission/transmit (Tx) beam). Based on (e.g., by using measurements of) CSI-RS resource(s) in the same beam, the base station and/or the wireless device may perform beam management (e.g., the P3 procedure).

In an example (e.g., referring to FIG. 17), the CSI-RS resource set 1 may be associated with a repetition indicator being set to 'off'. The base station may transmit a CSI-RS 0, a CSI-RS 1 and a CSI-RS 2 with/via different transmission beams.

In an example (e.g., referring to FIG. 17), the CSI-RS resource set 2 may be associated with a repetition indicator being set to 'on'. The base station may transmit a CSI-RS 0 and a CSI-RS 4 with/via the same transmission beam.

In an example, the base station may flexibly configure CSI-RS resources and CSI-RS resource sets. With the configured CSI-RS resources and CSI-RS resource sets, the wireless device may perform a beam management procedure, measure the channel quality, and/or transmit a report to the base station.

In an example, the wireless device may transmit, to the base station, a periodic report, an aperiodic report, and/or a semi-persistent report. Time and frequency resources of the report may be controlled (e.g., indicated and/or configured) by the base station.

In an example, a CSI may comprise Channel Quality Indicator (CQI), precoding matrix indicator (PMI), CSI-RS resource indicator (CRI), and SS/PBCH Block Resource indicator (SSBRI). The CSI may comprise layer indicator (LI) and rank indicator (RI). The CSI may comprise layer 1 reference signal received power (L1-RSRP) and layer 1 signal-to-interference-plus-noise ratio (L1-SINR).

In an example, for CQI, PMI, CRI, SSBRI, LI, RI, L1-RSRP, and/or L1-SINR, the wireless device may receive a message comprising an RRC parameter indicating N>1 CSI-ReportConfig Reporting Settings.

For example, the message may comprise an RRC parameter indicating M≥1 CSI-ResourceConfig Resource Settings.

For example, the message may comprise an RRC parameter indicating one or two list(s) of trigger states (e.g., given by the RRC layer parameter CSI-AperiodicTriggerStateList). Each trigger state in CSI-AperiodicTriggerStateList may comprise (e.g., contain or include) a list of associated CSI-ReportConfigs. The associated CSI-ReportConfigs may indicate the Resource Set IDs for channel measurement and optionally for interference measurement. Each trigger state may comprise (e.g., contain or include) one associated CSI-ReportConfig.

In an example, a Reporting Setting CSI-ReportConfig may comprise (or contain) parameter(s) for one reporting (e.g., CSI reporting) band. The parameters may comprise (e.g., be for) codebook configuration including codebook subset restriction, time-domain behavior, frequency granularity for CQI and PMI, measurement restriction configurations, and the CSI-related quantities. The CSI-related quantities to be reported by the wireless device may comprise the layer indicator (LI), L1-RSRP, L1-SINR, CRI, and SSBRI (SSB Resource Indicator).

In an example, an RRC parameter reportConfigType may indicate a time domain behavior of the CSI-ReportConfig. The RRC parameter reportConfigType may be set to 'aperiodic', 'semiPersistent', or 'periodic'.

In an example, an RRC parameter reportQuantity may indicate beam prediction-related, CSI-related, L1-RSRP-related or L1-SINR-related quantities to report. An RRC parameter reportFreqConfiguration may indicate the reporting granularity in the frequency domain, including the reporting band and if PMI/CQI reporting is wideband or sub-band. An RRC paramter timeRestrictionForChannelMeasurements in CSI-ReportConfig may be configured to enable time domain restriction for channel measurements. An RRC parameter timeRestrictionForInterferenceMeasurements may be configured to enable time domain restriction for interference measurements.

In an example, the RRC parameter CSI-ReportConfig may comprise (e.g., contain or include) CodebookConfig. The RRC parameter CodebookConfig may comprise (e.g., contain or include) configuration parameters for a codebook type and configurations of group-based reporting. The codebook type may comprise Type-I, Type II, or Enhanced Type II CSI. The code book type may comprise Further Enhanced Type II Port Selection including codebook subset restriction when applicable.

In an example, a CSI Resource Setting CSI-ResourceConfig may comprise (e.g., contain or include) a configuration of a list of S≥1 CSI Resource Sets (given by the RRC parameter csi-RS-ResourceSetList). The list may comprise references to either or both of NZP CSI-RS resource set(s) and SS/PBCH block set(s). The list may comprise references to CSI-IM resource set(s).

In an example, a time domain behavior of the CSI-RS resources within a CSI Resource Setting may be indicated by the RRC parameter resourceType. The time domain behavior may be set to aperiodic, periodic, or semi-persistent. For periodic and semi-persistent CSI Resource Settings, when the wireless device receives a message/parameter indicating group-based beam report, the number of CSI Resource Sets configured may be S=2. Otherwise, the number of CSI-RS resource Sets configured may be (limited to) S=1.

In an example, when the wireless device receives a message/parameter indicating multiple CSI-ResourceConfigs including the same NZP CSI-RS resource ID, the same time domain behavior may be configured for the CSI-ResourceConfigs. When the wireless device receives a message/parameter indicating multiple CSI-ResourceConfigs including the same CSI-IM resource ID, the same time-domain behavior may be configured for the CSI-ResourceConfigs. CSI Resource Settings linked to a Reporting Setting may have the same time domain behavior.

In an example, for L1-SINR measurement, when one Resource Setting is configured, the Resource Setting (e.g., given by an RRC parameter resourcesForChannelMeasurement) is for channel and interference measurement on NZP CSI-RS for L1-SINR computation. The wireless device may determine (e.g., assume) that same one port NZP CSI-RS resource(s) with density 3 REs/RB is used for both channel and interference measurements.

In an example, for L1-RSRP reporting, if an RRC parameter nrofReportedRS in CSI-ReportConfig is set to one, the reported L1-RSRP value may be defined by a 7-bit value in the range [−140, −44] dBm with 1 dB step size. If the RRC parameter nrofReportedRS is set to be larger than one, the wireless device may use differential L1-RSRP based reporting. The largest measured value of L1-RSRP is quantized to a 7-bit value in the range [−140, −44] dBm with 1 dB step size. The differential L1-RSRP is quantized to a 4-bit value. The differential L1-RSRP value may be computed with 2 dB step size with a reference to the largest measured L1-RSRP value which is part of the same L1-RSRP reporting instance.

In an example, the base station may transmit periodic CSI-RSs (P-CSI-RSs) in the configured resources. The wireless device, based on periodically received P-CSI-RSs (the first number of CSI-RSs), may determine that the P-CSI-RSs are transmitted in configured locations (time domain and frequency domain) with a configured periodicity. The wireless device may determine that the P-CSI-RSs have (e.g., are with) a configured number of beams, and/or with a configured transmission power. Based on the determining, the wireless device may obtain a first periodic CSI/beam measurements (e.g., CSI, L1-RSRP, and/or L1-SINR). The wireless device may measure the CSI/beam quantities.

In an example, a TCI state may comprise (e.g., contain or include) parameters for configuring a quasi co-location (QCL) relationship between a reference signal and a signal/channel. For example, the TCI state may be for a transmission or a reception of the signal/channel. The wireless device may receive a configuration parameter (e.g., TCI-state or TCI-stateId) and/or control signaling (e.g., DCI) indicating the TCI state. For example, the TCI state may comprise a spatial receive (RX) parameter (e.g., a RX beam) and/or a transmit (TX) spatial filter (e.g., a TX beam). For example, the TCI state may comprise (e.g., be one of) a DL TCI state, an UL TCI state, and a joint TCI state. Using a TCI state may refer to applying or assuming the TCI state for (e.g., when or during) transmitting or receiving the signal/channel.

In the present disclosure, a beam may refer to a spatial RX parameter (e.g., a RX beam) and/or a TX spatial filter (e.g., a TX beam). A beam identification (ID) of (associated with, corresponding to, mapped to, or assigned to) the beam may refer to an identification, identifier, or index for identifying the beam (e.g., QCL relationship between two signals regarding the beam). Terminologies "beam identification", "beam identifier", and "beam index" may be used interchangeably with the same meaning in the present disclosure. The beam ID may be associated with or correspond to one or more reference signals. The beam ID may comprise (e.g., be associated with or correspond to) CRI and SSBRI (e.g., of the one or more reference signals). The beam ID may comprise (e.g., be associated with or correspond to) a TCI state. The beam ID may comprise (e.g., be associated with or correspond to) a TCI state ID.

In an example, a CSI-RS may be used for time/frequency tracking, CSI computation, L1-RSRP computation, L1-SINR computation, mobility, tracking during fast SCell activation, a AI/ML model (e.g., model training/updating, model inference, performance monitoring of the AI/ML model).

In an example, for a CSI-RS resource associated with a higher layer (e.g., RRC) parameter NZP-CSI-RS-ResourceSet with a higher layer (e.g., RRC) parameter repetition set to 'on', the wireless device may not expect to be configured with a CSI-RS over the symbols during which the wireless device is also configured to monitor a CORESET, while for other NZP-CSI-RS-ResourceSet configurations, if the wireless device is configured with a CSI-RS resource and a search space set associated with a CORESET in the same OFDM symbol(s), the wireless device may assume that the CSI-RS and a PDCCH DM-RS transmitted in all the search space sets associated with CORESET are quasi co-located with 'typeD', if 'typeD' is applicable. If the CORESET is activated with two TCI states, the wireless device may assume that the first TCI state of the CORESET as the default QCL assumption for the CSI-RS. This also applies to the case when CSI-RS and the CORESET are in different intra-band component carriers, if 'typeD' is applicable. The wireless device may not expect to be configured with the CSI-RS in PRBs that overlap those of the CORESET in the OFDM symbols occupied by the search space set(s).

In an example, the wireless device may not expect (or may not be expected) to receive a CSI-RS and a SIB1 message in overlapping PRBs in OFDM symbols where the SIB1 message is transmitted.

In an example, if the wireless device is configured with DRX,

- if the wireless device is configured to monitor a DCI (e.g., DCI format 2_6) and configured by a higher layer (e.g., RRC) parameter ps-TransmitOtherPeriodicCSI to report CSI with a higher layer (e.g., RRC) parameter report Config Type set to 'periodic' and reportQuantity set to quantities other than 'cri-RSRP' and 'ssb-Index-RSRP' when drx-onDuration Timer in DRX-Config is not started, the most recent CSI measurement occasion occurs in DRX active time or during the time duration indicated by drx-on Duration Timer in DRX-Config also outside DRX active time for the CSI to be reported;
- if the wireless device is configured to monitor a DCI (e.g., DCI format 2_6) and configured by a higher layer (e.g., RRC) parameter ps-TransmitPeriodicL1-RSRP to report L1-RSRP with a higher layer (e.g., RRC) parameter report Config Type set to 'periodic' and reportQuantity set to 'cri-RSRP' when drx-onDuration Timer in DRX-Config is not started, the most recent CSI measurement occasion occurs in DRX active time or during the time duration indicated by drx-onDuration Timer in DRX-Config also outside DRX active time for CSI to be reported;
- otherwise, the most recent CSI measurement occasion occurs in DRX active time for CSI to be reported.

During non-active periods of cell DTX if cell DTX is activated for a serving cell, the wireless device is not expected to (or may not) receive a periodic CSI-RS and a semi-persistent CSI-RS on the serving cell configured in CSI report configuration in CSI-ReportConfig associated with a higher layer parameter (e.g., RRC) reportQuantity comprising at least 'RI'. If the cell DTX is activated for a serving cell, the most recent CSI measurement occasion of a semi-persistent CSI-RS resource or a periodic CSI-RS resource on the serving cell occurs in active periods of cell DTX for CSI report configured by CSI-ReportConfig associated with the higher layer parameter report Quantity comprising at least 'RI'.

In the present disclosure, terminologies of "artificial intelligence (AI)", "machine learning (ML)", and "AI/ML" may be used interchangeably. Terminologies of "model", "AI model", "ML model", and "AI/ML model" may be used interchangeably. A model may refer to an AI model, an ML model, or an AI/ML model. Terminologies of "functionality", "prediction functionality", "AI functionality", "ML functionality", and "AI/ML functionality" may be used interchangeably. A functionality may refer to a prediction functionality, an AI functionality, an ML functionality, or an AI/ML functionality. Terminologies of "prediction feature", "AI feature", "ML feature", and "AI/ML feature" may be used interchangeably.

In the present disclosure, a model may be referred to as, a prediction model, an AI model, an ML model, or an AI/ML model. Terminologies of "model", "prediction model", "AI model", "ML model", "AI/ML model", and "prediction model" may be used interchangeably.

In an example, artificial intelligence (AI) may be a data driven algorithm, scheme, or mechanism. An AI algorithm/scheme/mechanism may learn from data (e.g., known training data) and generalize to unseen data (e.g., new data). The AI algorithm/scheme/mechanism may perform/complete tasks without explicit instructions.

Examples of AI/ML techniques are federated learning, reinforcement learning, supervised learning, unsupervised learning, and the like.

For example, a federated learning technique may train a model across multiple decentralized nodes/devices (e.g., wireless devices, base stations, and the like). Each node/device may locally train a model based on local data samples (e.g., by using the local data sample as inputs). The federated learning technique may require multiple interactions of the model.

For example, a reinforcement learning technique may train a model from an input and a feedback signal resulting from the model's output.

For example, a supervised learning technique may train a model from an input and labels associated with the input data.

For example, an unsupervised learning technique may train a model from an input without labelled data.

In an example, a non-AI algorithm/scheme/mechanism may not (be able to) learn from data. The non-AI algorithm/scheme/mechanism may not (be able to) generalize to unseen data. The non-AI algorithm/scheme/mechanism may require explicit instructions to perform/complete tasks.

In an example, a model may refer to (or is) an object (e.g., stored locally in a file or stored in a server) that is trained (and/or updated) to recognize certain types of patterns. The model (e.g., neural network model) comprises layers of nodes (e.g., artificial neurons). The layers comprise an input layer, one or more hidden layers, and an output layer. A node connects to one or more other nodes, having its (the node's) own associated weight and threshold. If the output of any individual node is above a specified threshold value, that node is activated, sending data to the next layer of the neuro network. Otherwise, no data is passed along to the next layer of the network.

In an example, a device (e.g., the wireless device, the base station, or the network) may perform the AI by using a model (e.g., may be referred to as inference of the model, model inference, or prediction). For example, the model may comprise an artificial intelligence (AI) model. The model may be/refer to a data driven algorithm (e.g., method, procedure, or protocol) that applies AI techniques to generate a set of outputs based on (e.g., by using) a set of inputs.

In an example, the model may be a supervised learning model, an unsupervised learning model, or a reinforcement learning model. The model may comprise a neural network model, a long short-term memory (LSTM) network model, a support vector machine (SVM) model, and a K-nearest neighbors (KNN) model. The neural network model may be an artificial neural network. The neural network model may comprise a convolutional neural network (CNN) model and a recurrent neural network (RNN) model. The model may comprise a regression model and a classification model. The model may be a combination or concatenation of multiple models (or multiple model types).

For example, the device may use training data for training (building, generating, creating, updating, tuning, or fine-tuning) the model based on (e.g., by using) the training data. This procedure/process of the training the model may be referred to as model training. The training data may comprise one or more training samples. A training example may comprise one or more inputs and (corresponding) desired output (e.g., label). The training data may also be referred to as dataset (including training dataset and/or validation dataset), trained data, data for training, or ground truth data.

In an example, the device (e.g., the wireless device, the base station, or the network) may be equipped with a mechanism capable of predicting beam index, predicting RSRP, predicting RLF, predicting beam failure, predicting handover, predicting cell reselection/selection, compressing CSI, or estimating positioning information. This may allow the wireless device to report predictions/estimations/compression to the serving base station/network.

In an example, the mechanism may be based on the AI. The mechanism may comprise a procedure/process/program of using a model (e.g., performing inference of an AI model) for outputting the predictions/estimations/compression. The mechanism may comprise determination based on the model. The determination based on the model may comprise prediction, estimation, or compression by using the model. The using the model may comprise performing/executing inference of the model.

For example, a wireless device or a base station/network may determine (e.g., predict) the best beam among a plurality of beams, by using a first model.

For example, a wireless device or a base station/network may determine (e.g., predict) an RSRP (value) of a beam in a future time instance, by using a second model.

For example, a wireless device may determine (e.g., compress) CSI (e.g., for overhead reduction), by using a UE-sided model (e.g., part) of a two-sided model. A base station/network may determine CSI (e.g., decompress the compressed CSI), by using a NW-sided model (e.g., part) of the two-sided model.

For example, a wireless device or a base station/network may determine/predict CSI (e.g., PMI), by using a third model.

For example, a wireless device or a base station/network (Location Management Function (LMF) may determine (e.g., estimate) positioning information/data/results/measurements, by using a fourth model.

In an example, a model may be a UE-sided model or a network-sided model. A network (e.g., a base station) may train (e.g., perform model training of) the network-sided model and/or perform inference of the network-sided model. The network-sided model may reside at the network (e.g., the network may store and/or manage the network-sided model). A wireless device or a (UE side) server for model training may train (e.g., perform model training of) the UE-sided model. The wireless device may perform inference of the UE-sided model. The network may train (e.g., perform model training of) the UE-sided model and transfer/deliver the UE-sided model to the wireless device.

In the present disclosure, terminologies of "UE-sided model" and "UE-side model" may be used interchangeably. Terminologies of "network-sided model", "network-side model", "NW-side model", and "NW-sided model" may be used interchangeably. Terminologies of "network-sided", "network-side", "NW-side", and "NW-sided" may be used interchangeably.

In the present disclosure, a functionality may be an ability/capability/feature to do/perform/execute/complete (e.g., by the wireless device, the base station, or the network) a task, performance, execution, procedure, or process. The functionality may comprise one or more functions that the wireless device, the base station, or the network is able/capable or equipped to perform/execute/complete. The functionality may comprise an AI functionality. The functionality may comprise a non-AI functionality.

In an example, the wireless device may receive, from the base station, a higher layer (e.g., RRC) parameter indicating/configuring a functionality associated with one or more models. The one or more models may comprise one or more active/activated models and one or more inactive/deactivated/non-activated models. The functionality may refer to an AI-enabled feature (or feature group) enabled by one or more configurations, where the one or more configurations may be supported based on (e.g., indicated by) UE capability on the AI (e.g., the one or more models). The wireless device may implement the functionality by performing/completing inference of a model of the one or more models. Based on (e.g., if) the functionality comprising/associated with only a single model (e.g., active/activated model), the functionality may be considered equivalent to the single model.

In the present disclosure, terminologies "active model", "activated model", "active AI model", "activated AI model", "active ML model", "activated ML model", "active AI/ML model", "activated AI/ML model", "active prediction model", and "activated prediction model" may be used interchangeably.

In the present disclosure, terminologies "inactive model", "deactivated model", "non-activated model", "inactive AI model", "deactivated AI model", "non-activated AI model", "inactive ML model", "deactivated ML model", "non-activated ML model", "inactive AI/ML model", "deactivated AI/ML model", "non-activated AI/ML model", "inactive prediction model", "deactivated prediction model", "non-activated prediction model", may be used interchangeably.

In the present disclosure, terminologies "active functionality", "activated functionality", "active AI functionality", "activated AI functionality", "active ML functionality", "activated ML functionality", "active AI/ML functionality", "activated AI/ML functionality", "active prediction functionality", and "activated prediction functionality" may be used interchangeably.

In the present disclosure, terminologies "inactive functionality", "deactivated functionality", "non-activated functionality", "inactive AI functionality", "deactivated AI functionality", "non-activated AI functionality", "inactive ML functionality", "deactivated ML functionality", "non-activated ML functionality", "inactive AI/ML functionality", "deactivated AI/ML functionality", "non-activated AI/ML functionality", "inactive prediction functionality", "deactivated prediction functionality", "non-activated prediction functionality", may be used interchangeably.

Figure 18:
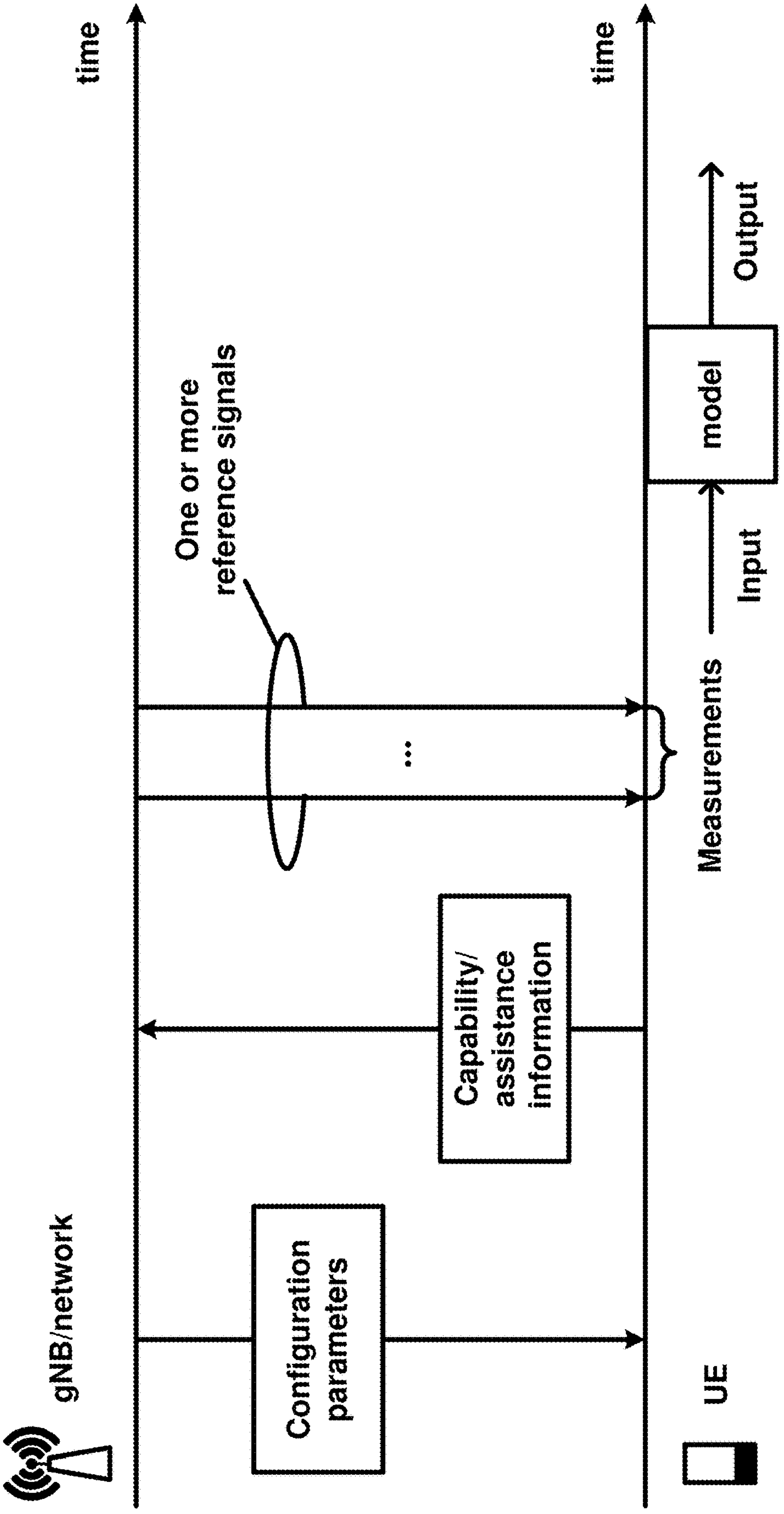
FIG. 18 illustrates an aspect of an example embodiment according to the present disclosure.

FIG. 18 illustrates an example of a procedure using a model as per an aspect of an embodiment of the present disclosure.

In an example, a wireless device may receive, from a base station/network, one or more messages (e.g., RRC messages) comprising one or more parameters (e.g., RRC parameters) indicating/configuring one or more models. The one or more parameters may be one or more configuration parameters. The one or more parameters may indicate or configure a functionality associated with (related to or mapped to) the one or more models. For example, the wireless device may implement the functionality (e.g., performing inference for beam prediction) by using a model (e.g., active/activated model) of the one or more models.

In an example, the wireless device may transmit, to the base station/network, via a message (e.g., RRC message) or control information (e.g., MAC CE or UCI), capability information and/or assistance information. The capability information and/or assistance information may indicate whether the wireless device supports (e.g., is capable of) the functionality and/or the model. The capability information may comprise one or more RRC parameters (or one or more fields) indicating support of the functionality and/or the model. The assistance information may comprise conditions for applying the functionality and/or an index/identifier of a model of the one or more models. For example, the conditions may comprise power requirements of using the model at the wireless device and remaining battery power of the wireless device. The assistance information may comprise an applicability (availability, presence, existence, or storage) of the model at the wireless device.

In an example, the wireless device may receive, from the base station/network, a message (e.g., RRC message) comprising one or more parameters (e.g., RRC parameters) indicating/configuring one or more reference signals. The one or more parameters may be one or more configuration parameters. The one or more reference signals may be for/associated with the model. The one or more reference signals may be downlink reference signals. The one or more reference signals may comprise one or more CSI-RSs, one or more PRSs, one or more DMRSs, and one more PT-RSs.

In an example, the one or more reference signals may comprise first reference signals, second reference signals, and third reference signals. The first reference signals may be associated with (e.g., configured for model training, model inference, and/or performance monitoring) a Set A of beams. The first reference signals may be referred to as a Set A of reference signals. The second reference signals may be associated with (e.g., configured for model training, model inference, and/or performance monitoring) a Set B of beams. The second reference signals may be referred to as a Set B of reference signals. The third reference signals may be associated with (e.g., configured for performance monitoring) a Set C of beams. The third reference signals may be referred to as a Set C of reference signals.

In an example, the wireless device may receive, from the base station, the one or more reference signals. The wireless device may measure (e.g., perform measurement on) the one or more reference signals. The wireless device may determine, based on (e.g., by receiving and measuring) the one or more reference signals, measurements (e.g., for data collection, model training, model inference, and/or performance monitoring).

In an example, the wireless device may input the measurements (e.g., after pre-processing such as quantization) to the model. Input of the model may be based on the one or more measurements of the measurements. The input of the model may comprise pre-processed measurements of the one or more reference signals. For example, the measurements may comprise (measured) L1-RSRPs of the one or more reference signals. The input of the model may comprise (e.g., be) quantized RSRPs by quantizing the L1-RSRPs. The wireless device may perform inference of the model (e.g., model inference) and obtain a prediction/prediction results (e.g., one or more beam indexes (e.g., CRI or SSBRI) in a first set (Set A) of beams). The inference of the model may produce the prediction. The wireless device may transmit, to the base station/network, a report (e.g., AI based report). The report may comprise the prediction (e.g., output of the model or output of the inference of the model).

In an example, inference of a model (e.g., an AI model) may be a process/procedure of using the model to produce a set of outputs based on a set of inputs. The inference of the model may be also referred to as model inference. The set of inputs may comprise measurements on one or more reference signals (e.g., measurements on a Set B of reference signals).

For example, a set of inputs of a model (e.g., an AI model) for beam prediction may comprise L1-RSRP measurements on the one or more reference signals (e.g., CSI-RSs and/or SSBs). A set of outputs of the model for beam prediction may comprise predicted beam information/ID(s) and/or predicted RSRP(s) (e.g., within/of/among a Set A of beams/reference signals/TCI states/QCL relationships).

For example, a set of inputs of a model (e.g., an AI model) for positioning may comprise channel measurements (e.g., time-domain channel impulse response (CIR) or power delay profile (PDP) on the one or more reference signals (e.g., CSI-RSs, SRSs, and/or positioning reference signals (PRSs). The set of outputs of the model for positioning may comprise positioning/location information of the wireless device.

In an example, the wireless device may include, in a report (e.g., a CSI report or an AI based report), beam information on/of predicted Top-K beam(s) among a set (e.g., the Set A) of beams. Beam information of a predicted beam may comprise a beam index of the predicted beam, a beam identifier/identification of the predicted beam, a TCI state indicating the predicted beam, and an identifier/identification of a reference signal associated with the predicted beam. Beam information in a report (e.g., inference result report or CSI report carrying/comprising the inference result) may comprise (e.g., be) CRI/SSBRI of (or associated with) resource in a Set A (e.g., Set A of reference signals or the plurality of first reference signals). For example, beam information in an inference result report (e.g., a CSI report carrying a report quantity associated with an inference results) may comprise (e.g., be) one or more CRIs (e.g., predicted CRIs) of one or more resources in the Set A. For example, beam information in an inference result report (e.g., a CSI report carrying a report quantity associated with an inference results) may comprise (e.g., be) one or more SSBRIs (e.g., predicted SSBRI) of one or more resources in the Set A.

In an example, content (e.g., quantity) in the report may comprise (e.g., include or contain) the beam information. The content in the report may (e.g., further or additionally) comprise (e.g., include or contain) predicted RSRP (e.g., layer 1 RSRP) of the predicted Top-K beam(s). The content in the report may (e.g., further or additionally) comprise (e.g., include or contain) confidence information of the predicted RSRP. The content in the report may (e.g., further or additionally) comprise (e.g., include or contain) probability information of the predicted Top-K beam(s).

In an example, beam prediction may be based on output of a model (e.g., an AI model). The beam prediction may comprise (or be based on) performing the inference of the model and obtaining a result based on (e.g., by post-processing of, quantization of, by comparing, and/or by filtering) the output of the inference. The model may be used/trained/configured for the beam prediction.

In an example, the beam prediction may comprise spatial-domain beam prediction, temporal beam prediction, and beam failure event/condition prediction. The spatial-domain beam prediction may comprise spatial-domain downlink transmit/transmission (Tx) beam prediction, spatial-domain downlink receive/reception (Rx) beam prediction, uplink Tx beam prediction, spatial-domain uplink Rx beam prediction, and spatial-domain downlink beam pair prediction.

In an example, the temporal beam prediction may comprise predicting, based on historic measurement results (e.g., by using the historic measurement results as inputs of inference of the model) of one or more first beams (e.g., reference signals associated with the one or more first beams) (e.g., a Set B of beams) and by performing inference of the model, one or more future time instances of one or more second beams (e.g., a Set A of beams). For example, the Set B may be the same as or different from the Set A. For example, the Set B may be a subset of the Set A.

In an example, the beam failure event/condition prediction may comprise predicting, based on the historic measurement results (e.g., by using the historic measurement results as inputs of inference of the model) of the one or more first beams (e.g., reference signals associated with the one or more first beams) (e.g., a Set B of beams) and by performing inference of the model, a future beam failure event/condition.

In an example, the wireless device may transmit, to the base station and based on prediction results (e.g., the predictions result triggers transmission of control information/signaling), control information/signaling (e.g., a MAC CE via PUSCH, the report via PUCCH or PUSCH, or an RRC message).

In an example embodiment, the base station/network and/or the wireless device may manage a functionality and/or a model by using life cycle management (LCM). The LCM may comprise functionality-based LCM or model-based LCM.

In an example, the base station/network and/or the wireless device may manage the model by using LCM. The LCM managing the model may be referred to as a model-based LCM. LCM managed by the base station/network may be referred to as NW-side LCM. LCM managed by the UE may be referred to as UE-side LCM.

In an example, the base station/network and/or the wireless device may manage a functionality (e.g., associated with the model) by using life cycle management (LCM). The LCM managing the functionality may be referred to as functionality-based LCM. LCM managed by the base station/network may be referred to as NW-side LCM. LCM managed by the UE may be referred to as UE-side LCM.

In an example, LCM may comprise model generation (e.g., model training, model validation, and/or model testing) and inference operation (e.g., inference of the model). Components of the LCM may comprise data collection, model training, functionality/model identification, model delivery/transfer, and model inference operation. The components of the LCM may comprise functionality/model selection, activation, deactivation, switching, and fallback operation. The components of the LCM may comprise functionality/model monitoring, model update, and UE capability (e.g., related to AI processing) indication.

In an example, an LCM procedure may be a model-based LCM. The model-based LCM may be referred to as model-ID-based LCM. In the model-ID-based LCM, models are identified at the network. The network/wireless device may activate/deactivate/select/switch individual models via model ID (e.g., identification, identifier, or index).

In an example, model activation may refer to enabling (e.g., a procedure to enable) an AI/ML model for a specific AI/ML-enabled feature. Model deactivation may refer to enabling (e.g., a procedure to enable) an AI/ML model for a specific AI/ML-enabled feature. Model switching may refer to (a procedure of) deactivating a currently active AI/ML model and activating a different AI/ML model for a specific AI/ML-enabled feature.

For example, the wireless device may transmit/report, to the base station, a first indication of the model activation, model deactivation, and/or model switching. The first indication may comprise a model ID or an associated ID of an AI/ML model. The first indication may be via an UCI, a MAC CE, or an RRC message (e.g., UAI message). The first indication may be via a PUCCH or a PUSCH.

For example, the base station may transmit, to the wireless device, a second indication of the model activation, model deactivation, and/or model switching. The second indication may comprise a model ID or an associated ID of an AI/ML model. The second indication may be via a DCI, a MAC CE, or an RRC message. The second indication may be via a PDCCH or a PDSCH.

In an example, model update may refer to process/procedure of updating the model parameters and/or model structure of a model.

In an example, an LCM procedure may be a functionality-based LCM. Corresponding to the functionality-based LCM procedure, a base station may configure a wireless device to perform the LCM procedure for a model stored in the wireless device. In an example, a base station may configure a wireless device to perform the LCM procedure by RRC. In an example, a base station may configure a wireless device to perform the LCM procedure by MAC-CE. In an example, a base station may configure a wireless device to perform the LCM procedure by DCI. A mechanism for the base station to configure the wireless device with the LCM procedure may also be referred to as the functionality-based LCM. The mechanism for the base station to configure the wireless device with the LCM procedure may also be referred as a procedure or protocol.

For example, in a functionality-based LCM, the wireless device may manage LCM for one or more models associated with a functionality (while the network may manage LCM of the functionality). The wireless device may transmit to the network/base station, a request or an indication of an LCM operation on the model by the wireless device.

In the present disclosure, a supported functionality (or model) may refer to a functionality (or model) that the wireless device can indicate by using UE capability information/parameters (e.g., via RRC/LPP signaling). An applicable functionality (or model) may refer to a functionality (or model) that the wireless device is ready to apply for inference. For example, an applicable functionality (or model) is a supported functionality (or model). The supported functionality (or model) may or may not be an applicable functionality (or model). An applicable functionality (or model) may refer to a functionality indicated by an RRC parameter/IE CSI-ReportConfig for inference (e.g., model inference or beam prediction) configuration or a set of inference related parameters or information/parameters indicated by the wireless device. An activated functionality (or model) may refer to a functionality (or model) already enabled for performing inference. For example, an activated functionality (or model) is an applicable functionality (or model). The applicable functionality (or model) may or may not be an activated functionality (or model).

In an example, a procedure related to a functionality (or model) may comprise:

Step 1: A network (e.g., the base station) sends a UECapabilityEnqiry message to initiate the procedure to a UE (e.g., the wireless device) reporting one or more (AI/ML) supported functionalities (or models) of the UE.

Step 2: the UE sends a UECapablityInformation message to the network, comprising (e.g., containing) the one or more supported functionalities (or models) at the UE side.

Step 3: Following configurations are provided from the network to the UE:

1) The UE is allowed to do UAI (UE assistance information) reporting via OtherConfig;
2) The network may provide NW-side additional conditions, e.g., via RRC (mandatory or optional);
3) Configuration (e.g. inference configuration) of the one or more supported functionalities (or models).

The UE decides one or more applicable functionalities (or models) based on NW-side additional conditions (if provided), UE-side additional conditions (internally known by the UE) and model availability in device (and the inference configuration). The UE may determine/decide the one or more applicable functionalities (or model) when the NW-side additional conditions are not provided in the configurations.

Step 4: the UE reports one or more applicable functionalities (or model) in the following scenarios:

1) Upon being configured to provide the one or more applicable functionalities (or model) and upon change of the one or more applicable functionalities (or model) via UAI; or
2) As response (e.g., via UAI or a RRCReconfigurationComplete message) to the NW-side additional conditions (and/or inference configuration) requesting the one or more applicable functionalities (or model) reporting in Step 3.

Step 5:

1) The network configures inference configuration to the UE after applicable functionality (or model) reporting, if inference configuration based on the one or more supported functionalities (or models) is not provided in Step 3 (e.g., inference configuration is provided in Step 5).
2) If inference configuration based on the one or more supported functionalities (or models) is provided in Step 3, it is up to network implementation whether to provide an updated configuration or not.

The one or more applicable functionalities (or models) may be activated by receiving the inference configuration when the inference configuration is provided in Step 5. An initial (activation) state of an applicable functionality (or model) may be active/activated or inactive/deactivated. If inference configuration of supported functionality (or model) is provided in Step 3, the initial state of the applicable functionality (or model) may be active/activated. The UE may receive, via a MAC CE or a RRC message, activation/deactivation of the applicable functionality (or model). The MAC CE or the RRC message may activate/deactivate multiple applicable functionalities (or models) (e.g., at the same time).

Figure 19:
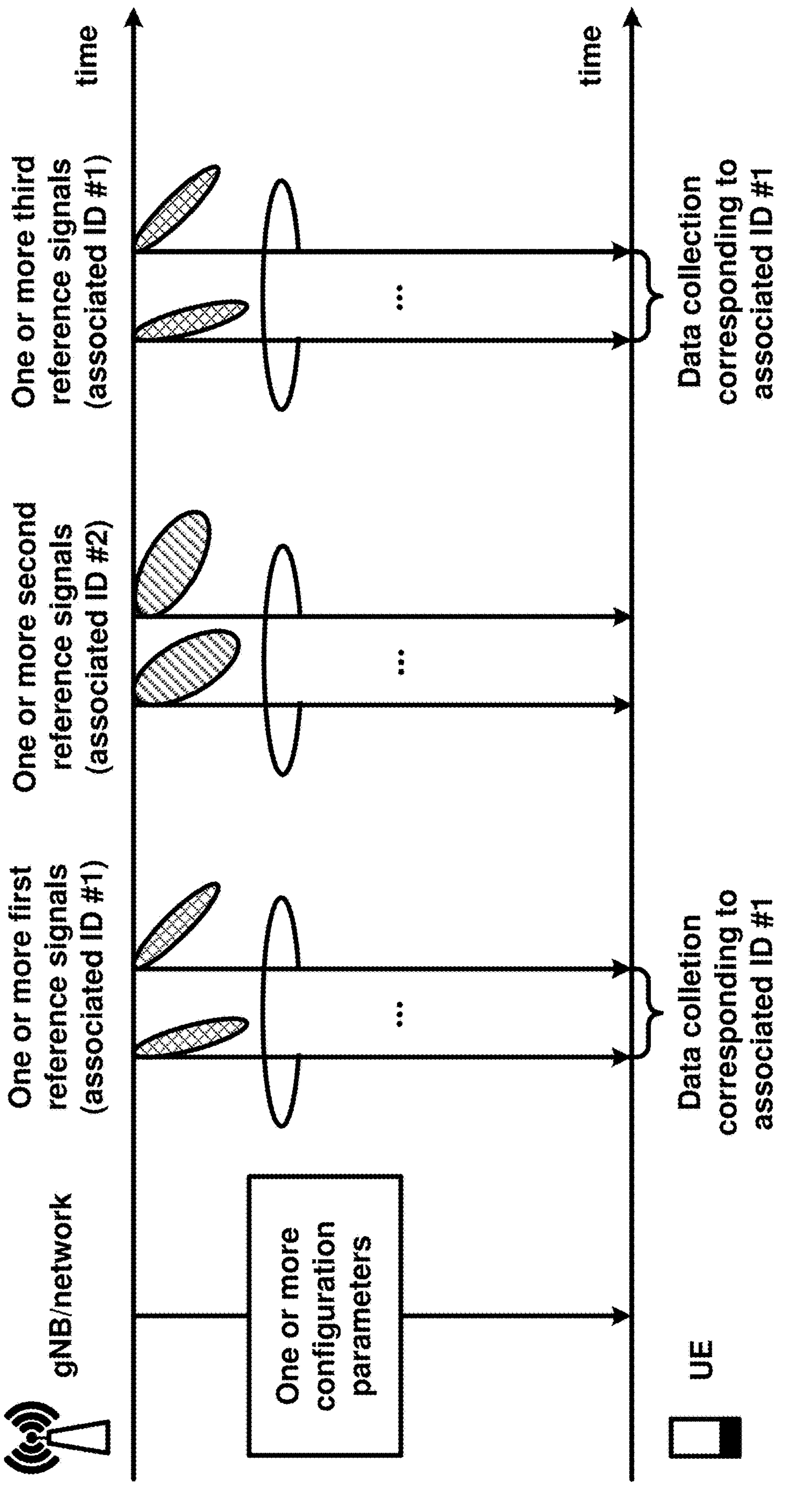
FIG. 19 illustrates an aspect of an example embodiment according to the present disclosure.

FIG. 19 illustrates an example of associated ID as per an aspect of an embodiment of the present disclosure.

In an example embodiment, a wireless device may receive, from a base station, one or more messages comprising one or more configuration parameters. The one or more configuration parameters may be for a model (e.g., AI model) or a functionality (e.g., AI functionality). Purposes of the one or more configuration parameters may comprise data collection, model training, model inference, and performance monitoring, of/for the model (or functionality).

In an example, the one or more configuration parameters may indicate/configure resources of reference signals (e.g., corresponding to a Set A and/or a Set B), for the model (or functionality). The reference signals may comprise SSBs (SS/PBCH blocks) and CSI-RSs. The one or more configuration parameters may indicate/comprise an associated ID (e.g., associated ID #1 in FIG. 19). The one or more configuration parameters may indicate/configure one or more reference signals for data collection (e.g., one or more first reference signals and one or more third reference signals).

In an example, the base station may configure an associated ID of/for a model within a CSI framework. The wireless device may receive one or more messages comprising one or more configuration parameters indicating the associated ID, where the one or more configuration parameters are for CSI (e.g., reporting and/or resource) configurations (e.g., CSI-ReportConfig, CSI-ReportConfigID, CSI-ResourceConfig, CSI-ResourceConfigID). The wireless device may assume similar properties of a downlink Tx beam or beam set/list associated with the same associated ID.

For example, the one or more configuration parameters may comprise an RRC parameter (or IE) CSI-ReportConfig, CSI-ReportConfigId, CSI-ResourceConfig, and CSI-ResourceConfigId. A first RRC parameter (e.g., a first CSI-ResourceConfigId, a first CSI-ResourceConfig, a first CSI-ReportConfigId, or a first CSI-ResourceConfig) may configure/indicate the Set A. The first RRC parameter may configure/indicate a plurality of first reference signals (e.g., CSI-RSs or SSBs) associated with/corresponding to the Set A. The first RRC parameter may configure/indicate a plurality of first reference signals may indicate/configure resources/a resource set (e.g., indexes or IDs) of the plurality of first reference signals.

For example, a second RRC parameter (e.g., a second CSI-ResourceConfigId, a second CSI-ResourceConfig, a second CSI-ReportConfigId, or a second CSI-ResourceConfig) may configure/indicate the Set B. The second RRC parameter may configure/indicate a plurality of second reference signals (e.g., CSI-RSs or SSBs) associated with/corresponding to the Set B. The second RRC parameter may configure/indicate a plurality of second reference signals may indicate/configure resources/a resource set (e.g., indexes or IDs) of the plurality of second reference signals.

For example, the first RRC parameter and the second RRC parameter may be the same. The first RRC parameter and the second RRC parameter may be different (e.g., two separate RRC parameters). For example, for a UE-sided model for inference, when (if, in case of, or based on) the plurality of first reference signals (e.g., Set A) and the plurality of second reference signals (e.g., Set B) are configured within CSI report configuration (e.g., using RRC IE/parameter CSI-ResourceConfig), two RRC IEs/parameters of CSI-ResourceConfigId (e.g., CSI-ResourceConfigIds) are configured for the Set A and the Set B separately.

In an example, the associated ID may associate, regarding network-side (additional) conditions, multiple configurations on reference signals for the model. The associated ID may associate, regarding the network-side (additional) conditions, reference signals for the model. The wireless device may assume consistency of network-side (additional) conditions across model training and model inference, based on a same associated ID indicated for the model training and the model inference. For example, the wireless device may receive a first associated ID indicated (e.g., via a MAC CE or an RRC message) for the model training. The wireless device may receive a second associated ID indicated (e.g., via a MAC CE or an RRC message) for the model inference. The wireless device may determine/assume/consider, based on determining the third associated ID being the same as the fourth associated ID the consistency of the network-side additional conditions. Regarding the associated ID, the wireless device may assume/determine/consider that NW-side additional conditions with the same associated ID are consistent at least within a cell.

In an example, the associated ID may be a local ID that is unique within a cell or a cell group (e.g., a configured/predefined group of cells, a tracking area or a location area). Alternatively, the associated ID may be a global ID that is unique over cells. The associated ID may be associated with a model ID or a functionality.

In an example, the network (e.g., the base station) may transmit, to the wireless device, an indication of an associated ID. One or more configuration parameters configuring/indicating reference signals (e.g., comprising a first group of reference signals and a second of reference signals) for a model/functionality may comprise the associated ID. The base station may transmit the indication of the associated ID, via a control information (e.g., an RRC message comprising the one or more configuration parameters, a MAC CE, or a DCI). The associated ID may be associated with an ID of the model and/or the functionality (e.g., identified by an ID of the functionality or a name of the functionality). The wireless device may determine, based on the control information, the associated ID. The wireless device may assume, based on the (same) associated ID, that the first group of reference signals and the second group of reference signals are transmitted (by the base station) under the same NW-side (additional) conditions (e.g., beam pattern). The wireless device may collect data for the model/functionality, using measurements on the first group of reference signals and the second group of reference signals, based on the (same) associated ID.

In an example, the wireless device may receive the one or more first reference signals. The wireless device may determine, based on the one or more configuration parameters, the associated ID (e.g., associated ID #1) corresponding to the one or more first reference signals.

In an example, the wireless device may perform data collection for the model/functionality. The data collection may be referred to as collecting data. The data collection may be based on measurements on reference signals. The data collection may comprise generating a dataset, based on collected data. For example, the dataset may comprise a plurality of (collected) data samples. The wireless device may generate/create, based on one or more measurements of the measurements, a data sample.

In an example, data collection may be for a network-side model/functionality or a UE-side mode/functionality. For the UE-side mode/functionality, the wireless device may determine, based on an associated ID and the functionality (feature name or ID), a corresponding model of the functionality. The wireless device may perform the data collection for the model (e.g., model training and/or model inference).

In an example, the wireless device may collect data (e.g., based on measurements on the one or more first reference signals and the one or more third reference signals) corresponding to the associated ID (e.g., associated ID #1).

For example, the model/functionality may be for beam prediction. In a procedure of the data collection, the wireless device may receive, from the base station, the one or more configuration parameters configuring/indicating first reference signals for Set A beams and second reference signals for Set B of beams. The wireless device may receive the first reference signals and the second reference signals. The wireless device may measure L1-RSRPs of the first reference signals and the second reference signals. The dataset may comprise the L1-RSRPs (with post-processing and/or quantization) and corresponding beam indexes (e.g., indexes/IDs of reference signals associated with the beam indexes).

In an example, the wireless device may receive one or more second reference signals with an associated ID #2. The wireless device may not collect data, for the model/functionality corresponding to the associated ID #1 that is different from the associated ID #2, by using measurements on the one or more second reference signals.

For example, the one or more first reference signals may be for model training of the model, and the one or more third reference signals may be for model inference of the model. The wireless device may receive, from the base station, one or more first configuration parameters indicating/configurating the one or more first reference signals and the associated ID #1. The wireless device may perform, for the model training and based on measurements on the one or more first reference signals (e.g., for both Set of A beams and Set B of beams), data collection. The wireless device or the server may train the model, using the dataset generated during/after the data collection. The wireless device may receive, from the base station, one or more second configuration parameters indicating/configurating the one or more third reference signals and the associated ID #1. The wireless device may perform, for the model inference and based on measurements on the one or more third reference signals (e.g., for the Set B beams), data collection. The wireless device may perform the model inference, using measurements on the one or more third reference signals (e.g., for Set B of beams) as input of the model (inference). Output of the model (inference) may comprise one or more predicted beams in/among/from the Set A of beams and/or corresponding one or more RSRPs.

For example, the one or more first reference signals may be for model training of the model. The one or more third reference signals may be also for model training of the model. The wireless device may receive, from the base station, one or more first configuration parameters indicating/configurating the one or more first reference signals, the one or more third reference signals, and the associated ID #1. The associated ID #1 may associate the one or more first reference signals and the one or more third reference signals, for the model training. The wireless device may receive the one or more first reference signals. The wireless device may perform, based on measurements on the one or more first reference signals (e.g., for both Set A of beams and Set B of beams), first data collection corresponding to the associated ID #1. The wireless device may train the model, using a dataset generated based on/during/after the first data collection. The wireless device may receive the one or more third reference signals. The wireless device may perform, based on measurements on the one or more third reference signals (e.g., for both Set A of beams and Set B of beams), second data collection corresponding to the associated ID #1. The wireless device may update the dataset. The wireless device may train or update the model, using the updated dataset. The wireless device may not use, for the model training or the model inference of the model (e.g., corresponding to/associated with the associated ID #1), measurements on one or more reference signals corresponding to an associated ID #2 that is different from the associated ID #1.

In an example, the wireless device may generate the dataset, during or after the data collection. The dataset is based on the measurements on the first one or more reference signals and/or the one or more third reference signals. The dataset is for model training or model inference. The wireless device may store the dataset. The wireless device may transfer/transmit/deliver, to the base station/an OAM/a server, the dataset. The wireless device, the base station, the OAM, or the server may perform model training (e.g., develop/train/update the model), based on the dataset corresponding to the associated ID #1.

In an example, the wireless device may report information of the model corresponding to the associated ID #1. The network (e.g., the base station) may determine/assign an ID of the model (e.g., a model ID), based on the associated ID #1. The network may indicate the model ID to the wireless device. Alternatively, the wireless device may determine the model ID. The wireless device may report the model ID to the network. Alternatively, the wireless device and the network may determine/assume/consider the model ID is the same as or provided by the associated ID #1. Alternatively, pre-defined rules may define a relationship between the associated ID #1 and the model ID. For example, the model ID is a combination of the associated ID #1, (a part of) a global cell (GCI) ID, and (a part of) a public land mobile network (PLMN) ID.

In an example, data collection may be a process/procedure of collecting data by a network node/devices (e.g., a base station, an OAM, or an LMF), a management entity, or the wireless device for the purpose of model training, data analytics, model inference, and/or performance monitoring.

In an example, the data collection may be performed for different purposes in LCM, e.g., model training, model inference, model monitoring, model selection, and model update. The data collection may be a function that provides input data to model training, model management, and model inference. The data collection may comprise generating, based on measurements on one or more (downlink, uplink, or sidelink) reference signals, a dataset. The dataset may be for model training or model inference.

In an example, for data collection for UE-side model training, the wireless device may collect training data. The wireless device may receive and measure reference signals. The training data may be based on measurements on the reference signals. The wireless device may transfer/deliver/transmit the training data to a server (e.g., an over-the-top (OTT) server). The wireless device may transfer/deliver/transmit the training data to a core network. The core network may transfer/deliver/transmit the training data to the server. The wireless device may transfer/deliver/transmit the training data to an OAM. The OAM may transfer/deliver/transmit the training data to the server. The wireless device, the core network, the OAM, or the server may generate a dataset or update an existing dataset, by using the training data.

In an example, the wireless device may receive one or more messages (e.g., RRC messages) comprising one or more parameters indicating measurement configuration for AI/ML-enabled features/feature groups for data collection and logging of measurements. The base station (or network) may (explicitly) configure the wireless device whether the corresponding data collection and logging (if supported) should be immediately started.

In an example, the wireless device may store logged training data at an AS layer (of the wireless device) with a minimum AS layer memory size supported by the wireless device. For example, the wireless device may report the memory size as a UE capability.

In an example, based on reaching buffer limitation (e.g., the memory size), the wireless device may stop/skip/terminate measurement for data collection purposes and logging.

In an example, the wireless device may control/determine measurements for data collection purposes and logging, based on a power state of the wireless device. The wireless device may stop autonomously (e.g., without reporting to the network) or the wireless device may report to the network. For example, the wireless device may transmit a report triggered by an AS buffer event (e.g., reaching buffer limitation). The report may comprise (e.g., contain or include) availability indication or a full report (e.g., an amount/percentage of remaining memory).

In an example, the wireless device may perform data collection/logging trigger by an event. The wireless device may receive, from the network, an on-demand request for the data collection (e.g., via a DCI, a MAC CE, and/or an RRC message).

In an example, the wireless device may transmit a data collection report via an SRB other than an SRB1 (e.g., an SRB2). The wireless device may not transmit the data collection report via the SRB1.

In an example, model training may be a procedure or process to train the model in a data driven manner and to obtain the model trained for inference. Training the model may be referred to as model training of the model. A device (e.g., the wireless device, the base station, or a server) may train the model by using a training dataset. The training dataset may be a first subset of the dataset.

In an example, validating the model (e.g., model validation) may be a subprocess of the model training. A purpose of the model validation may be to evaluate a quality (e.g., accuracy) of the model. The device may validate the model, using a validation dataset. The validation dataset may be a second subset of the dataset. The validating the model may comprise evaluating, using the validation dataset, a validation metric of the model. The validation metric may comprise prediction accuracy, precision, recall, F1-score, mean squared error (MSE), and area under the receiver operating characteristic curve (AUC-ROC). the validating the model comprises comparing the validation metric of the model with the validation threshold. The model may be validated/valid, based on the validation metric of the model being higher than the validation threshold. The wireless device may receive, from the server (the base station or the OAM) that trains the model, an indication indicating whether the model is validated/valid.

In an example, additional conditions may comprise aspects that are assumed for the model training or model inference and are not a part of user equipment (UE) capability. For example, the wireless device may not report, via the UE capability, the additional conditions. The additional conditions may comprise the network-side (additional) conditions and UE-side (additional) conditions. The network-side (additional) conditions may comprise logical characteristics of downlink beams and physical characteristics of downlink beams. The logical characteristics of downlink beams may comprise Set B and Set A indexing/ordering across the model training and the model inference. The physical characteristics of downlink beams may comprise beam pattern/shape of Set B beams and Set A beams across the model training and the model inference.

In an example, the base station may not implicitly disclose, to the wireless device, the network-side (additional) conditions. The base station may indicate an associated ID representing/corresponding to/associated with the network-side (additional) conditions.

For example, when the base station transmits reference signals using a first beam pattern, the base station may indicate, via one or more configuration parameters that configure/indicate the reference signals, a first associated ID corresponding to the first beam pattern (e.g., with narrow beams). The wireless device may receive the reference signals. The wireless device may perform data collection (e.g., for model training and/or model inference) corresponding to the first associated ID.

For example, the network-side (additional) conditions may change (e.g., from original network-side (additional) conditions (e.g., represented by/corresponding to the first associated ID) to changed network-side (additional) conditions). For example, the base station may change, for transmitting the reference signals, from the first beam pattern to a second beam pattern (e.g., with coarse/wide beams). The base station may indicate a second associated ID corresponding to/representing the changed network-side (additional) conditions. The wireless device may receive the reference signals, under the changed network-side (additional) conditions. The wireless device may not use measurements on the reference signals under the changed network-side (additional) conditions, for data collection corresponding to the original network-side (additional) conditions (e.g., corresponding to the first associated ID).

In an example, the wireless device may assume/determine/consider/expect network-side additional conditions with a same associated ID being consistent at least within a (serving) cell. The wireless device may assume/determine/consider/expect network-side additional conditions with a (same) associated ID being consistent within a plurality of (serving) cells (e.g., based on receiving, from the base station, one or more messages comprising one or more configurations parameters indicating/configuring the associated ID and information related to the plurality of cells).

In an example, for a model (e.g., UE-sided model), for quantization of a RSRP value at least for a report of inference results, the report may comprise (e.g., include) differential RSRPs with a quantization step and a range for L1-RSRP reporting. For the BM-Case 1, the differential RSRPs may be among multiple beams. For the BM-Case 2, the differential RSRPs may be among multiple beams over multiple time instances.

In an example, for a model (e.g., for a UE-sided model at least for BM Case-1 and/or for inference results report), the wireless device may receive, from the base station, one or more messages comprising one or more configuration parameters indicating CSI report configuration for a report (e.g., of inference results or performance monitoring). For example, the CSI report configuration may comprise/indicate two resource sets configured for Set A and Set B separately. For example, the CSI report configuration may comprise/indicate (only) a resource set configured for Set B. The wireless device may perform measurement on the resource set for Set B for inference (by/of the model). The wireless device may not be expected or may not expect to measure the resource set for Set A for the inference. Beam information in the report (e.g., inference report) may refer to the resource set for Set A.

In an example, for a model (e.g., for a UE-sided model at least for BM Case-1 and/or for inference results report), the wireless device may receive, from the base station, one or more messages comprising one or more configuration parameters indicating/configuring one or more (e.g., N) future time instances (e.g., for inference or for performance monitoring). The one or more configuration parameters may further indicate/configure a reference time for the one or more future time instances.

Figure 20:
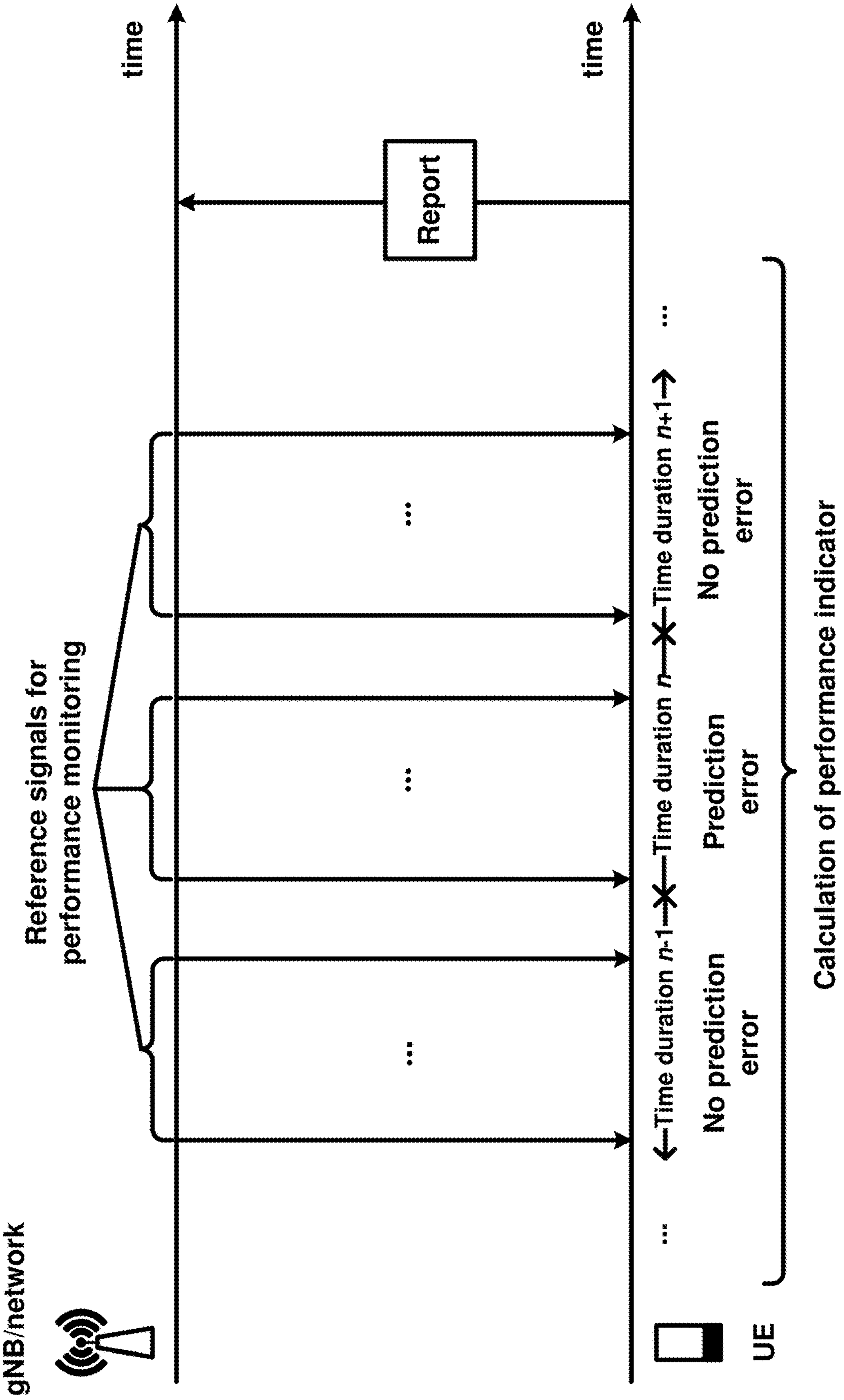
FIG. 20 illustrates an aspect of an example embodiment according to the present disclosure.

FIG. 20 illustrates an example of performance monitoring for a model as per an aspect of an embodiment of the present disclosure.

In an example, the wireless device may receive, from the base station, one or more messages (e.g., RRC messages) comprising one or more configuration parameters (e.g., one or more RRC IEs/parameters of CSI-ReportConfig, and/or one or more RRC IEs/parameters of CSI-ResourceConfig) for performance monitoring of a model (e.g., one or more models). The configuration parameters may indicate a counter, a time window, and/or a plurality of time durations. The configuration parameters may indicate reference signals (for the performance monitoring) in a time duration within the time window or of the plurality of time durations. For example, the configuration parameters may indicate a starting time of the time window. The configuration parameters may indicate an ending time of the time window or a length of the time window (e.g., a quantity/number of time durations). The configuration parameters may indicate a performance metric (e.g., beam prediction accuracy or RSRP difference).

In an example, the wireless device may transmit, to the base station and via L1 signaling, a monitoring result report (e.g., a CSI report carrying the monitoring result). For example, the wireless device may transmit the monitoring result report, based on the configuration parameters indicating a report quantity of/associated with the monitoring result. For example, the monitoring result may comprise (e.g., be) a performance indicator (a performance metric, or a performance metric value).

In an example, resource set(s) for monitoring and report configuration for monitoring may be configured (when applicable) within CSI report configuration (e.g., using one or more RRC IEs/parameters of CSI-ReportConfig) used for inference. The wireless device may measure the resource set(s) for monitoring. The resource set(s) may comprise resources of the plurality of third reference signals. The resources of the plurality of third reference signals may comprise a part of or all of the resource set(s). The resource set(s) may be associated with the plurality of third reference signals.

In an example, the resource set(s) that is dedicated for monitoring may be configured in a dedicated CSI report configuration (e.g., a first RRC IE/parameter of CSI-ReportConfig) used for monitoring. For example, dedicated resource set(s) for monitoring may refer to the resource set(s) that is dedicated for monitoring. The dedicated report configuration may be used for monitoring links to an inference report configuration. The wireless device may measure the resource set(s) for monitoring. For example, the first RRC IE/parameter of CSI-ReportConfig may configure (or indicate) the resource set(s) for monitoring. The first RRC IE/parameter of CSI-ReportConfig may comprise (e.g., include, indicate, or configure) an ID (e.g., identification or identifier) of an inference report configuration (e.g., a second RRC IE/parameter of CSI-ReportConfig), to link the inference report configuration and monitoring report configuration. For example, the ID of the inference report configuration may comprise (e.g., be) an RRC IE/parameter of CSI-ReportConfigId indicating (e.g., linking to) the second RRC IE/parameter of CSI-ReportConfig).

In an example, in a first time duration (e.g., a time duration n in FIG. 20), the wireless device may determine whether that one or more prediction results of the model match/align with measurements on the reference signals. For example, the wireless device may determine a prediction error (e.g., incorrect prediction, false prediction, or inaccurate prediction) in a time duration (e.g., time duration n in FIG. 20), based on (e.g., if) that the one or more prediction results do not match/align with the measurements on the reference signals. For example, the wireless device may determine no prediction error (e.g., correct prediction, true prediction, or accurate prediction) in a time duration (e.g., time duration n−1 and time duration n+1 in FIG. 20), based on (e.g., if) that the one or more prediction results match/align with the measurements on the reference signals.

In the present disclosure, terminologies "no prediction error", "prediction without error", "correct prediction", "true prediction", and "accurate prediction" may be used interchangeably. Terminologies "prediction error", "prediction with an error", "incorrect prediction", "false prediction", and "inaccurate prediction" may be used interchangeably.

In an example, the wireless device may determine (e.g., calculate or compute) a one-shot performance indicator (e.g., performance metric value or value of performance metric), based on (e.g., by using) a determination in one time duration (e.g., the first time duration). The wireless device may determine (e.g., calculate or compute) a statistical performance indicator (e.g., performance metric value or value of performance metric), based on (e.g., by using) a plurality of determinations within the time window or during the plurality of time durations comprising the first time duration (e.g., comprising time duration n−1, time duration n, and time duration n+1 in FIG. 20).

In an example, the statistical performance indicator may comprise Top 1 or Top K beam prediction accuracy. A quantity of the plurality of determinations is N. Among the plurality of determinations, the wireless device may determine $N_F$ false predictions, where $N_F$ is greater than or equal to 0 and $N_F$ is less than or equal to N. The wireless device may determine $N_T$ (e.g., $N_T$=N−$N_F$) true predictions. The wireless device may determine the beam prediction accuracy as $N_T$/N. For example, in a starting time duration of the plurality of time durations, the wireless device may set $N_F$ and $N_T$ to 0. In each time duration, based on determining a false prediction (e.g., if the wireless device determines a prediction error), the wireless device may increment $N_F$ by 1. In each time duration, based on (e.g., if) determining a true prediction (e.g., if the wireless device determines a prediction without error), the wireless device may increment $N_T$ by 1.

In an example, the wireless device may report, to the base station, (e.g., transmit a report indicating/comprising) a performance indicator (e.g., the one-shot performance indicator and/or the statistical performance indicator). The wireless device may transmit a report indicating/comprising the performance indicator (e.g., the one-shot performance indicator and/or the statistical performance indicator), via a UCI on a PUCCH or a PUSCH, a MAC CE on a PUSCH, or an RRC message on a PUSCH. The report may be referred to as a performance monitoring report or a report for the performance monitoring of the model.

In an example, an AI based report (e.g., AI/ML based report) may refer to a report carrying one or more inference results (e.g., prediction results) of an AI model and/or one or more performance indicators for performance monitoring of an AI model (e.g., the report in FIG. 20). The AI based report is different from a first CSI report carrying CSI determined (e.g., calculated) without using an AI model. A purpose of the first CSI report may be reporting the CSI to the base station. A purpose of the AI based report may be reporting, for one or more AI models, inference results and/or performance monitoring results.

For example, the wireless device may receive one or more first configuration parameters (e.g., a first RRC IE/parameter CSI-ReportConfig) indicating the first CSI report. The wireless device may receive one or more second configuration parameters (e.g., a second RRC IE/parameter CSI-ReportConfig) indicating the AI based report.

A third RRC IE/parameter CSI-ReportConfig in (e.g., indicated by or linked to) the first RRC IE/parameter CSI-ReportConfig may indicate resources/indexes of CSI-RSs and/or SSBs for the CSI report. A fourth RRC IE/parameter CSI-ReportConfig in (e.g., indicated by or linked to) the second RRC IE/parameter CSI-ReportConfig may indicate resources of a Set B and/or a Set A (e.g., full Set A or a subset of Set A) for the AI based report. The resources of a Set B and/or a Set A may comprise resources of CSI-RSs and SSBs.

The first RRC IE/parameter CSI-ReportConfig may indicate a first report quantity (e.g., reporting contents in the first CSI report) comprising one or more of L1-RSRP, CRI, RI, LI, PMI, CQI, and SSBRI. The second RRC IE/parameter CSI-ReportConfig may indicate a second report quantity (e.g., reporting contents in the AI based report) comprising one or more of predicted beam indexes (e.g., Top 1 beam or Top K beams in form of CRI or SSBRI), predicted RSRPs and performance indicators (e.g., beam prediction accuracy or RSRP difference).

The wireless device may determine (e.g., calculate) the first report quantity based on (e.g., by calculating) measurements on the CSI-RSs and/or SSBs for the CSI report. Determining/calculation of the first report quantity may not be based on (e.g., using) any AI model. The wireless device may determine (e.g., calculate) the first report quantity based on (e.g., by using) measurements on a Set B of reference signals and model inference using the AI model. The wireless device may use the measurements on the Set B of reference signals (e.g., with or without quantization/preprocessing) as inputs of the model inference. The second report quantity may comprise one or more inference results (e.g., predicted beam indexes and/or predicted RSRPs) of the model inference. The wireless device may determine (e.g., calculate) one or more performance indicators based on (e.g., by comparing) the one or more inference results and measurements on a Set C of reference signals (e.g., where the Set C of reference signals is the same as a Set A of reference signals or the Set C is a subset of the Set A) for the performance monitoring. The second report quantity may comprise the one or more performance indicators.

In an example, the wireless device or the base station/network may determine performance of a first model being good/high, based on (e.g., if) a performance indicator of the first model being higher than (or equal to) a first threshold. The first model with a good performance may be ready for the wireless device or the base station/network to use for model inference (e.g., beam prediction).

In an example, the wireless device or the base station/network may determine performance of a second model being poor/low, based on (e.g., if) a performance indicator of the second model being lower than (or equal to) a second threshold. The second model with a poor performance may not be ready for the wireless device or the base station/network to use for model inference (e.g., beam prediction).

In an example, the first threshold may be predefined or configured. The second threshold may be predefined or configured. The first threshold and the second threshold may be the same or different.

Figure 21:
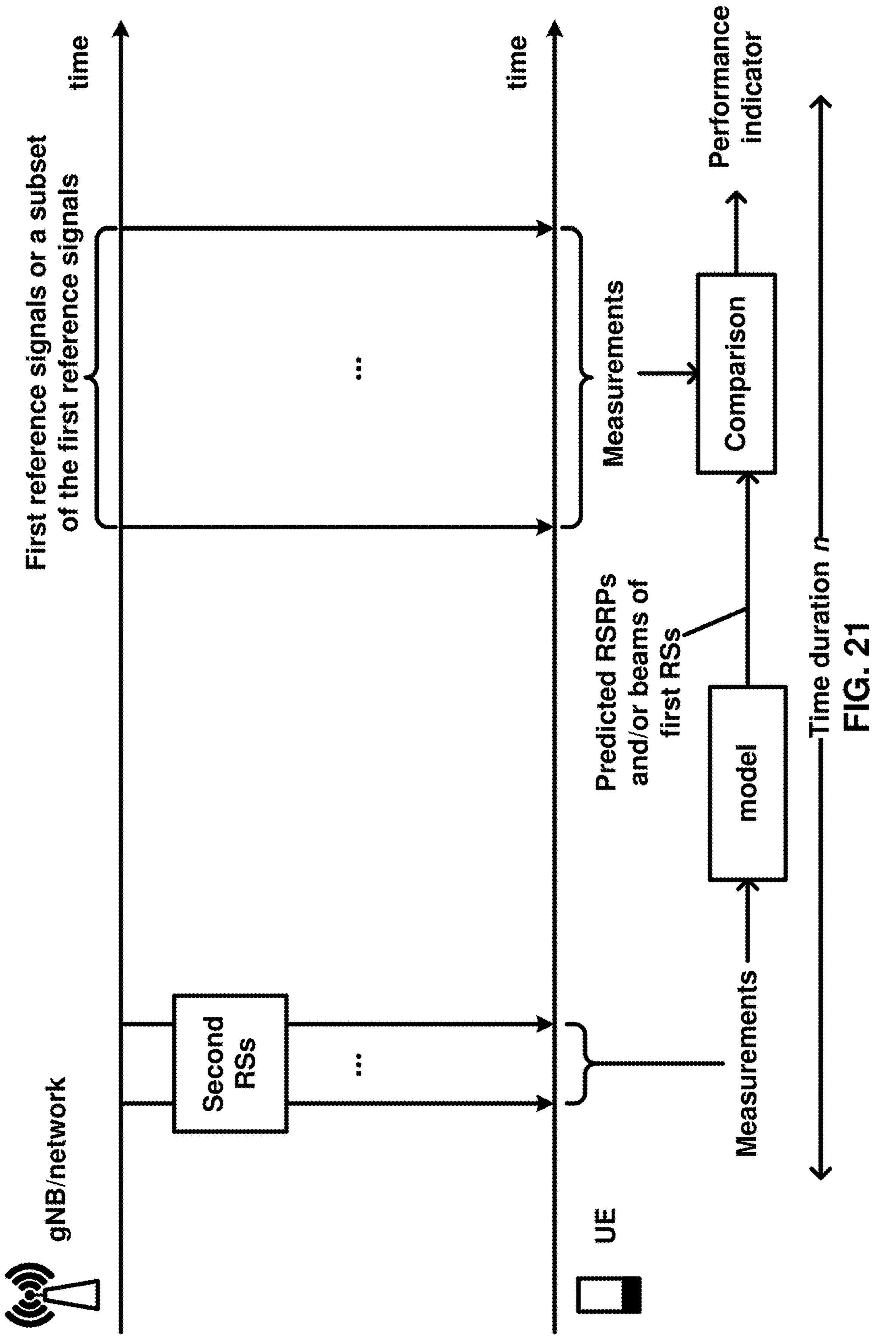
FIG. 21 illustrates an aspect of an example embodiment according to the present disclosure.

FIG. 21 illustrates an example of performance monitoring for a model as per an aspect of an embodiment of the present disclosure.

In an example, the wireless device may determine, in a time duration (e.g., time duration n), whether one or more prediction results of the model matching one or more measurement results. For example, the reference signals may comprise third reference signals and second reference signals (e.g., configured for performance monitoring). The wireless device may receive, from the base station, the second reference signals. The wireless device may measure RSRPs (e.g., L1-RSRPs) of the second reference signals. The wireless device may determine, based on the model and the RSRPs of the second reference signals (e.g., by performing inference of the model using the RSRPs of the second reference signals as input), the one or more prediction results. The one or more prediction results may comprise one or more beams (or corresponding beam indexes) in a Set A of beams (e.g., one or more reference signal resource indexes (e.g., CRI or SSBRI) associated with the one or more beams) and one or more predicted RSRPs associated with the one or more beams.

In an example, the wireless device may receive, from the base station, the third reference signals. The wireless device may measure RSRPs (e.g., L1-RSRPs) of the third reference signals. The wireless device may compare the RSRPs of the third reference signals with the one or more predicted RSRPs. The wireless device may determine (e.g., compute or calculate) a performance indicator, based on comparison between the RSRPs of the third reference signals and the one or more predicted RSRPs (e.g., by comparing the RSRPs of the third reference signals with the one or more predicted RSRPs).

In an example, the wireless device may determine (e.g., obtain and/or store) a sample, in the time duration n. The sample is for the performance monitoring. The sample may comprise (e.g., include or consist of) prediction results (e.g., the one or more predicted RSRPs) and measurement results (e.g., measurements of the third reference signals). The sample may comprise (e.g., include or consist of) predicted RSRPs and corresponding beam indexes (e.g., associated reference signal resource index/identifier such as CRI or SSBRI), and measured RSRPs (e.g., L1-RSRPs) and corresponding beam indexes (e.g., associated reference signal resource index/identifier such as CRI or SSBRI). A sample may be valid/complete or invalid/incomplete for performance monitoring, model training, or model inference.

Figure 22:
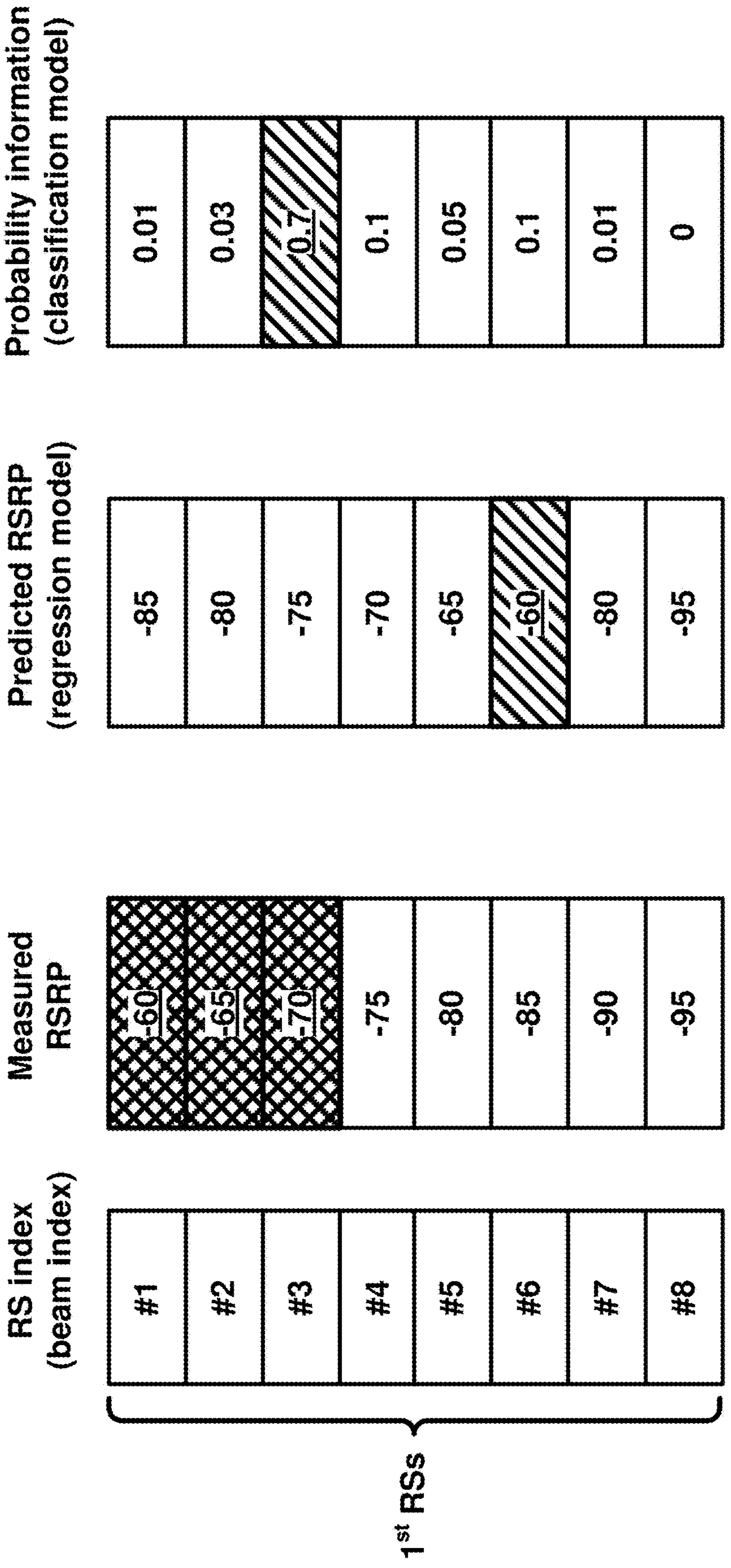
FIG. 22 illustrates an aspect of an example embodiment according to the present disclosure.

FIG. 22 illustrates an example of performance monitoring for a model as per an aspect of an embodiment of the present disclosure.

In an example (referring to FIG. 20), the wireless device may determine, based on matchings in the plurality of time durations, the performance indicator. Referring to FIG. 21 and FIG. 22, the wireless device may determine, based on comparison of one or more RSRPs of the third reference signals (RSs) and one or more predicted RSRPs (e.g., by comparing one or more RSRPs of the third reference signals with the one or more predicted RSRPs), matching of the one or more prediction results and the one or more measurement results in the time duration n. The first RSs may correspond to/be associated with a Set A of beams (or a Set C of beams). For example, the wireless device may determine Top K (e.g., K=3) beams with highest RSRPs (e.g., among the RSRPs/L1-RSRPs of the first RSs). RS indexes corresponding to the Top K beams with the highest RSRPs are #1, #2, and #3. The wireless device may determine a Top 1 beam with a highest predicted RSRP (e.g., among the predicted RSRPs of the first RSs) or a highest probability (e.g., among probabilities associated with the first RSs). A probability may refer to a probability value or probability information, as output of inference of the prediction model.

For example, a first RS index corresponding to the Top 1 beam with the highest predicted RSRP is #6, where the prediction model is a regression model. The RS indexes corresponding to the Top K beams with the highest RSRPs (e.g., #1, #2, and #3) do not comprise/include the first RS index (corresponding to the Top 1 beam with the highest predicted RSRP) (e.g., #6). The wireless device may determine, based on (e.g., if) the Top K beams with the highest RSRPs not comprising the Top 1 beam with the highest predicted RSRP, a prediction error (false prediction, inaccurate prediction, or incorrect prediction) of the prediction model in the time duration n.

For example, a second RS index corresponding to the Top 1 beam with the highest predicted RSRP is #3, where the prediction model is a classification model. The RS indexes corresponding to the Top K beams with the highest RSRPs (e.g., #1, #2, and #3) comprise/include the second RS index (corresponding to the Top 1 beam with the highest probability) (e.g., #3). The wireless device may determine, based on (e.g., if) the Top K beams with the highest RSRPs comprising the Top 1 beam with the highest probability, a prediction success (true prediction, accurate prediction, or correct prediction) of the prediction model in the time duration n.

Figure 23:
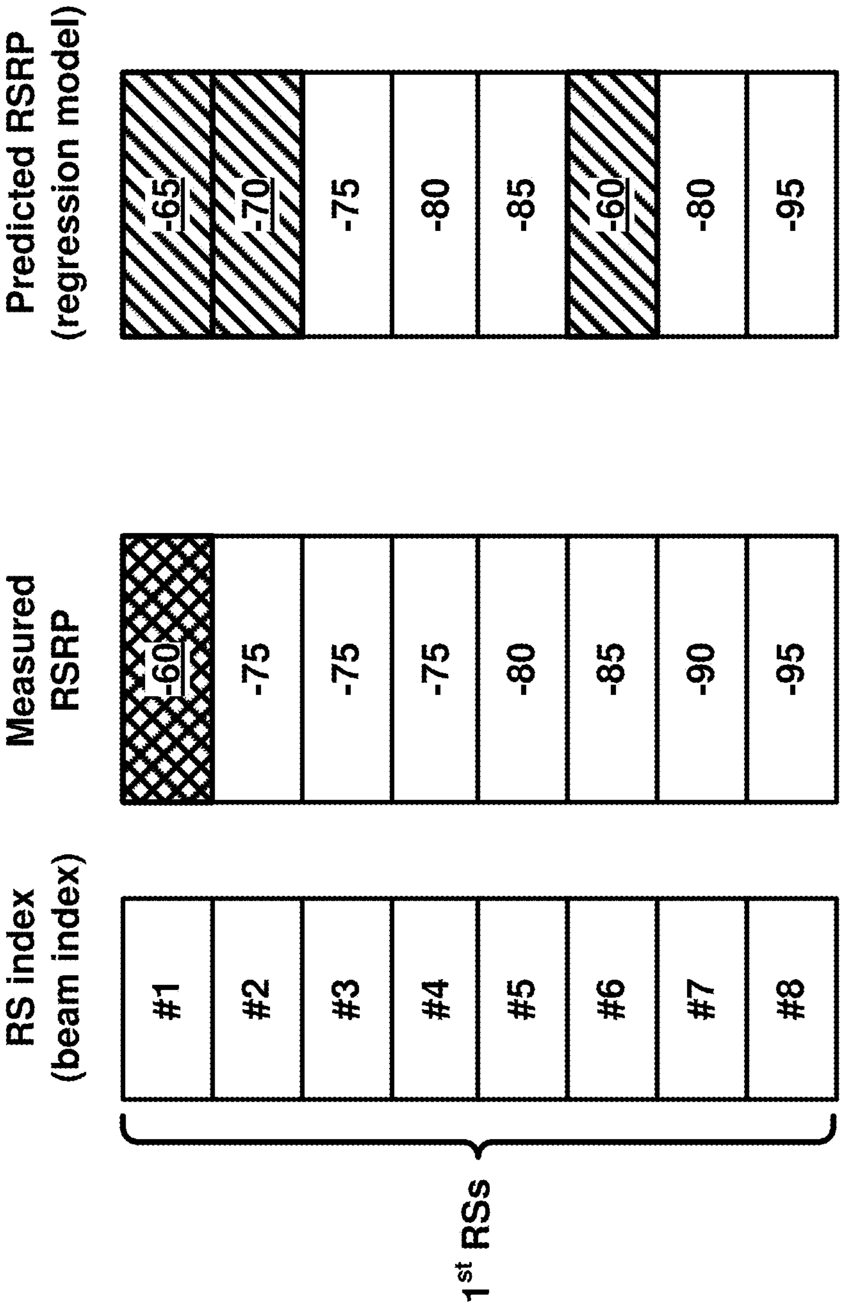
FIG. 23 illustrates an aspect of an example embodiment according to the present disclosure.

FIG. 23 illustrates an example of performance monitoring for a model as per an aspect of an embodiment of the present disclosure.

Referring to FIG. 21 and FIG. 23, the wireless device may determine, based on comparison of the one or more RSRPs of the first reference signals (RSs) and the one or more predicted RSRPs (e.g., by comparing the one or more RSRPs of the third RSs with the one or more predicted RSRPs), matching of the one or more prediction results and the one or more measurement results in the time duration n. For example, the wireless device may determine Top 1 beam with a highest RSRP (e.g., among the RSRPs/L1-RSRPs of the first RSs). A third RS index corresponding to the Top 1 beam with the highest RSRPs is #1. The wireless device may determine Top K beams with highest predicted RSRPs (e.g., among the predicted RSRPs of the first RSs). RS indexes corresponding to the Top K beams are #1, #2, and #6. The RS indexes corresponding to the Top K beams with the highest predicted RSRPs (e.g., #1, #2, and #6) comprise/include the Top 1 beam with the highest RSRP (e.g., #1). The wireless device may determine, based on (e.g., if) the Top K beams with the highest precited RSRPs comprising the Top 1 beam with the highest RSRP, a prediction success (true prediction, accurate prediction, or correct prediction) of the prediction model in the time duration n.

Figure 24:
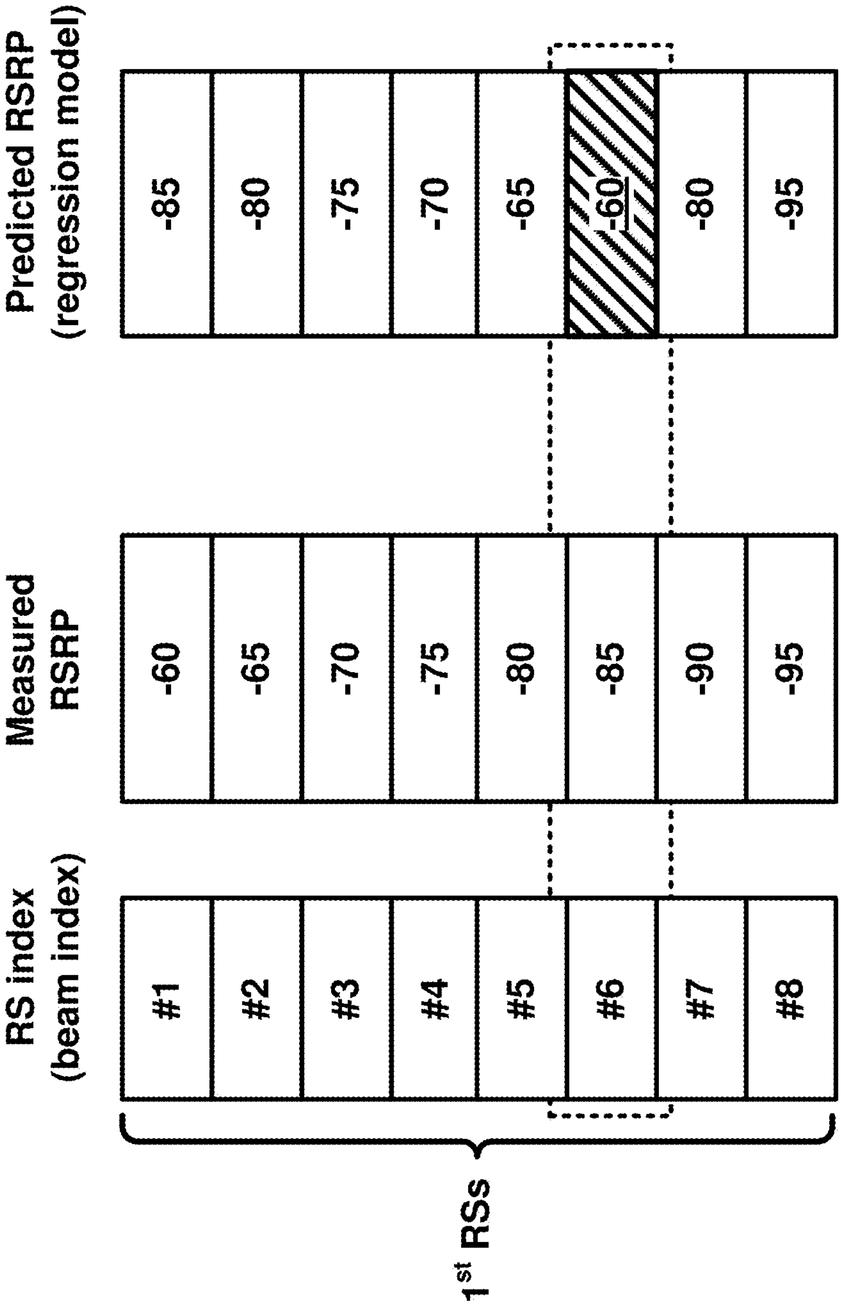
FIG. 24 illustrates an aspect of an example embodiment according to the present disclosure.

FIG. 24 illustrates an example of performance monitoring for a model as per an aspect of an embodiment of the present disclosure.

Referring to FIG. 21 and FIG. 23, the wireless device may determine, based on comparison of the one or more RSRPs of the first RSs and the one or more predicted RSRPs (e.g., by comparing the one or more RSRPs of the third RSs and the one or more predicted RSRPs), matching of the one or more prediction results and the one or more measurement results in the time duration n. For example, the wireless device may determine Top 1 beam with a highest predicted RSRP (e.g., among the predicted RSRPs of the first RSs). The highest predicted RSRP is −60 (dBm) and a corresponding RS index is #6. The wireless device may compare the highest predicted RSRP with a (measured) fourth RSRP (e.g., L1-RSRP) of a RS #6. The fourth RSRP of the RS #6 is −85 (dBm). The fourth RSRP of the RS #6 is among the RSRPs of the first RSs. The wireless device may determine, based on a difference between the highest predicted RSRP and the fourth RSRP, whether a prediction success (true prediction, accurate prediction, or correct prediction) or a prediction error (false prediction, inaccurate prediction, or incorrect prediction), of the prediction model in the time duration n. For example, the wireless device may determine, based on (e.g., if) the difference between the highest predicted RSRP and the fourth RSRP being greater than a threshold, the prediction error (false prediction, inaccurate prediction, or incorrect prediction), of the prediction model in the time duration n. The threshold may be predefined or configured (e.g., by the one or more configuration parameters in the one or more messages).

Figure 25:
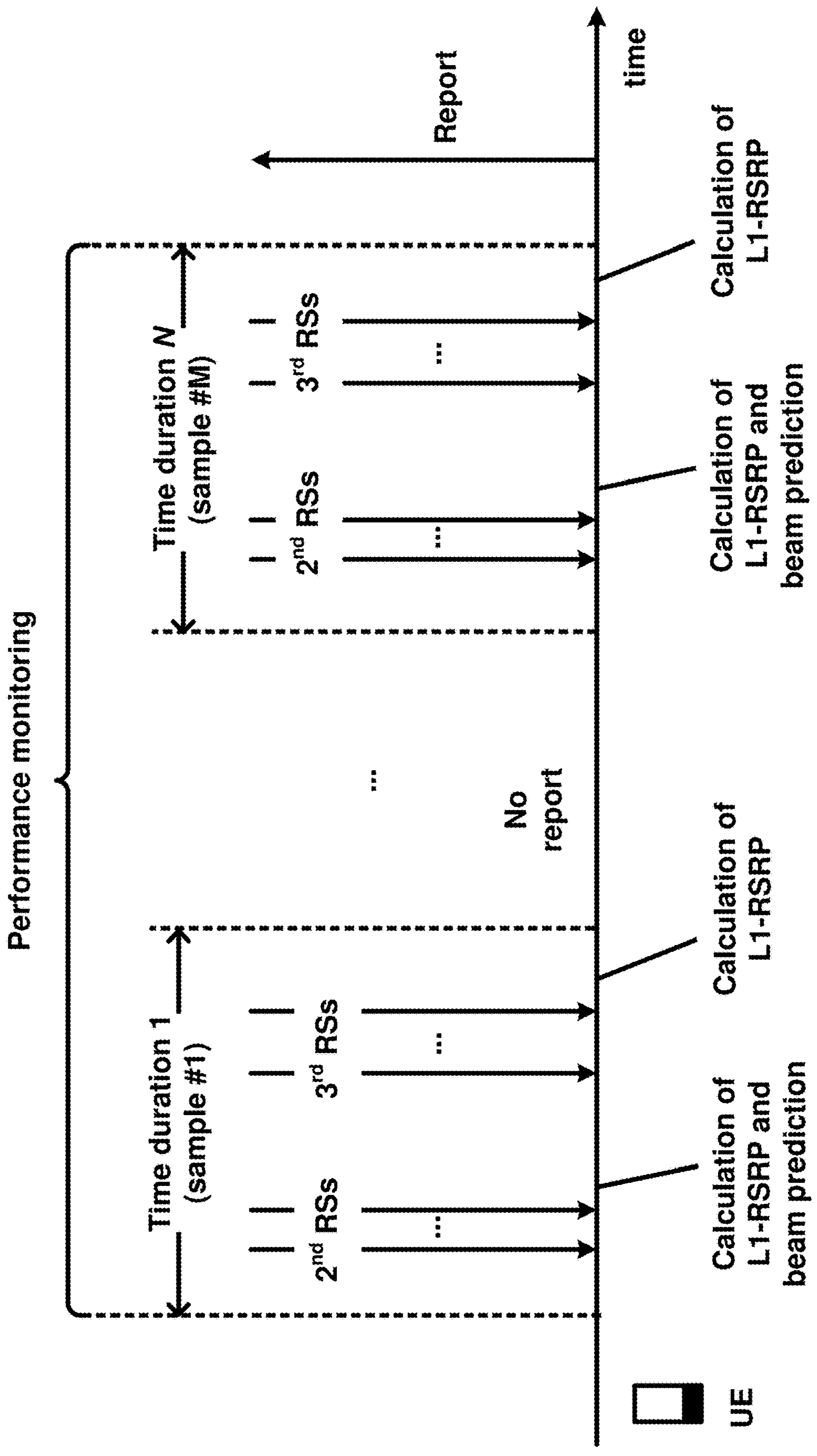
FIG. 25 illustrates an aspect of an example embodiment according to the present disclosure.

FIG. 25 illustrates an example of performance monitoring of a model as per an aspect of an embodiment of the present disclosure.

Referring to FIG. 20 and FIG. 21, the wireless device may perform performance monitoring on one or more AI models (e.g., associated with an AI functionality) during one or more time durations (e.g., N time durations in FIG. 25). The wireless device may determine (e.g., obtain or have) M samples for the performance monitoring. In a (e.g., each) time duration of the plurality of time durations (e.g., time duration 1 or time duration N in FIG. 25), the wireless device may receive (and/or measure) second reference signals (RSs) (e.g., reference signals of/associated with the Set B, one or more second RSs, a plurality of second RSs). The wireless device may determine (e.g., calculate) first L1-RSRPs based on (e.g., by using) measurement on the second RSs. The wireless device may determine beam prediction (e.g., beam prediction results comprising predicted beam indexes and predicted RSRPs) based on the first L1-RSRPs and (model inference of) an AI model of the one or more AI models (e.g., by performing model inference of the AI model, using the first L1-RSRPs as inputs). The wireless device may determine (e.g., obtain) the first L1-RSRPs (with or without quantization/preprocessing) as inputs of model inference of the AI model. The wireless device may determine (e.g., obtain) the beam prediction (as outputs of the model inference) by performing the model inference.

The wireless device may receive (and/or measure) third RSs (e.g., reference signals of/associated with the Set C, one or more third RSs, a plurality of third RSs). The Set C may be a subset of Set A. The Set C may be the same as the Set A. The Set C may be a proper subset of Set A. The wireless device may determine (e.g., calculate) second L1-RSRPs based on (e.g., by using) measurements on the third RSs. The wireless device may determine (e.g., calculate or update) a value of a performance indicator for the performance monitoring. The wireless device may not transmit a report carrying the performance indicator, based on (e.g., if) reporting criterion is not fulfilled (e.g., a number of time durations being less than a first threshold and/or a number of samples being less than a second threshold). For example, the wireless device may not transmit the report after the time duration 1 with a sample #1 (and before a time duration 2). The wireless device may transmit the report carrying the performance indicator, based on (e.g., if) reporting criterion is fulfilled (e.g., the number of time durations being greater than the first threshold and/or the number of samples being greater than the second threshold). For example, the wireless device may transmit the report after the time duration N with samples #1 to #M.

Figure 26:
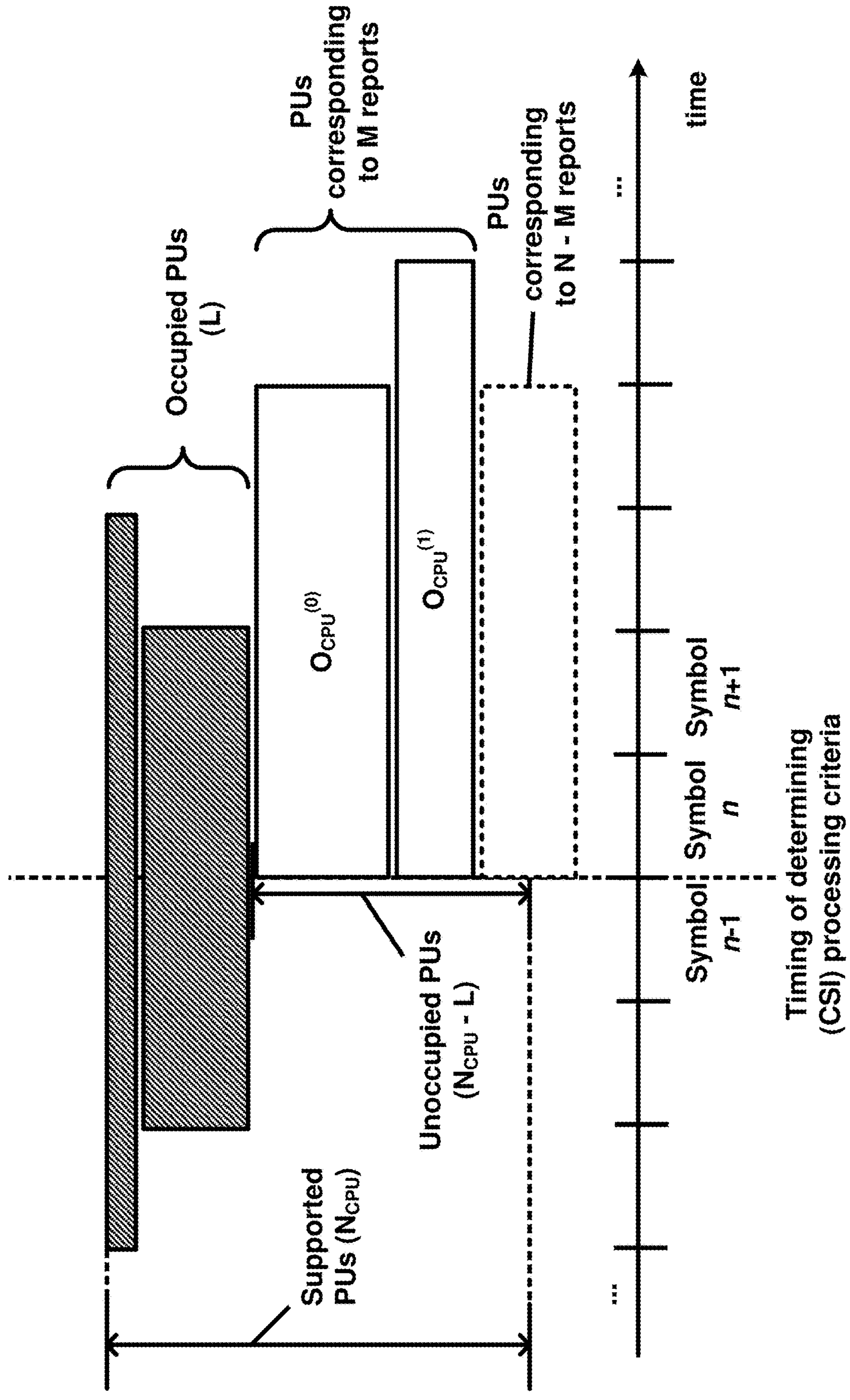
FIG. 26 illustrates an aspect of an example embodiment according to the present disclosure.

FIG. 26 illustrates an example of processing unit occupancy as per an aspect of an embodiment of the present disclosure.

In an example, the wireless device may transmit a UE (e.g., wireless device) capability information message (e.g., RRC message) comprising one or more parameters (e.g., simultaneousCSI-ReportsPerCC, simultaneous CSI-SubReportsPerCC-r18, simultaneousCSI-ReportsAllCC, or simultaneousCSI-SubReportsAllCC-r18) indicating a number (e.g., quantity) of supported (simultaneous) CSI calculations. A CSI calculation may be referred to as a processing unit (PU). A PU may comprise a CSI processing unit (CPU) and an AI (or AI/ML) processing unit (APU). The supported PUs (as shown in FIG. 26) or PUs supported by the wireless device may refer to the supported simultaneous processing (CSI calculations). A processing may comprise an AI processing (e.g., calculation of L1-RSRP and model inference). A CSI calculation may comprise the AI processing. For example, when determining PUs, the wireless device may assume/consider the AI processing as the CSI calculation. $N_{CPU}$ may denote the number of supported CSI calculations or a quantity (e.g., number) of supported PUs.

If the wireless device supports $N_{CPU}$ simultaneous CSI calculations, the wireless device may have $N_{CPU}$ PUS (e.g., CPUs and/or APUs) for processing reports. For example, a report (of the reports) may comprise a first type of report (e.g., a CSI report carrying one or more CSIs) and a second type of report (e.g., an AI based report carrying one or more inference results or one or more performance indicators for performance monitoring of an AI model). The wireless device may determine a number (e.g., quantity) of PUs that are occupied (for calculation of the reports) in (e.g., at least until) a (given) first (OFDM) symbol (e.g., symbol n in FIG. 26). The PUs that are occupied may be referred to as occupied PUs. L may denote the number of PUs that are occupied or a quantity (e.g., number) of occupied PUs. The wireless device may determine (e.g., count or assume) a number (e.g., quantity) of unoccupied PUs, based on the number of supported PUs and the number of occupied PUs. For example, the wireless device may determine the number of unoccupied PUs as $N_{CPU}$-L. The wireless device may determine that a number (e.g., quantity) of reports (e.g., N reports) start occupying one or more PUs respective to (e.g., corresponding to or associated with) the N reports on the same first (OFDM) symbol (e.g., symbol n in the FIG. 26) on which $N_{CPU}$-L PUs are unoccupied, where a (e.g., each) report n (n=0, . . . , N−1) corresponds to $$O_{CPU}^{(n)}.$$

The wireless device may not (e.g., not be required to) determine (e.g., update, generate, and/or calculate) N−M (requested) reports (e.g., with lowest priority) (e.g., PUs corresponding to N-M reports in FIG. 26), where 0≤M≤N is a largest value such that $$\sum_{n=0}^{M-1} O_{CPU}^{(n)} \leq O_{CPU} - L \text{ holds.}$$

The wireless device may determine a number (e.g., quantity) of PUs corresponding to M reports. The wireless device may process (e.g., update, generate, and/or calculate content/quantity of) the M reports. The wireless device may transmit, to the base station, the M reports.

In an example, the wireless device may determine a number (e.g., quantity) of PUs (e.g., denoted by $O_{CPU}$) that are occupied by (processing of) a report, based on a quantity (e.g., content indicated by an RRC parameter reportQuantity) of (e.g., carried by) the report. $O_{CPU}$ may comprise $O_{CPU\text{-}L1\text{-}RSRP}$, $O_{CPU\text{-}PMI}$, and $O_{CPU\text{-}AI}$.

For example, $O_{CPU}$=0 for a report with an RRC parameter/IE CSI-ReportConfig (e.g., configuring the report) with a higher layer (e.g., RRC) parameter reportQuantity set to 'none' and an RRC parameter/IE CSI-RS-ResourceSet (e.g., configuring resources of reference signals associated with the report) with a higher layer (e.g., RRC) parameter trs-Info configured.

For example, $O_{CPU}$=1 (e.g., $O_{CPU}$ is $O_{CPU\text{-}L1\text{-}RSRP}$) for a report with LTM-CSI-ReportConfig or a report with CSI-ReportConfig with higher layer parameter reportQuantity set to 'cri-RSRP', 'ssb-Index-RSRP', 'cri-SINR', 'ssb-Index-SINR', 'cri-RSRP-Index', 'ssb-Index-RSRP-Index', 'cri-SINR-Index', 'ssb-Index-SINR-Index' or 'none' (and CSI-RS-ResourceSet with higher layer parameter trs-Info not configured).

For example, $O_{CPU}$=(Y+1)·X for a report with CSI-ReportConfig with higher layer parameter report Quantity set to 'tdcp' (e.g., for Time Domain Channel Property (TDCP) and with number of delays Y configured by higher layer parameter Y (e.g., delayDSetofLengthY-r18 configuring a set of Y delay values for TDCP reporting), where the value of X∈{1, 2} is reported by UE capability.

For example, for a report with CSI-ReportConfig with higher layer parameter report Quantity set to 'cri-RI-PMI-CQI', 'cri-RI-i1', 'cri-RI-i1-CQI', 'cri-RI-CQI', or 'cri-RI-LI-PMI-CQI', (e.g., $O_{CPU}$ is $O_{CPU}$-PMI)

- if max{$\mu_{PDCCH}$, $\mu_{CSI\text{-}RS}$, $\mu_{UL}$}≤3, and if a report is aperiodically triggered without transmitting a PUSCH with either transport block or HARQ-ACK or both when L=0 CPUs are occupied, where the CSI corresponds to a single CSI with wideband frequency-granularity and to at most 4 CSI-RS ports in a single resource without CRI report and where codebookType is set to 'typeI-SinglePanel' or where reportQuantity is set to 'cri-RI-CQI', $O_{CPU}$=$N_{CPU}$;
- if a CSI-ReportConfig is configured with codebook Type set to 'typeI-SinglePanel' and the corresponding CSI-RS Resource Set for channel measurement is configured with two Resource Groups and N Resource Pairs, $O_{CPU}$=X·N+M, where X is the number of CPUs occupied by a pair of CMRs subject to mTRP-CSI-numCPU-r17;
- if a CSI-ReportConfig contains a list of L sub-configurations provided by the higher layer parameter csi-ReportSubConfigToAddModList, $$O_{CPU} = \sum_{i=1}^{L} K_s^i$$

for periodic CSI reporting, where $$K_s^i$$

is the total number of CSI-RS resources corresponding to the i-th sub-configuration;

- if a CSI-ReportConfig contains a list of L sub-configurations provided by the higher layer parameter csi-ReportSubConfigToAddModList, $$O_{CPU} = \sum_{i=1}^{N} K_s^i$$

for aperiodic and Semi-persistent CSI reporting, where $$K_s^i$$

is the total number of CSI-RS resources corresponding to the i-th sub-configuration, and where the i-th sub-configuration is from N indicated sub-configurations out of L sub-configurations contained in a CSI-ReportConfig, where N≤L and N≥1;

- if a CSI-ReportConfig is configured with the higher layer parameter reportQuantity set to 'cri-RI-PMI-CQI', codebookType set to 'typeII-CJT-r18' or 'typeII-CJT-PortSelection-r18' and the corresponding NZP-CSI-RS-ResourceSet for channel measurement is configured with 1<$N_{TRP}$≤4 resources, $O_{CPU}$=ceil(X·$N_{TRP}$), where X∈{1, 1.5, 2} is reported by UE capability indication;

$$O_{CPU} = \sum_{i=1}^{L} K_s^i$$

for periodic CSI reporting, where $$K_s^i$$

is the total number of CSI-RS sources corresponding to the i-th sub-configuration.

if a CSI-ReportConfig is configured with the higher layer parameter reportQuantity set to 'cri-RI-PMI-CQI' and with codebookType set to 'typeII-Doppler-r18' or 'typeII-Doppler-PortSelection-r18' and if the corresponding CSI-RS Resource Set for channel measurement is aperiodic and configured with K CSI-RS resources, $O_{CPU}=8$ for K=12 and $O_{CPu}=Y_1 \cdot K$ for K<12, where $Y_1 \in \{1, 2, 3\}$ is reported by UE capability indication;

if a CSI-ReportConfig is configured with the higher layer parameter reportQuantity set to 'cri-RI-PMI-CQI' and with codebookType set to 'typeII-Doppler-r18' or 'typeII-Doppler-PortSelection-r18' and if the corresponding CSI-RS Resource Set for channel measurement is periodic or semi-persistent and configured with a single CSI-RS resource, $O_{CPU}=4$ for $N_4=1$ and $O_{CPU}=\max(Y_2 \cdot N_4, 4)$ for $N_4>1$, where the value of $N_4$ is configured by the higher layer parameter N4, and $Y_2 \in \{1, 2, 3\}$ is reported by UE capability indication;

otherwise (for a report other than reports in the above cases), $O_{CPU}=K_s$, where $K_s$ is a number (e.g., quantity) of CSI-RS resources in the CSI-RS resource set for channel measurement.

In an example, the wireless device may determine that a report with CSI-ReportConfig with higher layer parameter reportQuantity not set to 'none', or a report with LTM-CSI-ReportConfig, occupies PU(s) for a number (e.g., quantity) of (OFDM) symbols. For example, a report n of the N-M reports may occupy one or more PUs (e.g., a number of the one or more PUs is $O_{CPU}$ determined according to a quantity/content of the report n) during the number of symbols. A starting symbol (e.g., earliest symbol) of the number of symbols may be the first symbol.

A periodic or semi-persistent CSI report (excluding an initial semi-persistent CSI report on PUSCH after the PDCCH triggering the report and a semi-persistent CSI report on PUSCH configured with the higher layer parameter codebookType set to 'typeII-Doppler-r18' or 'typeII-Doppler-PortSelection-r18') occupies PU(s) from the first symbol of the earliest one of each CSI-RS/CSI-IM/SSB resource, or each CSI-RS/CSI-IM resource associated with all configured sub-configurations for periodic CSI report corresponding to a CSI-ReportConfig that contains a list of sub-configurations provided by csi-ReportSubConfigToAddModList, or each CSI-RS/CSI-IM resource associated with all activated/triggered sub-configurations for semi-persistent CSI report corresponding to a CSI-ReportConfig that contains a list of sub-configurations provided by csi-ReportSubConfigToAddModList, for channel or interference measurement, respective latest CSI-RS/CSI-IM/SSB occasion no later than the corresponding CSI reference resource, until the last symbol of the configured PUSCH/PUCCH carrying the report;

An aperiodic CSI report occupies PU(s) from the first symbol after the PDCCH triggering the CSI report until the last symbol of the scheduled PUSCH carrying the report. When the PDCCH reception includes two PDCCH candidates from two respective search space sets, for the purpose of determining the PU occupation duration, the PDCCH candidate that ends later in time is used.

An initial semi-persistent CSI report on PUSCH after the PDCCH trigger occupies PU(s) from the first symbol after the PDCCH until the last symbol of the scheduled PUSCH carrying the report. When the PDCCH reception includes two PDCCH candidates from two respective search space sets, for the purpose of determining the PU occupation duration, the PDCCH candidate that ends later in time is used;

A semi-persistent CSI report on PUSCH configured with the higher layer parameter codebookType set to 'typeII-Doppler-r18' or 'typeII-Doppler-PortSelection-r18' occupies PU(s) from the first symbol of $K_P$-th latest consecutive periodic/semi-persistent CSI-RS occasions no later than CSI reference resource, until the last symbol of the PUSCH carrying the report, where the value of $K_P \in \{1,2,4\}$ is indicated by UE capability.

In an example, the wireless device may determine that a report with CSI-ReportConfig with higher layer parameter reportQuantity set to 'none' and CSI-RS-ResourceSet with higher layer parameter trs-Info not configured, occupies PU(s) for a number (e.g., quantity) of (OFDM) symbols. For example, a report n of the N-M reports may occupy one or more PUs (e.g., a number of the one or more PUs is $O_{CPU}$ determined according to a quantity of the report n) during the number of symbols. A starting symbol (e.g., earliest symbol) of the number of symbols may be the first symbol.

A semi-persistent CSI report (excluding an initial semi-persistent CSI report on PUSCH after the PDCCH triggering the report) occupies PU(s) from the first symbol of the earliest one of each transmission occasion of periodic or semi-persistent CSI-RS/SSB resource for channel measurement for L1-RSRP computation, until $Z_3'$ (e.g., an integer number) symbols after the last symbol of the latest one of the CSI-RS/SSB resource for channel measurement for L1-RSRP computation in each transmission occasion;

An aperiodic CSI report occupies PU(s) from the first symbol after the PDCCH triggering the CSI report until the last symbol between $Z_3$ symbols after the first symbol after the PDCCH triggering the CSI report and Z' symbols after the last symbol of the latest one of each CSI-RS/SSB resource for channel measurement for L1-RSRP computation.

In an example, the wireless device may determine $Z_3'$ based on $X_\mu$ (e.g., $X_1$, $X_2$, $X_3$, $X_5$, $X_6$), where $\mu=\{0, 1, 2, 3, 5, 6\}$ is numerology (e.g., subcarrier spacing) and $X_\mu$ is according to reported UE capability beamReportTiming. For example, the wireless device may determine $Z_3'=X_\mu$ for a given numerology/SCS u. The wireless device may transmit an RRC message comprising the UE capability beamReportTiming indicating a number of (OFDM) symbols between an end of a last symbol of SSB/CSI-RS and a start of a first/starting symbol of the transmission channel containing the report (e.g., a beam report).

Figure 27A:
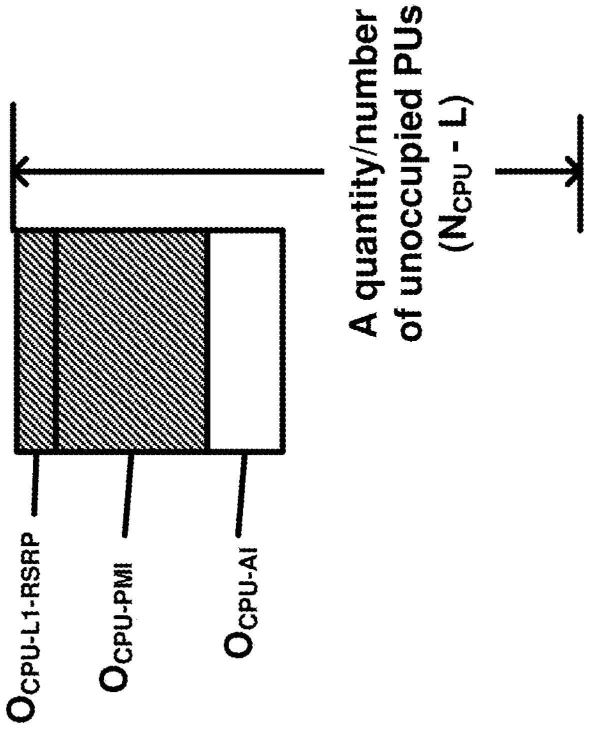
FIG. 27A and FIG. 27B illustrate aspects of example embodiments according to the present disclosure.
Figure 27B:
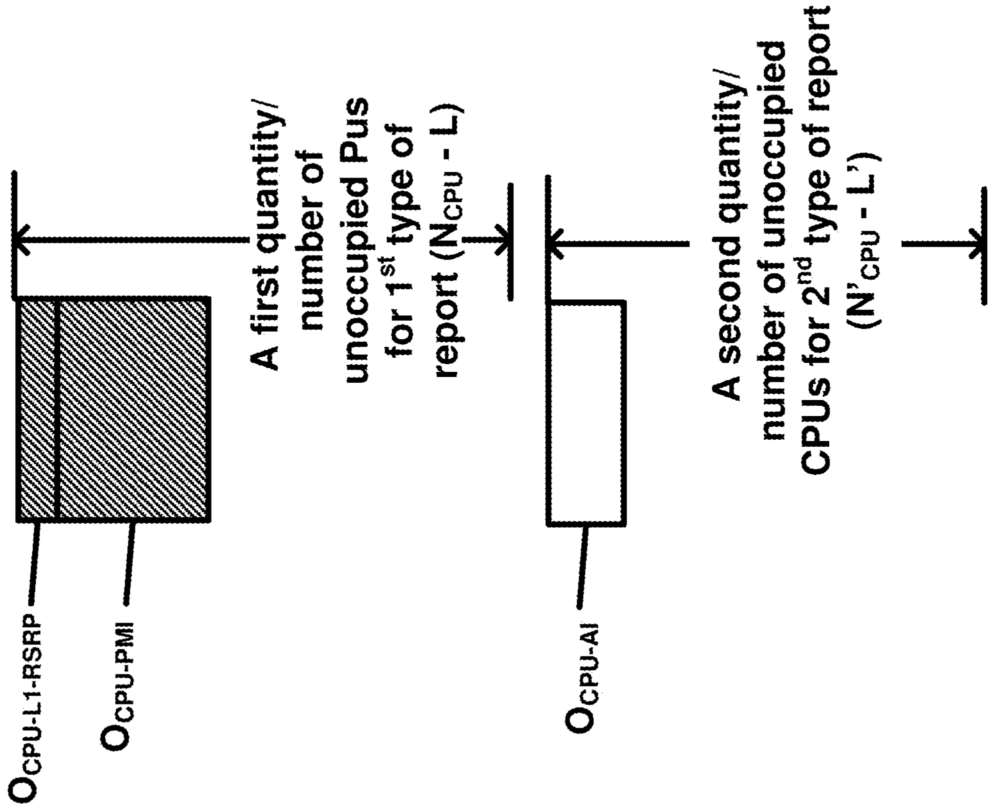

FIG. 27A and FIG. 27B illustrate examples of processing unit occupancy as per aspects of the present disclosure.

In an example, for BM-Case 1 and/or BM-Case 2, overall PUs may be shared between CSI reporting and AI/ML based CSI reporting, or separately counted between the CSI reporting and the AI/ML based CSI reporting. The CSI reporting may refer to reporting of a first type of report that carries CSI (e.g., L1-RSRP, CRI, SSBRI, PMI, CQI, and the like) and/or processing related to the first type of report (e.g., calculation of the CSI). The first type of report may comprise a CSI report. The AI/ML based CSI reporting may refer to reporting of a second type of report that carries one or more inference results (e.g., beam prediction results comprising predicted beam indexes and predicted RSRPs) or one or more performance indicators for performance monitoring of an AI model (e.g., beam prediction accuracy), and/or processing related to the second type of report (e.g., calculation of L1-RSRPs and model inference). The second type of report may comprise an AI based report. A number (e.g., quantity) of the overall PUs comprises a first number of PUs corresponding to (e.g., associated with or respective to) the first type of report and a second number of PUs corresponding to (e.g., associated with or respective to) the second type of report.

In an example, $O_{CPU\text{-}AI}$ may be a number (e.g., quantity) of PUs (e.g., CPUs and/or APUs) that a report of a second type of report (e.g., an AI report) occupies for processing (e.g., calculation of L1-RSRPs and/or model inference). $O_{CPU\text{-}AI}$ may comprise $O_{CPU\text{-}AI\text{-}BM\text{-}Case1}$, $O_{CPU\text{-}AI\text{-}BM\text{-}Case2}$, $O_{CPU\text{-}AI\text{-}CSI\text{-}prediction}$, and $O_{CPU\text{-}AI\text{-}CSI\text{-}compression}$.

$O_{CPU\text{-}AI\text{-}BM\text{-}Case1}$ may be a number of PUs that an AI based report carrying inference results (e.g., beam prediction, where an RRC parameter/IE (e.g., reportQuantity) indicates predicted-CRI-SSB-Index, predicted-RSRP, predicted-CRI-SSB-Index-predicted-RSRP, or predictedFuture-CRI-SSB-Index) or performance indicators (e.g., prediction accuracy, where an RRC parameter/IE indicates performanceIndicator) of a model/functionality of BM-Case 1.

$O_{CPU\text{-}AI\text{-}BM\text{-}Case2}$ may be a number of PUs that an AI based report carrying inference results (e.g., beam prediction, where an RRC parameter/IE (e.g., reportQuantity) indicates predictedFuture-CRI-SSB-Index, predictedFuture-RSRP, or predictedFuture-CRI-SSB-Index-predicted-RSRP) or performance indicators (e.g., prediction accuracy, where an RRC parameter/IE indicates performanceIndicator) of a model/functionality of BM-Case 2.

$O_{CPU\text{-}AI\text{-}BM\text{-}CSI\text{-}prediction}$ may be a number of PUs that an AI based report carrying inference results (e.g., beam prediction, where an RRC parameter/IE (e.g., reportQuantity) indicates predicted-PMI) or performance indicators (e.g., prediction accuracy, where an RRC parameter/IE indicates performanceIndicator) of a model/functionality of (AI based) CSI prediction.

$O_{CPU\text{-}AI\text{-}BM\text{-}CSI\text{-}compression}$ may be a number of PUs that an AI based report carrying inference results (e.g., beam prediction, where an RRC parameter/IE (e.g., reportQuantity) indicates compressed-PMI) or performance indicators (e.g., prediction accuracy, where an RRC parameter/IE indicates performanceIndicator) of a model/functionality of (AI based) CSI compression.

In an example, $O_{CPU\text{-}AI\text{-}BM\text{-}Case1}$, $O_{CPU\text{-}AI\text{-}BM\text{-}Case2}$, $O_{CPU\text{-}AI\text{-}CSI\text{-}prediction}$, and $O_{CPU\text{-}AI\text{-}CSI\text{-}compression}$ may be the same. For example, $O_{CPU\text{-}AI\text{-}BM\text{-}Case1}$= $O_{CPU\text{-}AI\text{-}BM\text{-}Case2}$=$O_{CPU\text{-}AI\text{-}CSI\text{-}prediction}$= $O_{CPU\text{-}AI\text{-}CSI\text{-}compression}$.

In an example, $O_{CPU\text{-}AI\text{-}BM\text{-}Case1}$, $O_{CPU\text{-}AI\text{-}BM\text{-}Case2}$, $O_{CPU\text{-}AI\text{-}CSI\text{-}prediction}$, and $O_{CPU\text{-}AI\text{-}CSI\text{-}compression}$ may be different. The wireless device may determine $O_{CPU\text{-}AI}$= $O_{CPU\text{-}AI\text{-}BM\text{-}Case1}$, based on (e.g., if) that an AI based report that occupies $O_{CPU\text{-}AI}$ PUs is associated with the BM-Case 1. The wireless device may determine $O_{CPU\text{-}AI}$= $O_{CPU\text{-}AI\text{-}BM\text{-}Case2}$, based on (e.g., if) that an AI based report that occupies $O_{CPU\text{-}AI}$ PUs is associated with the BM-Case 2. The wireless device may determine $O_{CPU\text{-}AI}$= $O_{CPU\text{-}AI\text{-}CSI\text{-}prediction}$, based on (e.g., if) that an AI based report that occupies $O_{CPU\text{-}AI}$ PUs is associated with the (AI based) CSI prediction. The wireless device may determine $O_{CPU\text{-}AI}$=$O_{CPU\text{-}AI\text{-}CSI\text{-}compression}$, based on (e.g., if) that an AI based report that occupies $O_{CPU\text{-}AI}$ PUs is associated with the (AI based) CSI compression.

For a case of shared unoccupied PUs (e.g., the overall PUs are shared between the CSI reporting and the AI/ML based CSI reporting), the wireless device may determine (e.g., count) a number (e.g., quantity) of the overall PUs (e.g., $$\sum_{n=0}^{M-1} O_{CPU}^{(n)}$$

within the number or unoccupied PUs (e.g., $N_{CPU}$-L referring to FIG. 26). For example, in FIG. 27A, the first number of PUs comprises $O_{CPU\text{-}L1\text{-}RSRP}$ and $O_{CPU\text{-}PMI}$. For example, in FIG. 27A, the second number of PUs comprises $O_{CPU\text{-}AI}$. The number of the overall PUs is a sum of $O_{CPU\text{-}L1\text{-}RSRP}$, $O_{CPU\text{-}PMI}$, and $O_{CPU\text{-}AI}$ (e.g., $$O_{CPU}^{(n)}$$

where n=0, 1, 2).

For a case of separately counted unoccupied PUs (e.g., the overall PUs are separately counted between the CSI reporting and the AI/ML based CSI reporting), the wireless device may (separately or independently) determine a first number of unoccupied PUs for the first type of report and a second number of unoccupied PUs for the second type of report. The first number of unoccupied PUs may be the same as the number of unoccupied PUs (e.g., $N_{CPU}$-L referring to FIG. 26). The wireless device may determine (e.g. count) the first number of PUs (e.g., $$\sum_{n=0}^{M-1} O_{CPU}^{(n)}$$

within the first number of unoccupied PUs. For example, in FIG. 27B, the first number of PUs comprises $O_{CPU\text{-}L1\text{-}RSRP}$ and $O_{CPU\text{-}PMI}$ (e.g., $$O_{CPU}^{(n)}$$

where n=0, 1). The second number of unoccupied PUs may be different from the number of unoccupied PUs (e.g., $N_{CPU}$-L referring to FIG. 26). The second number of unoccupied PUs may be $N'_{CPU}$-L'. $N'_{CPU}$ may be a number (e.g., quantity) of supported PUs for the second type of report (e.g., AI/ML based CSI processing, AI processing, or AI/ML processing). The wireless device may transmit a UE capability information message comprising one or more parameters indicating $N'_{CPU}$. L' may denote a number of PUs that are occupied by the second type of report (e.g., one or more reports, of the second type report, that occupies PUs at least until the first symbol). The wireless device may determine (e.g. count) the second number of PUs (e.g., $$\sum_{n'=0}^{M'-1} O_{CPU}^{(n')}$$

within the second number of unoccupied PUs. For example, in FIG. 27B, the first number of PUs comprises $O_{CPU\text{-}AI}$ (e.g., $$O_{CPU}^{(n')}$$

where n'=0).

In an example, the one or more parameters indicating $N'_{CPU}$ may be an RRC parameter/IE associated with the AI model or the AI/ML CSI processing. The one or more parameters indicating $N'_{CPU}$ may be the same as or different from one or more parameters (e.g., simultaneousCSI-ReportsPerCC, simultaneousCSI-SubReportsPerCC-r18, simultaneousCSI-ReportsAllCC, or simultaneousCSI-SubReportsAllCC-r18) indicating $N_{CPU}$. For instance, the one or more parameters indicating $N'_{CPU}$ may comprise simultaneousAI-CSI-Reports-r19 and simultaneousAI-Reports-r19. $N'_{CPU}$ may be the same as or different from $N_{CPU}$.

In an example, for BM-Case 2 of UE-side model, the wireless device may determine a reference time of an earliest time instance for predicted results, based on (e.g., by referring to) an uplink slot for a report carrying the predicted results, a CSI reference resource corresponding to the report, or a latest transmission occasion of the CSI-RS/SSB resource in Set B for measurement for the report, wherein the transmission occasion is no later than the CSI reference resource.

In an example, the wireless device may receive a control information (e.g., an RRC message, a MAC CE, or a DCI) indicating SSBs (e.g., SS/PBCH blocks), periodic CSI-RS, semi-persistent CSI-RS, or aperiodic CSI-RS for BM-Case 1 (e.g., for model inference, performance monitoring, or model training) or BM-Case 2 (e.g., for model inference, performance monitoring, or model training).

In an example, the wireless device may receive a control information (e.g., an RRC message, a MAC CE, or a DCI) indicating (e.g., configuring, activating, or triggering) one or more reports (e.g., CSI reports) for a UE-side model (e.g., for model inference, performance monitoring, or model training).

Figure 28:
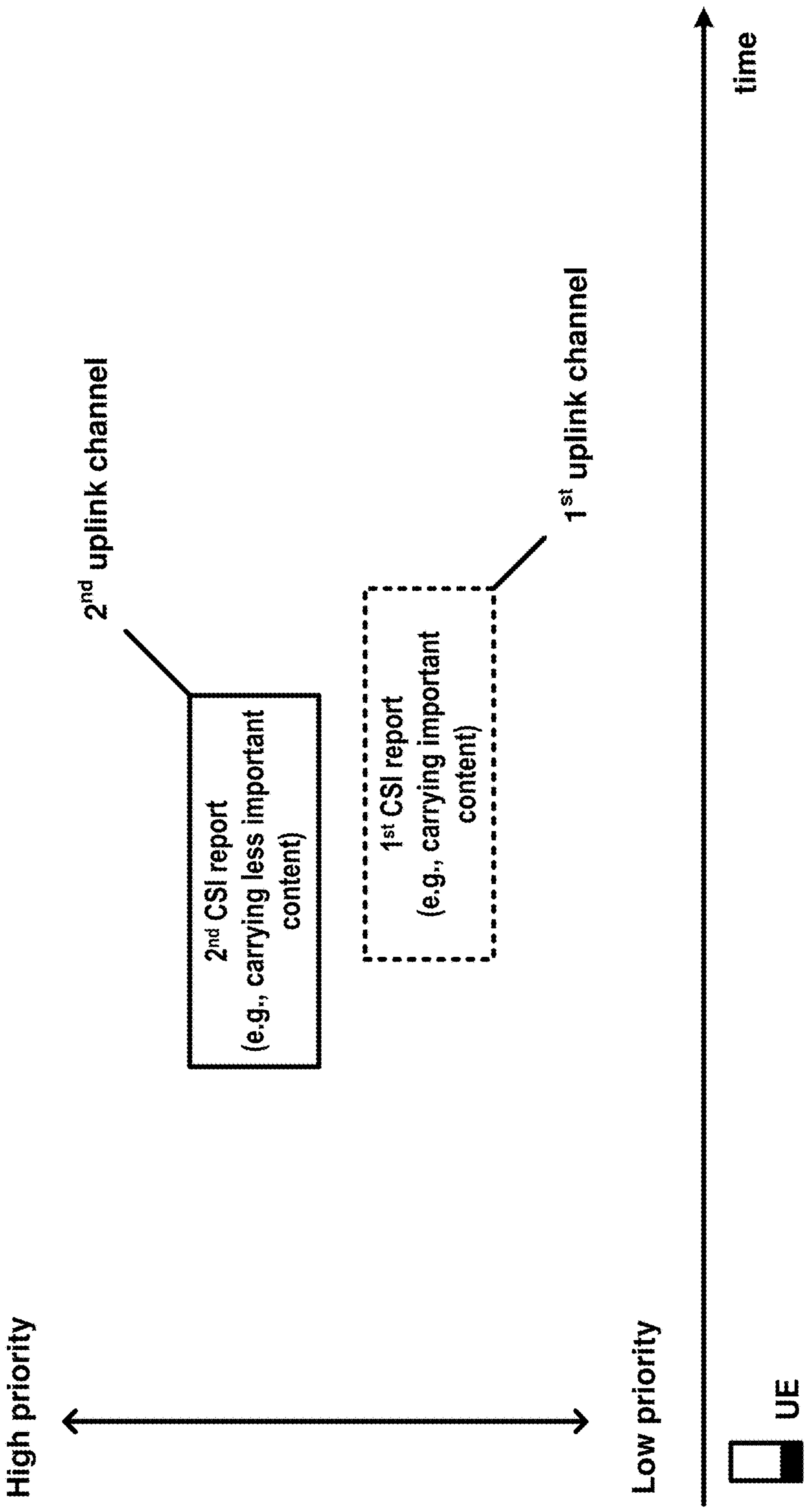
FIG. 28 illustrates an aspect of an example embodiment according to the present disclosure.

FIG. 28 illustrates an example of time domain resource allocation as per an aspect of an embodiment of the present disclosure.

In an example, the wireless device may receive, from the base station and via a first slot (e.g., $T_1$ in FIG. 28), a control signaling (or control information). For example, the control signaling may comprise (e.g., be) a DCI (or a DCI format). For example, the control signaling may comprise (e.g., be) an RRC message or a MAC CE (e.g., a downlink MAC CE). The control signaling may indicate transmission of a PUSCH. The control signaling may indicate one or more reference signals (e.g., one or more resources for (or of) the one or more reference signals). A reference signal of the one or more reference signals may comprise (e.g., be) a CSI-RS or an SSB. The wireless device may receive (and measure) the one or more reference signals. The wireless device may determine (e.g., obtain), based on (e.g., using) measurements on the one or more reference signals, a CSI report (e.g., one or more report quantities in (or of) the CSI report). A report quantity may comprise (e.g., be) a CSI, a prediction result of an AI model, or a performance indicator of an AI model. The wireless device may multiplex the CSI report (e.g., as (or in) an UCI) in the PUSCH (e.g., a payload of the PUSCH). The wireless device may transmit, via the PUSCH, the CSI report (e.g., as (or in) an UCI).

In an example, the control signaling may schedule the wireless device to transmit a transport block. The wireless device may be scheduled to transmit the transport block. For example, the wireless device may transmit, based on (e.g., in response to) an indication of the control signaling, the transport block via the PUSCH. The control signaling may indicate (e.g., schedule) a CSI report (e.g., an aperiodic CSI report). For example, the wireless device may transmit, via the PUSCH, the transport block and the CSI report (e.g., as or in an UCI). The control signaling may comprise (e.g., include or have) a field of time domain resource assignment (TDRA). The field of TDRA may be referred to as a TDRA field. The TDRA field may indicate, for the transmission of the PUSCH (or the transport block), resource allocation in time domain. For example, a value of the TDRA field (e.g., m) may indicate a row of a resource allocation table (e.g., the value may provide a row index m+1 to (or of) the resource allocation table). The resource allocation table may be a predefined table. The wireless device may receive one or more messages (e.g., RRC messages) comprising one or more configuration parameters (e.g., RRC parameters or IEs) indicating the resource allocation table. For example, the one or more configuration parameters may comprise (e.g., be) TimeDomainAllocationList in pusch-ConfigCommon, or TimeDomainAllocationList in pusch-Config. The row index m+1 may define a slot offset. For example, the slot offset may be referred to as $K_2$, or $K_2$ slots. The slot offset may comprise (e.g., be) a number (or quantity) of slots between a first slot (e.g., a slot n in which the wireless device receives the control signaling) and a second slot (e.g., a slot $K_s$ in which the wireless device transmits the PUSCH (the transport block, or the CSI report)). The wireless device may receive, via the first slot (e.g., at a timing of $T_1$ in FIG. 28), the control signaling. The wireless device may determine (e.g., compute or calculate), based on (e.g., by using) the first slot and the slot offset, the second slot. The wireless device may determine $K_s$ based on n and $K_2$. For example, the wireless device may determine that $K_s$=n+$K_2$. The wireless device may transmit, via the second slot (e.g., at a timing of $T_2$ in FIG. 28), the PUSCH.

In an example, the control signaling may not schedule the wireless device to transmit a PUSCH. In an example, the control signaling may not schedule the wireless device to transmit a transport block (e.g., via the PUSCH). The wireless device may not be scheduled to transmit the transport block (e.g., via the PUSCH). The control signaling may indicate (e.g., schedule) a CSI report (e.g., an aperiodic CSI report). A field of CSI request (e.g., a value 1 of the field of CSI request, or the field of CSI being set to 1), of (in, or on) the control signaling, may indicate (e.g., request) the CSI report. For example, the wireless device may transmit, via the PUSCH, the CSI report (e.g., as or in an UCI). The wireless device may be scheduled to transmit the PUSCH with no transport block and the CSI report. The wireless device may transmit, via the PUSCH, the CSI report (e.g., as or in an UCI) and without the transport block. For example, a payload of the PUSCH may comprise only the UCI comprising the CSI report. The payload of the PUSCH may not comprise the transport block. The wireless device may determine, based on a slot offset (e.g., $K_2$ value) and the first slot, the second slot. The wireless device may determine, based on a value (e.g., m≤15) of the TDRA field of (in, or on) the control signaling and one or more configuration parameters (e.g., RRC parameters or RRC IEs), the slot offset. A configuration parameter (e.g., numbered by j) of the one or more configuration parameters may comprise (e.g., be) reportSlotOffsetListDCI-0-1, reportSlotOffsetListDCI-0-1-r17, reportSlotOffsetListDCI-0-2, reportSlotOffsetListDCI-0-2-r17, reportSlotOffsetList, or reportSlotOffsetList-r17. The configuration parameter may comprise (e.g., configure or indicate) a plurality of (e.g., a list of) slot offsets (e.g., values of slot offset). The configuration parameter may be in an RRC parameter (or IE) of CSI-ReportConfig The slot offset may be a maximum value among one or more values, where each value is from a list of slot offsets (e.g., indicated by the configuration parameter). For example, $$K_2 = \max_j Y_j(m+1),$$

where $Y_j$, J=0, . . . , $N_{Rep}-1$ may comprise (e.g., be) a corresponding list entries of the configuration parameter. $N_{Rep}$ may be a number of triggered CSI report settings. For example, the wireless device may determine $N_{Rep}$ CSI reports that are triggered (e.g., with by the base station, each CSI report associated with a CSI report setting). $Y_j(m+1)$ may comprise (e.g., be) the (m+1)th entry of $Y_j$. m+1 may be less than or equal to 16. The wireless device may not expect that m+1 is larger than 16.

In an example, the wireless device may determine the slot $K_s$ based on (e.g., by or using) $K_2$. For example, if the wireless device is configured with an RRC parameter (or IE) ca-SlotOffset (e.g., for at least one of the scheduled and scheduling cell), the wireless device may determine the slot $K_s$ as:

$$K_s = \left\lfloor n \cdot \frac{2^{\mu_{PUSCH}}}{2^{\mu_{PDCCH}}} \right\rfloor + K_2 + \left\lfloor \left( \frac{N_{slot,offset,PDCCH}^{CA}}{2^{\mu_{offset,PDCCH}}} - \frac{N_{slot,offset,PUSCH}^{CA}}{2^{\mu_{offset,PUSCH}}} \right) \cdot 2^{\mu_{PUSCH}} \right\rfloor$$

For example (e.g., the wireless device is not configured with the RRC parameter ca-SlotOffset), the wireless device may determine the slot $K_s$ as:

$$K_s = \left\lfloor n \cdot \frac{2^{\mu_{PUSCH}}}{2^{\mu_{PDCCH}}} \right\rfloor + K_2 + K_{offset} \cdot \frac{2^{\mu_{PUSCH}}}{2^{\mu_{Koffset}}}$$

$\mu_{K_{offset}}$ may be the subcarrier spacing configuration for $K_{offset}$ with a value of 0 for frequency range 1 and for FR2-NTN, n is the slot with the DCI (e.g., the scheduling DCI), $K_2$ is based on the numerology of the PUSCH, and are the subcarrier spacing configurations for the PUSCH and a PDCCH (e.g., that comprises or carries the DCI), respectively. If the scheduling DCI is a DCI format 0_0 with CRC scrambled by TC-RNTI, $K_{offset}$ may be provided by an RRC parameter (or IE) cellSpecificKoffset if configured and otherwise $K_{offset}=0$; otherwise, $K_{offset}$ may be an RRC parameter configured by a higher layer (e.g., RRC layer).

$$N_{slot,offset,PDCCH}^{CA}$$

and $\mu_{offset,PDCCH}$ may be the $$N_{slot,offset}^{CA}$$

and the $\mu_{offset}$, which are determined by higher-layer configured ca-SlotOffset for the cell receiving the PDCCH.

$$N_{slot,offset,PUSCH}^{CA}$$

and $\mu_{offset,PUSCH}$ may be the $$N_{slot,}^{CA}$$

$_{offset}$ and the $\mu_{offset}$, respectively, which are determined by higher-layer configured ca-SlotOffset for the cell transmitting the PUSCH.

In the present disclosure, a spatial domain beam prediction may refer to (a procedure of) predicting, based on measurement results (e.g., measurements) of one or more first beams (reference signals) (e.g., a Set B of beams) and by performing inference of a model (e.g., an AI model), one or more predictions of one or more second beams (e.g., a Set A of beams). The spatial domain beam prediction may be referred to as "BM-Case1" or "BM-Case 1".

In the present disclosure, a time domain (or temporal) beam prediction may refer to (a procedure of) predicting, based on historic measurement results (e.g., measurements) of one or more first beams (reference signals) (e.g., a Set B of beams) and by performing inference of the model, one or more future time instances of one or more second beams (e.g., a Set A of beams). The time domain beam prediction may be referred to as "BM-Case2" or "BM-Case 2".

In the present disclosure, a Set B of beams (or reference signals) may refer to one or more second beams (or reference signals) or a second set of beams (or reference signals). Input of inference of a model (e.g., an AI model) may be based on measurements on the Set B of beams. For example, the input may be based on measured RSRP of one or more reference signals associated with the Set B of beams.

In the present disclosure, a Set A of beams (or reference signals) may refer to one or more first beams (or reference signals) or a first set of beams (or reference signals). Output of the inference of the model (e.g., prediction) may comprise a beam ID among the Set A of beams. The Set B may be the same as or different from the Set A. The Set B may be a subset of the Set A.

In the present disclosure, a Set C of beams (or reference signals) may refer to one or more third beams (or reference signals) or a third set of beams (or reference signals). A purpose of the Set C may be for performance monitoring of a model (e.g., one or more models). The Set C may the same as the Set A. The Set C may be a (proper) subset of the Set A.

In the present disclosure, terminologies "Set A", "Set A of beams", "Set A of reference signals", "Set A of reference signal resources", and "Set A of resources" may be used interchangeably. In an example, a Set A may refer to a Set A of beams that comprises one or more (or a plurality of) first beams or beam indexes/IDs (identifiers or identifications). In an example, the Set A may refer to one or more (or a plurality of) first reference signals corresponding to/associated with the one or more (or a plurality of) first beams or beam indexes/IDs. In an example, the Set A may refer to one or more (or a plurality of) first reference signal resources corresponding to/associated with the one or more (or a plurality of) first reference signals. In an example, the Set A may comprise one or more CRIs and one or more SSBRIs.

In the present disclosure, terminologies "Set B", "Set B of beams", "Set B of reference signals", "Set B of reference signal resources", and "Set B of resources" may be used interchangeably. In an example, a Set B may refer to a Set B of beams that comprises one or more (or a plurality of) second beams or beam indexes/IDs (identifiers or identifications). In an example, the Set B may refer to one or more (or a plurality of) second reference signals corresponding to/associated with the one or more (or a plurality of) second beams or beam indexes/IDs. In an example, the Set B may refer to one or more (or a plurality of) second reference signal resources corresponding to/associated with the one or more (or a plurality of) second reference signals. In an example, the Set B may comprise one or more CRIs and one or more SSBRIs.

In the present disclosure, terminologies "Set C", "Set C of beams", "Set C of reference signals", "Set C of reference signal resources", and "Set C of resources" may be used interchangeably. In an example, a Set C may refer to a Set C of beams that comprises one or more (or a plurality of) third beams or beam indexes/IDs (identifiers or identifications). In an example, the Set C may refer to one or more (or a plurality of) third reference signals corresponding to/associated with the one or more (or a plurality of) third beams or beam indexes/IDs. In an example, the Set C may refer to one or more (or a plurality of) third reference signal resources corresponding to/associated with the one or more (or a plurality of) third reference signals. In an example, the Set C may comprise one or more CRIs and one or more SSBRIs.

In the present disclosure, terminologies "first reference signals (RSs)", "one or more first RSs", "a plurality of first RSs", "a Set A of RSs", "Set A RSs", and "RSs of Set A" may be used interchangeably. Terminologies "second reference signals (RSS)", "one or more second RSs", "a plurality of second RSs", "a Set B of RSs", "Set B RSs", and "RSs of Set B" may be used interchangeably. Terminologies "third reference signals (RSS)", "one or more third RSs", "a plurality of third RSs", "a Set C of RSs", "Set C RSs", and "RSs of Set C" may be used interchangeably.

In the present disclosure, a model ID may refer to an identification, identifier, or index of a model (e.g., an AI model). The wireless device and/or the base station may determine the model ID based on model identification. The model ID may be associated with an associated ID of the model. For example, the model ID may comprise the associated ID of the model. The model identification may be a procedure (process, or method) of identifying the model for the common understanding between the wireless device and the base station.

In the present disclosure, performance monitoring may refer to a procedure that monitors the inference performance of the prediction models. The wireless device and/or the network (e.g., the base station) may perform performance monitoring for one or more models and/or one or more functionalities. Performance monitoring may be one of LCM operations.

In the present disclosure, a performance metric for performance monitoring of a model may refer to a metric for performance monitoring. For the BM-Case1 and the BM-Case2 with the model (e.g., a UE-sided AI/ML model), for UE-assisted performance monitoring, the performance metric may comprise prediction accuracy, L1-RSRP difference information, RSRP difference information, and probability information of predicted beam(s). The wireless device may determine (e.g., calculate or compute) performance information (e.g., the performance metric or a value of the performance metric) per sample (e.g., one-shot) or per set of samples (e.g., window).

In the present disclosure, a Top 1 beam (e.g., a reference signal associated with the Top 1 beam, a identifier/index/identification of the reference signal, or a resource associated with the reference signal) of a set of beams (e.g., a plurality of reference signals associated with the set of beams, identifiers/indexes/identifications of the plurality of reference signals, or resources associated with the plurality of reference signals) may refer to a beam, in the set of beams, that has a highest metric value among metric values associated with the set of beams. Top K beams (e.g., K reference signals associated with the Top beams, identifiers/indexes/identifications of the K reference signal, or resources associated with the K reference signals) of a set of beams (e.g., a plurality of reference signals associated with the set of beams, identifiers/indexes/identifications of the plurality of reference signals, or resources associated with the plurality of reference signals) may refer to K beams, in the set of beams, that has highest metric values among metric values associated with the set of beams. K may be an integer. K may be greater than 1. K may be smaller than (or equal to) a quantity of the set of beams (e.g., a number of beams in the set of beams). Each beam of the set of beams may have a respective metric value. A metric value may comprise a measured RSRP (e.g., L1-RSRP), a predicted RSRP, or probability information.

In an example, the wireless device may determine (e.g., compute, calculate, or obtain) a measured RSRP of a beam, after (receiving and) measuring a reference signal (e.g., a CSI-RS, an SSB, or a sidelink CSI-RS) associated with the beam. The base station may determine (e.g., compute, calculate, or obtain) a measured RSPR of a beam, after (receiving and) measuring a reference signal (e.g., an SRS) associated with the beam.

In an example, the wireless device or the base station may determine, a predicted RSPR of a beam, based on (e.g., by performing) inference of a model (e.g., that is a prediction model and a regression model) using input of measurements on reference signals.

In an example, the wireless device or the base station may determine, probability information of a beam, based on (e.g., by performing) inference of a model (e.g., that is a prediction model and a classification model) using input of measurements on reference signals. The probability information is a probability (value) that the classification model predicts the beam being a Top 1/best beam.

In an example, the prediction accuracy may refer to Top 1 or Top K beam prediction accuracy by comparing prediction results (of the model) and the Top 1 or Top K beam based on (e.g., by using) the measurements from a resource set (e.g., CSI-RS resources and/or SSB resources/indexes configured or indicated) for the performance monitoring. Beam prediction accuracy (BPA) may be referred to as beam accuracy indicator (BAI).

In an example, the L1-RSRP difference information may be based on (actual) measured L1-RSRP of one or more of Top K predicted beams, and measured L1-RSRP from a resource set (e.g., third RSs comprising CSI-RS resources and/or SSB resources/indexes configured or indicated) for the performance monitoring. For example, the wireless device may determine (e.g., calculate) the L1-RSRP difference information by subtracting measured L1-RSRP of one or more of Top K predicted beams from the measured L1-RSRP from the resource set. For example, the wireless device may determine (e.g., calculate) the L1-RSRP difference information by subtracting the measured L1-RSRP from the resource set from measured L1-RSRP of one or more of Top K predicted beams.

In an example, the RSRP difference information may refer to a RSRP difference between the predicted RSRP and measured L1-RSRP of corresponding beam(s) of a resource set (e.g., CSI-RS resources and/or SSB resources/indexes configured or indicated). The resource set may comprise resources for the Set B (of beams). The RSRP difference information may be applicable (as the performance metric) when the model can (or is able to, is capable to, supports to) predict RSRP. For example, the model may comprise (e.g., be) a regression model.

In an example, the probability information may refer to a probability of the predicted beam(s) to be the Top 1 beam or the Top K beams. The probability information may be applicable (as the performance metric) when the model can (or is able to, is capable to, supports to) generate probability information. For example, the model may comprise (e.g., be) a classification model.

For example, the resource set may comprise a full set of Set A for measurement. For example, the resource set may comprise a subset of Set A for measurement.

FIG. 28 illustrates an example of determination of priority of a CSI report as per an aspect of an embodiment of the present disclosure.

In an example, a base station may indicate a wireless device to transmit a first CSI report and a second CSI report. A first uplink channel for transmission of the first CSI report and a second uplink channel for transmission of the second CSI report may overlap in the time domain. The wireless device may determine to transmit one of the first CSI report and the second CSI report, based on a first priority value of the first CSI report and a second priority value of the second CSI report. The first CSI report may carry important content (e.g., beam prediction accuracy for performance monitoring of an AI model). The second CSI report may carry less important content (e.g., compared to that carried by the first CSI report).

Using existing priority rules, the wireless device may determine the first priority value and the second priority value that is smaller than the first priority value, wherein a smaller priority value corresponds to a higher priority. The wireless device may determine to transmit the second CSI report carrying the less important content, based on the second priority value being smaller than the first priority value. The wireless device may drop reporting or discard processing the first CSI report carrying the important content. The base station may not receive the important content for beam management or model management (e.g., LCM of the AI model). The implementation of the existing technologies may result in decreased resource efficiency, increased latency, increased interference, and increased power consumption.

In existing technologies, a wireless device may determine a priority value of a CSI report, based on at least a report quantity carried by the CSI report. The wireless device may prioritize the CSI report, based on the priority value of the CSI report being smaller than those of other CSI reports. The report quantity may comprise a measured L1-RSRP for beam management, a predicted L1-RSRP, a measured L1-RSRP for data collection of network-sided model training, or a performance indicator. The wireless device may improperly determine a first priority value of a first CSI report with high importance (e.g., for more important purpose and/or carrying more important content) and a second priority value of a second CSI report with low importance (e.g., for less important purpose and/or carrying less important content), where the first priority value is greater than the second priority value (e.g., the first CSI report has lower priority compared to the second CSI report). The wireless device may drop the first CSI report (e.g., not process and/or not transmit the first CSI report). The base station may not receive, via the first CSI report, important reporting on inference results, performance monitoring results, or measurements for beam management. The implementation of the existing technologies may result in decreased resource efficiency, increased latency, increased interference, and increased power consumption.

Embodiments of the present disclosure are related to an approach for solving the problems described above. These and other features of the present disclosure are described further below.

In an example embodiment, a wireless device may transmit, to a base station, a first CSI report, based on a priority value, of the first CSI report, determined using a first priority parameter and a second priority parameter. The first priority parameter may comprise a first value based on the first CSI report being an AI based CSI report. The second priority parameter may comprise a value based on a CSI report quantity carried by the first CSI report. Example embodiments of the present disclosure enable the wireless device to determine a small priority value (e.g., corresponding to high priority) of a CSI report with importance. The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

Figure 29:
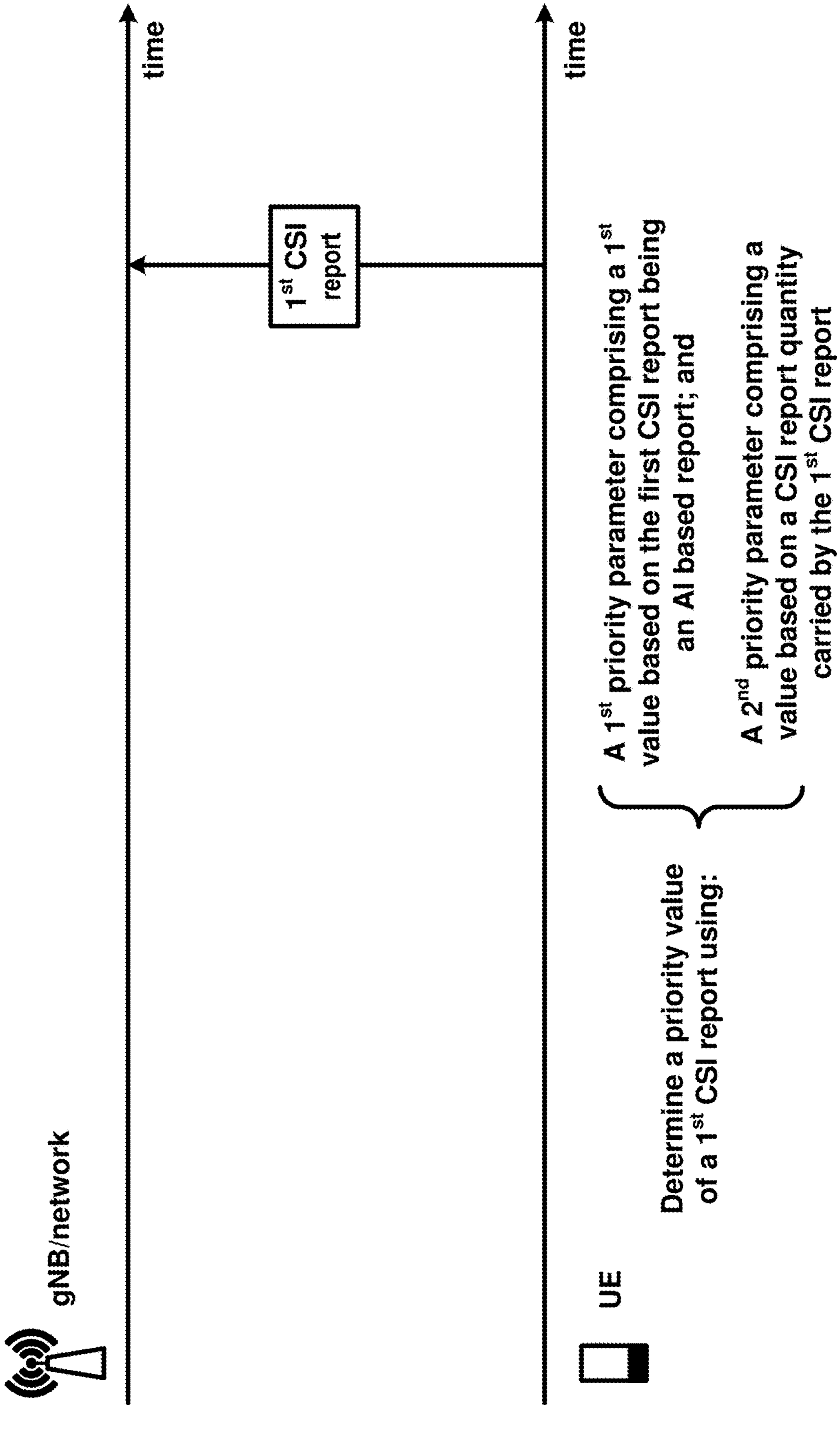
FIG. 29 illustrates an aspect of an example embodiment according to the present disclosure.

FIG. 29 illustrates an example of determination of priority of a CSI report as per an aspect of an embodiment of the present disclosure.

In an example, a wireless device (e.g., UE in FIG. 29) may determine a priority value, of a first CSI report, using a first priority parameter and a second priority parameter. The wireless device may transmit, to a base station (e.g., gNB/network in FIG. 29), the first CSI report. The first priority parameter may comprise a first value based on the first CSI report being an AI based CSI report. The second priority parameter may comprise a value based on a CSI report quantity carried by the first CSI report.

In an example, the wireless device may determine a priority value, of a second CSI report, using the first priority parameter and the second priority parameter. The wireless device may compare the priority value of the first CSI report with the priority value of the second CSI report. The wireless device may transmit the first CSI report or the second CSI report, based on a comparison between the priority value of the first CSI report and the priority value of the second CSI report. The wireless device may determine to transmit (or process) the first CSI report, based on the priority value of the first CSI report being smaller than the priority value of the second CSI report. The wireless device may determine to transmit (or process) the second CSI report, based on the priority value of the first CSI report being greater than the priority value of the second CSI report.

Example embodiments of the present disclosure enable the wireless device to determine a small priority value (e.g., corresponding to high priority) of a CSI report with importance. The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

In the present disclosure, the AI based CSI report may refer to an AI based report. The AI based CSI report may refer to a CSI report associated with an AI model. For example, the AI based CSI report may comprise a report quantity associated with the AI model. For example, a purpose of the AI based CSI report is for model training, model inference, or performance monitoring of the AI model. The report quantity associated with AI model may comprise an inference result of the AI model or a performance indicator of the AI model, where the AI model is a UE-sided model. The report quantity associated with AI model may comprise one or more L1-RSRPs for model training of the AI model, where the AI model is a network-sided model.

In the present disclosure, the report quantity may refer to content (e.g., payload) carried (or to be carried) by the CSI report. The report quantity may be referred to as a CSI report quantity. The report quantity may comprise (e.g., be) a CSI, a prediction result (or inference result) of an AI model, or a performance indicator of an AI model. The wireless device may multiplex the CSI report (e.g., as (or in) an UCI) in the PUSCH (e.g., a payload of the PUSCH). The wireless device may transmit, via the PUSCH, the CSI report (e.g., as (or in) an UCI).

For example, a first RRC IE/parameter CSI-ReportConfig may indicate a first report quantity (e.g., CSI) comprising at least one of L1-RSRP, CRI, RI, LI, PMI, CQI, or SSBRI. A second RRC IE/parameter CSI-ReportConfig may indicate a second report quantity (e.g., reporting contents in the AI based report) comprising one or more of predicted beam indexes (e.g., Top 1 beam or Top K beams in form of CRI or SSBRI), predicted RSRPs and performance indicators (e.g., beam prediction accuracy or RSRP difference).

For example, the wireless device may determine (e.g., calculate) the first report quantity based on (e.g., by calculating) measurements on the CSI-RSs and/or SSBs for the CSI report. Determining/calculation of the first report quantity may not be based on (e.g., using) any AI model (e.g., inference of an AI model). The wireless device may determine (e.g., calculate) the first report quantity based on (e.g., by using) measurements on a Set B of reference signals and model inference using the AI model. The wireless device may use the measurements on the Set B of reference signals (e.g., with or without quantization/preprocessing) as inputs of the model inference. The second report quantity may comprise (or be based on) one or more inference results (e.g., predicted beam indexes and/or predicted RSRPs) of the model inference. The wireless device may determine (e.g., calculate) one or more performance indicators based on (e.g., by comparing) the one or more inference results and measurements on a Set C of reference signals (e.g., where the Set C of reference signals is the same as a Set A of reference signals or the Set C is a subset of the Set A) for the performance monitoring. The second report quantity may comprise the one or more performance indicators.

In the present disclosure, the inference result may refer to output of model inference of (or by) the AI model. The wireless device may determine the inference result, using the output of the model inference. For example, the wireless device may obtain the inference result by computing and/or sorting the output of the model inference. The wireless device may format (e.g., quantize) the inference result in form of the report quantity.

In the present disclosure, the priority value may refer to a value of priority of a CSI report. A small priority value may correspond to a high priority. A great priority value may correspond to a low priority. The wireless device may prioritize the CSI report with the small priority value. The wireless device may use the priority value to determine whether to transmit the CSI report or not, whether to process the CSI report or not, or multiplexing order, of the CSI report, in an uplink channel. The wireless device may determine the priority value based on a time domain behavior of the CSI report, the report quantity carried by the CSI report, an index of a serving cell for transmission of the CSI report, and an index of a configuration ID (e.g., reportConfigID) of the CSI report. The wireless device may determine the priority value using a plurality of priority parameters. For example, the wireless device may calculate (or compute) the priority value using a function, taking the plurality of priority parameters as variables.

In the present disclosure, the first priority parameter (e.g., x) may refer to a priority parameter associated with grouping of urgency of CSI reports, importance of the CSI reports, purposes of the CSI reports, or report quantities of the CSI report. The first priority parameter may be different from a priority parameter (e.g., y) associated with the time domain behavior of the CSI report. The first priority parameter may be different from the second priority parameter. The first priority parameter may be different from a priority parameter (e.g., c) associated with the index of the serving cell. The first priority parameter may be different from a priority parameter (e.g., m) associated with the index of the configuration ID.

In the present disclosure, the second priority parameter (e.g., k) may refer to a priority parameter associated with content carried by the CSI report. For example, the value of the second priority parameter is based on the report quantity carried by the CSI report. The wireless device may determine a first value (e.g., k=0) of the second priority parameter, in response to the CSI report carrying an L1-RSRP or an L1-SINR. The wireless device may determine a second value (e.g., k=1) of the second priority parameter, in response to the CSI report carrying the report quantity that is different from (or other than) the L1-RSRP or the L1-SINR (e.g., both the L1-RSRP and the L1-SINR).

FIG. 30 illustrates an example of a flow chart of determination of a priority value as per an aspect of an embodiment of the present disclosure.

In an example, a wireless device may transmit, to a base station, a first CSI report, based on a priority value, of the first CSI report, determined using a first priority parameter and a second priority parameter. The first priority parameter may comprise a first value based on the first CSI report being an AI based CSI report. The second priority parameter may comprise a value based on a CSI report quantity carried by the first CSI report.

In an example, a CSI report may be associated with a priority value $Pri_{iCSI}(y, k, c, s)=X_{max}\cdot K_{max}\cdot N_{cells}\cdot M_s\cdot y+K_{max}\cdot N_{cells}\cdot M_s\cdot x+N_{cells}\cdot M_s\cdot k+M_s\cdot c+s$ where:

- y=0 for aperiodic CSI reports to be carried on PUSCH y=1 for semi-persistent CSI reports to be carried on PUSCH, y=2 for semi-persistent CSI reports to be carried on PUCCH and y=3 for periodic CSI reports to be carried on PUCCH;
- y=0 for event-driven CSI reports (e.g., a CSI report) to be carried on PUSCH or PUCCH;
- y=0 for event-driven CSI reports (e.g., a CSI report) to be carried on PUCCH;

For example, the wireless device may determine (e.g., trigger or initiate) an event-driven CSI report, based on an event. The event-driven CSI report may be referred to as an event-triggered CSI report, a UE-initiated CSI report, an event-driven beam report, or a UE-initiated beam report. The event may comprise (e.g., be) a first event where the wireless device determines a predicted beam failure by using inference of the AI model, a second event where the wireless device determines a failure of the AI model (e.g., based on a performance indicator being lower or higher than a threshold value), or a third event where the wireless device determines a request for model switching or fallback operation (e.g., fallback to beam management without using any AI model.

x=0 for AI based CSI reports, and x=1 for non-AI based report;

k=0 for CSI reports carrying L1-RSRP or L1-SINR and k=1 for CSI reports not carrying L1-RSRP or L1-SINR; $K_{max}$ (e.g., 2, 3,) is a maximum value (e.g., predefined or) of k.

c is the serving cell index and $N_{cells}$ is the value of the higher layer parameter (e.g., RRC parameter) maxNrofServingCells;

for a CSI report configured with an RRC parameter/IE LTM-CSI-ReportConfig, c is the serving cell index value where the report configuration is configured.

s is the reportConfigID and $M_s$ is the value of the higher layer parameter (e.g., RRC parameter) maxNrofCSI-Report Configurations.

for a CSI report configured with an RRC parameter/IE LTM-CSI-ReportConfig, s is the LTM-CSI-ReportConfigID and Ms is the value of the higher layer parameter (e.g., RRC parameter) maxNrofLTM-CSI-ReportConfigurations.

Example embodiments of the present disclosure enable the wireless device to determine a small priority value (e.g., corresponding to high priority) of a CSI report with importance. The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

In an example, a wireless device (e.g., UE) may receive, from a base station (e.g., gNB), one or more radio resource control (RRC) messages indicating a configuration of a CSI report using inference of an artificial intelligent (AI) model. The wireless device may trigger a first CSI report for transmission to the base station. The wireless device may determine, in response to the triggering, a priority value of the first CSI report, based on a first parameter, a second parameter, and a third parameter, wherein the first parameter has a first value based on the first CSI report using the inference of the AI model;

the second parameter has a second value based on a first CSI report quantity carried by the first CSI report; and the third parameter has a third value based on a report configuration type, in time domain, of the first CSI report.

The wireless device may transmit, to the base station and based on the priority value, the first CSI report.

In an example, the wireless device may transmit, to the base station, a first channel state information (CSI) report, based on a priority value, of the first CSI report, determined using a first parameter, wherein the first parameter has a first value based on the first CSI report using inference of an artificial intelligence (AI) model.

In an example, the first parameter may be a first priority parameter for determination of the priority value.

In an example, the second parameter may be a second priority parameter for determination of the priority value.

In an example, the third parameter may be a third priority parameter for determination of the priority value.

In an example, the wireless device may receive, from the base station, one or more messages (e.g., RRC messages) comprising one or more configuration parameters (e.g., RRC parameters/IEs).

In an example, the one or more configuration parameters may indicate a configuration (e.g., an RRC parameter/IE CSI-ReportConfig) of a CSI report using inference of an artificial intelligent (AI) model (e.g., for beam prediction or CSI compression).

In an example, the one or more configuration parameters may further indicate:

resources of a plurality of first reference signals (RSs); and resources of a plurality of second RSs.

In an example, the one or more configuration parameters may further indicate resources of a plurality of third RSs for performance monitoring of the AI model, wherein the plurality of third RSs is:

the plurality of the first RSs; or a subset of the plurality of the first RSs.

In an example, the one or more configuration parameters may comprise an RRC parameter maxNrofCSI-ReportConfigurations-AIML, that configures (or indicates) a maximum number of report configurations for (or associated with) AI based CSI reports.

In an example, the CSI report may comprise (e.g., carry) a report quantity (e.g., CSI report quantity) associated with an inference result, of the AI model, based on one or more measurements on the plurality of second RSS.

In an example, the wireless device may receive (and measure) the plurality of second RSs.

In an example, the wireless device may determine, by the inference of the AI model and using the one or more measurements as inputs, the inference result.

In an example, the inference result may comprise (e.g., be or include) a probability or a predicted RSRP of an RS among the plurality of first RSs.

In an example, the wireless device may trigger the first CSI report for transmission to the base station. For example, the wireless device may determine to transmit, via a PUSCH and to the base station, the first CSI report.

In an example, the wireless device may determine, in response to the triggering, a priority value of (or associated with) the first CSI report.

In an example, the first priority parameter may be used for (or stand for) priority grouping.

In an example, a value of the first priority parameter may comprise:

a fourth value in response to a CSI report, with urgency, associated with an AI model;

a fifth value in response to a CSI report not associated with an AI model; or a sixth value in response to a CSI report without urgency.

In an example, the first value of the first priority parameter may be the fourth value or the sixth value.

In an example, the fourth value may be smaller than the fifth value.

In an example, the fourth value may be smaller than the sixth value.

In an example, the fifth value may be smaller than the sixth value.

In an example, the fourth value may be 0, the fifth value may be 1, and the sixth value may be 2.

In an example, the CSI report, with urgency, associated with the AI model may comprise:

a CSI report for reporting of a beam failure predicted by the AI model;

a CSI report for reporting of a failure of the AI model;

a CSI report for reporting of beam prediction accuracy of the AI model; or a CSI report for reporting of inference results of the AI model.

In an example, the CSI report without urgency comprises:

a CSI report for data collection of network-sided model training;

a CSI report for reporting of measurement results (e.g., L1-RSRP and CRI/SSBRI) for performance monitoring of the AI model; or a CSI report for reporting a one-short performance indicator of the AI model.

In an example, the CSI report for data collection of network-sided model training may comprise one or more L1-RSRPs.

In an example, the one-short performance indicator may be determined using one sample for performance monitoring of the AI model.

In an example, the wireless device may determine the one sample using measurements on the plurality of second RSs and the plurality of third RSs during one time duration associated with the one sample.

In an example, the report quantity may comprise:

a first report quantity; or a second report quantity.

In an example, the first report quantity may comprise at least one of:

an L1-RSRP;

an L1-SINR;

a predicted RSRP; or a predicted SINR.

In an example, the L1-RSRP may comprise at least one of:

a measured L1-RSRP;

a predicted L1-RSRP; or an RSRP difference.

In an example, the L1-SINR may comprise at least one of:

a measured L1-SINR;

a predicted L1-SINR; or an SINR difference.

In an example, the second report quantity may be different from the first report quantity.

In an example, the second report quantity may comprise:

channel quality indicator (CQI);

precoding matrix indicator (PMI);

CSI reference signal (CSI-RS) resource indicator (CRI);

synchronization signal physical broadcast channel (SS/PBCH) block resource indicator (SSBRI);

layer indicator (LI);

rank indicator (RI); or layer-1 reference signal received power (L1-RSRP).

In an example, the second report quantity may comprise at least one of:

a compressed CSI; or a predicted CSI.

In an example, the wireless device may determine, using the inference result of the AI model, the predicted CSI, wherein the predicted CSI comprises:

a predicted CRI;

a predicted SSBRI; or a predicted RSRP.

In an example, the wireless device may determine, using the inference result of the AI model, the compressed CSI, wherein the compressed CSI comprises a compressed PMI.

In an example, the wireless device may determine, in response to the report quantity being the first report quantity, a first value of the second priority parameter.

In an example, the first value of the second priority parameter may be 0.

In an example, the wireless device may determine, in response to the report quantity being the second report quantity, a second value of the second priority parameter.

In an example, the second value of the second priority parameter may be 1.

In an example, the report quantity may comprise a third report quantity.

In an example, the third report quantity may be different from both the first report quantity and the second report quantity.

In an example, the third report quantity comprises at least one of:

an RSRP difference between a predicted RSRP and a measured RSRP; or an L1-RSRP for data collection of network-sided model training.

In an example, the wireless device may determine, in response to the report quantity being the third report quantity, a third value of the second priority parameter.

In an example, the third value of the second priority parameter may be 2.

In an example, the third value of the third priority parameter may be based on a time domain behavior of the first CSI report.

In an example, the third value of the third priority parameter may be:

0 in response to the first CSI report being an aperiodic CSI report to be carried on a PUSCH;

1 in response to the first CSI report being a semi-persistent CSI report to be carried on a PUSCH;

2 in response to the first CSI report being a semi-persistent CSI report to be carried on a PUCCH; or 3 in response to the first CSI report being a periodic CSI report to be carried on a PUCCH.

Figure 31:
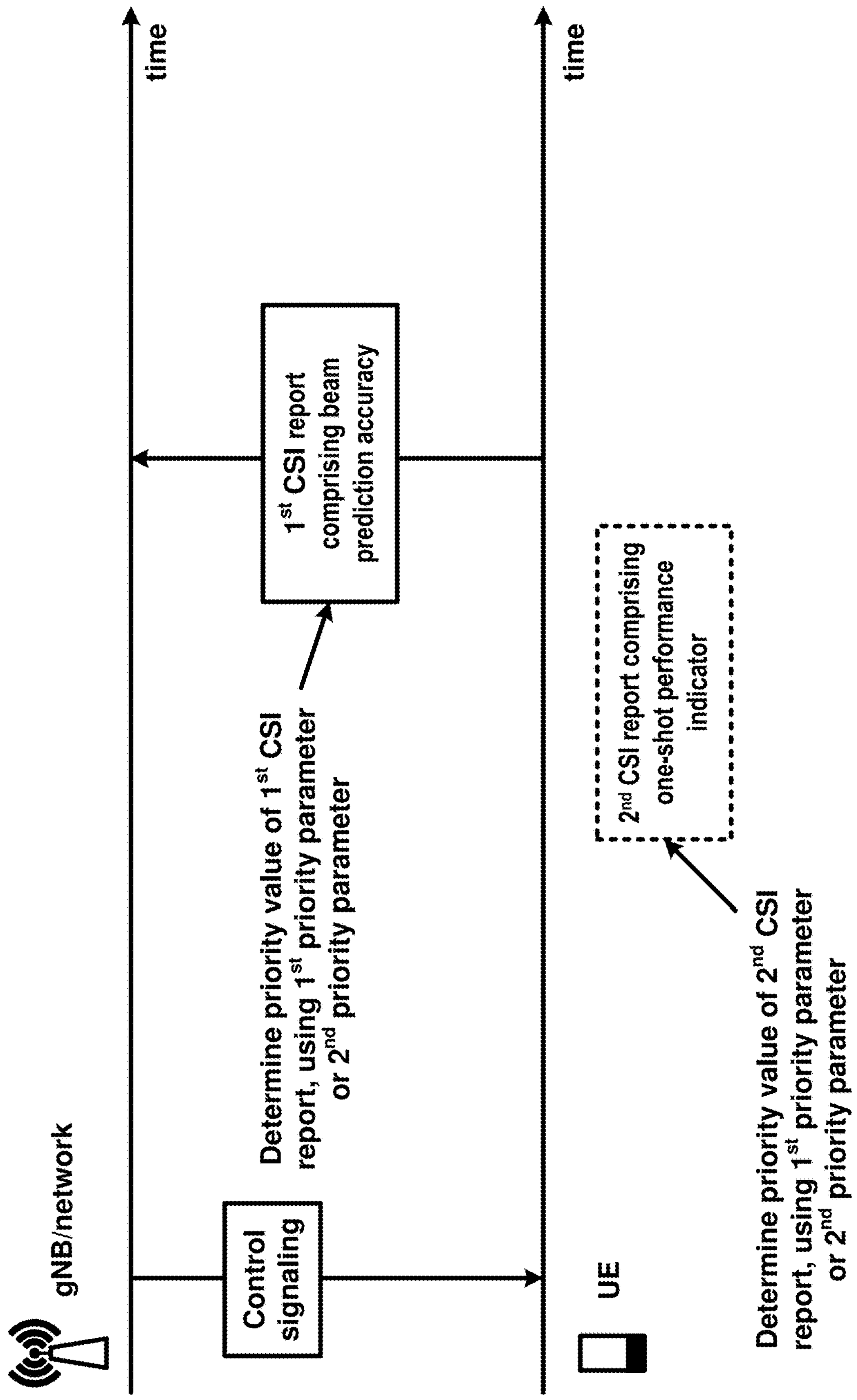
FIG. 31 illustrates an aspect of an example embodiment according to the present disclosure.

FIG. 31 illustrates an example of determination of a priority value as per an aspect of an embodiment of the present disclosure.

In an example, the wireless device (e.g., UE in FIG. 31) may receive, from the base station (e.g., gNB/network in FIG. 31), control signaling (e.g., a DCI or an RRC message) indicating the first CSI report. Transmission of the first CSI report and transmission of a second CSI report may overlap in the time domain. The first CSI report may comprise the beam predication accuracy (e.g., a performance indicator or a statistical performance indicator) of the AI model.

The report quantity carried by the first CSI report may comprise (e.g., be) the beam prediction accuracy for the performance monitoring of the AI model. The wireless device may determine the priority value of the first CSI report, using the first priority parameter or the second priority parameter.

For example, the first CSI report may comprise a one-shot performance indicator (e.g., an RSRP difference based on one sample for performance monitoring) of the AI model. The report quantity carried by the first CSI report may comprise (e.g., be) the beam prediction accuracy for the performance monitoring of the AI model. The wireless device may determine the priority value of the second CSI report, using the first priority parameter or the second priority parameter.

In an example, the first CSI report may comprise (e.g., carry) the beam prediction accuracy of the AI model.

In an example, the wireless device may determine a priority value of the first CSI report, using:

the first priority parameter; or the second priority parameter.

In an example, the wireless device may determine, for the first CSI report, a first value of the first priority parameter.

In an example, the wireless device may determine, for the first CSI report, a first value of the second priority parameter.

In an example, the wireless device may determine a priority value of a second CSI report comprising the one-shot performance indicator of the AI model, using:

the first priority parameter; or the second priority parameter.

In an example, the wireless device may determine, for the second CSI report, a second value of the first priority parameter, wherein the second value of the first priority parameter is greater than the first value of the first priority parameter.

In an example, the wireless device may determine, for the second CSI report, a second value of the second priority parameter, wherein the second value of the second priority parameter is greater than the first value of the second priority parameter.

In an example, the wireless device may transmit the CSI report, based on the priority value of the first CSI report being smaller than the priority value of the second CSI report.

Example embodiments of the present disclosure enable the wireless device to determine a small priority value (e.g., corresponding to high priority) of a CSI report with importance (e.g., the first CSI report is more important than the second CSI report). The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

Figure 32:
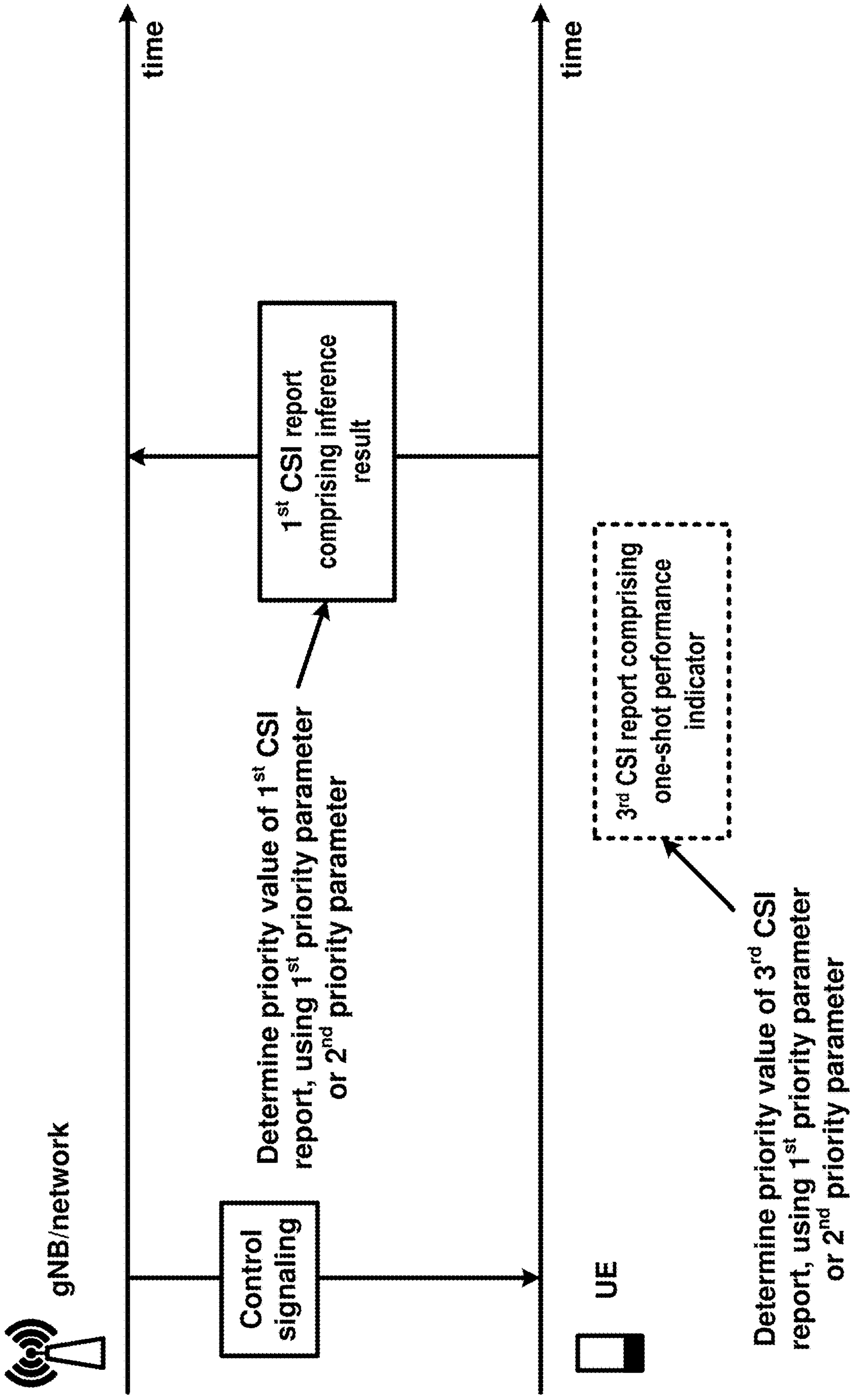
FIG. 32 illustrates an aspect of an example embodiment according to the present disclosure.

FIG. 32 illustrates an example of determination of a priority value as per an aspect of an embodiment of the present disclosure.

In an example, the wireless device (e.g., UE in FIG. 32) may receive, from the base station (e.g., gNB/network in FIG. 32), control signaling (e.g., a DCI or an RRC message) indicating the first CSI report. Transmission of the first CSI report and transmission of a third CSI report may overlap in the time domain. The first CSI report may comprise the inference result (e.g., predicted CRI, predicted SSBRI, or predicted RSRP) of the AI model. The report quantity carried by the first CSI report may comprise (e.g., be) the inference result of the AI model. The wireless device may determine the priority value of the first CSI report, using the first priority parameter or the second priority parameter.

In an example, the first CSI report may comprise the inference result of the AI model.

In an example, the wireless device may determine a priority value of a third CSI report comprising the one-shot performance indicator of the AI model, using:

the first priority parameter; or the second priority parameter.

In an example, the wireless device may determine, for the third CSI report, a third value of the first priority parameter, wherein the third value of the first priority parameter is greater than the first value of the first priority parameter.

In an example, the wireless device may determine, for the third CSI report, a third value of the second priority parameter, wherein the third value of the second priority parameter is greater than the first value of the second priority parameter.

In an example, the wireless device may transmit the first CSI report, based on the priority value of the first CSI report being smaller than the priority value of the third CSI report.

Example embodiments of the present disclosure enable the wireless device to determine a small priority value (e.g., corresponding to high priority) of a CSI report with importance (e.g., the first CSI report is more important than the third CSI report). The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

Figure 33:
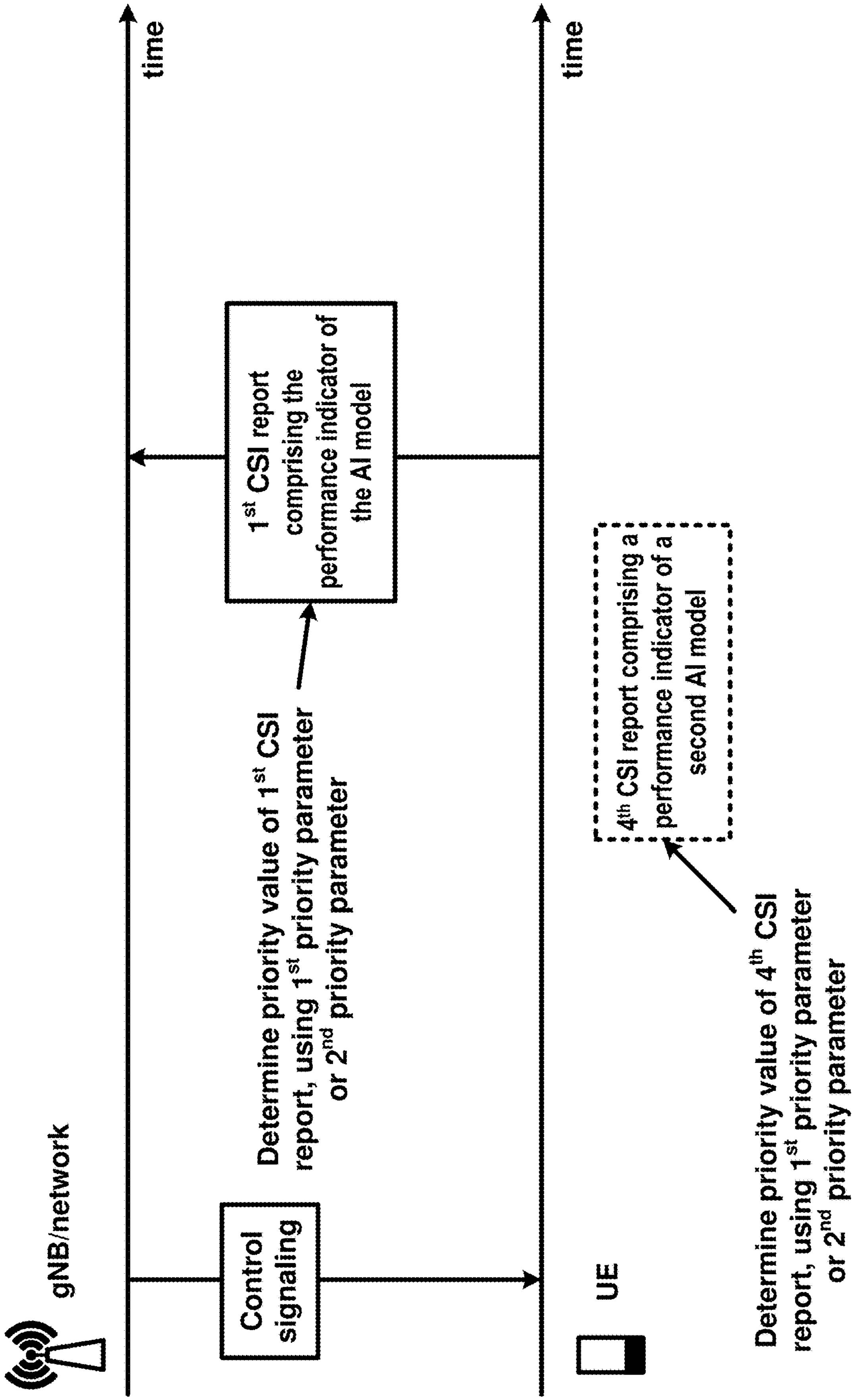
FIG. 33 illustrates an aspect of an example embodiment according to the present disclosure.

FIG. 33 illustrates an example of determination of a priority value as per an aspect of an embodiment of the present disclosure.

In an example, the wireless device (e.g., UE in FIG. 30) may receive, from the base station (e.g., gNB/network in FIG. 30), control signaling (e.g., a DCI or an RRC message) indicating the first CSI report. Transmission of the first CSI report and transmission of a fourth CSI report may overlap in the time domain. The first CSI report may comprise the beam predication accuracy (e.g., a performance indicator or a statistical performance indicator) of the AI model. The report quantity carried by the first CSI report may comprise (e.g., be) the beam prediction accuracy for the performance monitoring of the AI model. The wireless device may determine the priority value of the first CSI report, using the first priority parameter or the second priority parameter.

In an example, the first CSI report may comprise a performance indicator of the AI model.

In an example, the wireless device may determine a priority value of a fourth CSI report comprising a performance indicator of a second AI model, using:

the first priority parameter; or the second priority parameter.

In an example, the wireless device may determine, for the fourth CSI report, a fourth value of the first priority parameter, wherein the fourth value of the first priority parameter is greater than the first value of the first priority parameter.

In an example, the wireless device may determine, for the fourth CSI report, a fourth value of the second priority parameter, wherein the fourth value of the second priority parameter is greater than the first value of the second priority parameter.

In an example, the wireless device may transmit the first CSI report, based on the priority value of the first CSI report being smaller than the priority value of the fourth CSI report.

In an example, the AI model may be a model (e.g., AI model) for:

spatial domain beam prediction; or beam failure prediction.

In an example, the second AI model may be a model (e.g., AI model) for:

time domain beam prediction; or

CSI compression.

Example embodiments of the present disclosure enable the wireless device to determine a small priority value (e.g., corresponding to high priority) of a CSI report with importance (e.g., the first CSI report is more important than the fourth CSI report). The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

Figure 34:
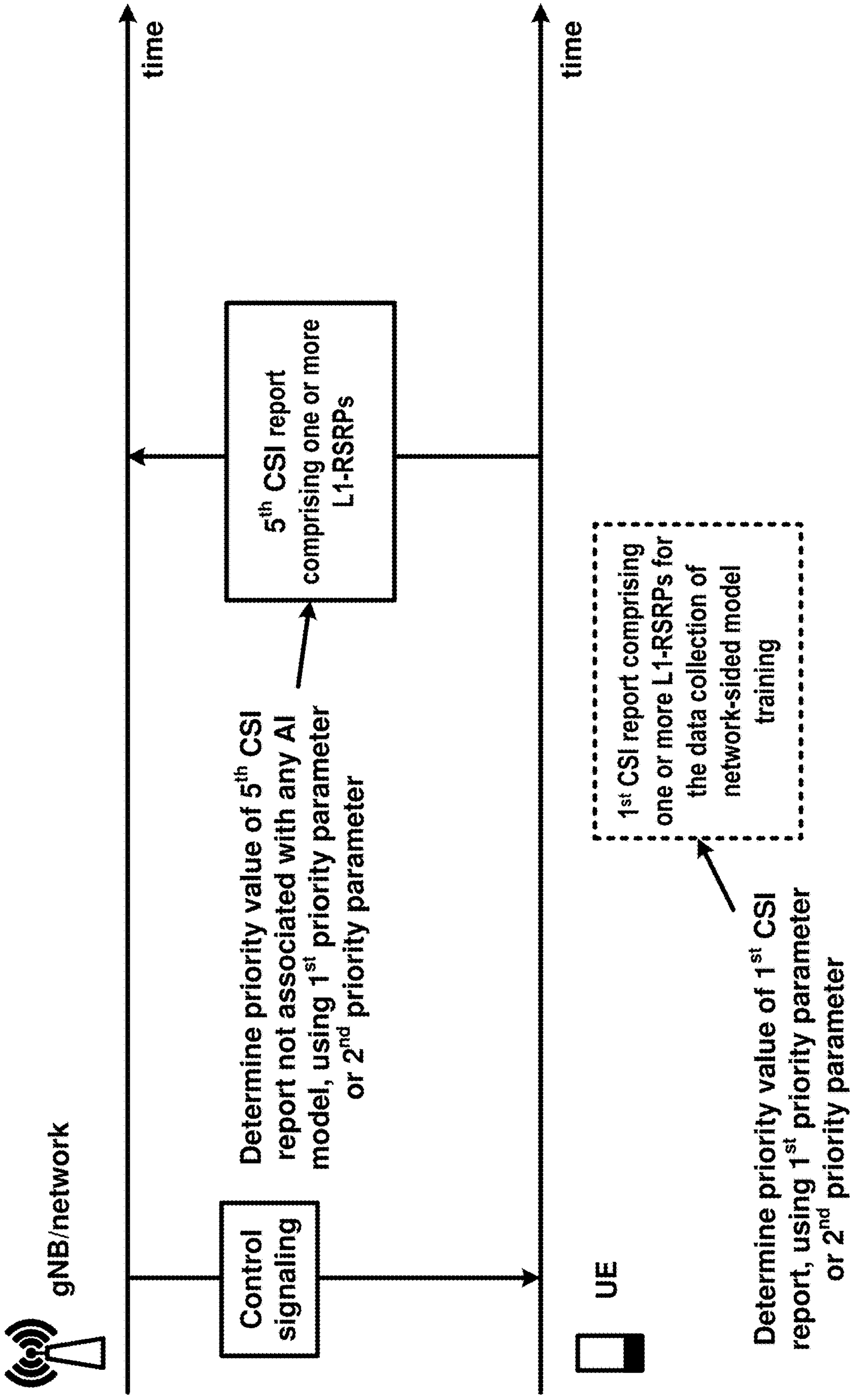
FIG. 34 illustrates an aspect of an example embodiment according to the present disclosure.

FIG. 34 illustrates an example of determination of a priority value as per an aspect of an embodiment of the present disclosure.

In an example, the wireless device (e.g., UE in FIG. 34) may receive, from the base station (e.g., gNB/network in FIG. 34), control signaling (e.g., a DCI or an RRC message) indicating the first CSI report. Transmission of the first CSI report and transmission of a fifth CSI report may overlap in the time domain.

In an example, the first CSI report may comprise one or more L1-RSRPs for the data collection of network-sided model training.

In an example, a fifth CSI report may comprise one or more L1-RSRPs (e.g., for beam management), wherein the first CSI report is not associated with any AI model.

In an example, the wireless device may determine a priority value of a fifth CSI report comprising, using:

the first priority parameter; or the second priority parameter.

In an example, the wireless device may determine, for the fifth CSI report, a fifth value of the first priority parameter, wherein the fifth value of the first priority parameter is smaller than the first value of the first priority parameter.

In an example, the wireless device may determine, for the fifth CSI report, a fifth value of the second priority parameter, wherein the fifth value of the second priority parameter is smaller than the first value of the second priority parameter.

In an example, the wireless device may transmit the fifth CSI report, based on the priority value of the fifth CSI report being smaller than the priority value of the first CSI report.

Example embodiments of the present disclosure enable the wireless device to determine a small priority value (e.g., corresponding to high priority) of a CSI report with importance. The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

In an example, the one or more configuration parameters may further indicate a first threshold value for the performance monitoring of the AI model.

In an example, the wireless device may decrement, in response to a performance indicator of the AI model being less than (or higher than) the first threshold value, the priority value of the CSI report by a positive number (e.g., 1).

In an example, the wireless device may decrement, for the CSI report and in response to a performance indicator of the AI model being less than (or higher than) the first threshold value, a value of the first priority parameter by a positive number (e.g., 1).

In an example, the wireless device may decrement, for the CSI report and in response to a performance indicator of the AI model being less than (or higher than) the first threshold value, a value of the second priority parameter by a positive number (e.g., 1).

In an example, the wireless device may determine, for determining the priority value of the CSI report and in response to a performance indicator of the AI model being less than (or higher than) the first threshold value, a value of the third priority parameter being 0.

Example embodiments of the present disclosure enable the wireless device to determine a small priority value (e.g., corresponding to high priority) of a CSI report with importance (e.g., the CSI report carries a potential failure information of the AI model). The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

In an example, the first CSI report may comprise (e.g., carry) a plurality of report quantities.

For example, the plurality of report quantities may comprise (or the first CSI report may carry):

a performance indicator of the AI model; and an inference result of the AI model.

In an example, the wireless device may determine the priority value of the first CSI report, based on a lowest priority value among a plurality of priority values associated with (e.g., of) the plurality of report quantities.

In an example, the wireless device may determine, for the first CSI report, a value of the first priority parameter being equal to a lowest value among a plurality of values, of the first priority parameter, associated with (e.g., of) the plurality of report quantities.

In an example, the wireless device may determine, for the first CSI report, a value of the second priority parameter being equal to a lowest value among a plurality of values, of the second priority parameter, associated with (e.g., of) the plurality of report quantities.

Example embodiments of the present disclosure enable the wireless device to determine a small priority value (e.g., corresponding to high priority) of a CSI report with importance (e.g., the CSI report carries multiple report quantities). The wireless device may not discard processing the CSI report or not drop transmitting of the CSI report. The base station may receive, via the CSI report, important reporting on inference results, performance monitoring results, or measurements for beam management. The implementation of the existing technologies prevents decreased resource efficiency, increased latency, increased interference, and increased power consumption.

What is claimed is:

1. A wireless device comprising:

one or more processors; and memory storing instructions that, when executed by the one or more processors, cause the wireless device to:

receive, from a base station, a radio resource control (RRC) message comprising one or more configuration parameters for a first channel state information (CSI) report, wherein the one or more configuration parameters comprise:

a first configuration parameter indicating the first CSI report being initiated by the wireless device; and a second configuration parameter indicating that a report quantity of the first CSI report is a predicted layer 1 reference signal received power (L1-RSRP), wherein the predicted L1-RSRP is determined using an artificial intelligence (AI) model;

determine a priority value of the first CSI report, using:
a first parameter having a value of zero based on the first CSI report being initiated by the wireless device;
a second parameter associated with the report quantity, wherein the second parameter has a value of zero based on the first CSI report comprising the predicted L1-RSRP;
a third parameter that is an index of a serving cell; and
a fourth parameter that is a configuration identifier of the first CSI report; and
transmit, to the base station, the first CSI report based on:
the priority value being smaller than a second priority value of a second CSI report; and
a transmission, via a first resource, of the first CSI report overlapping in time with a transmission, via a second resource, of the second CSI report.

2. The wireless device of claim 1, wherein the instructions further cause the wireless device to determine to initiate the first CSI report based on an event.

3. The wireless device of claim 1, wherein the first parameter has a value greater than zero based on the first CSI report being one of:
a semi-persistent CSI report; or
a periodic CSI report.

4. The wireless device of claim 1, wherein the one or more configuration parameters indicate:
resources for a plurality of first reference signals (RSs); and
resources for a plurality of second RSs.

5. The wireless device of claim 1, wherein the predicted L1-RSRP is associated with an inference result, of the AI model, based on one or more measurements on a plurality of reference signals (RSs).

6. The wireless device of claim 1, wherein the instructions further cause the wireless device to determine, by inference of the AI model and using one or more measurements of a plurality of reference signals (RSS) as inputs, the predicted L1-RSRP.

7. The wireless device of claim 1, wherein the second parameter has a value of one based on the first CSI report comprising a first report quantity other than the predicted L1-RSRP.

8. The wireless device of claim 7, wherein the first report quantity comprises at least one of:
a channel quality indicator (CQI);
a precoding matrix indicator (PMI);
a CSI reference signal (CSI-RS) resource indicator (CRI);
a synchronization signal physical broadcast channel (SS/PBCH) block resource indicator (SSBRI);
a layer indicator (LI); or
a rank indicator (RI).

9. The wireless device of claim 1, wherein the second parameter has a value of zero based on the first CSI report comprising at least one of:
an L1-RSRP; or
an L1 signal to interference plus noise ratio (L1-SINR).

10. The wireless device of claim 9, wherein:
the L1-RSRP comprises at least one of:
a measured L1-RSRP;
a predicted L1-RSRP; or
an RSRP difference; and
the L1-SINR comprises at least one of:
a measured L1-SINR;
a predicted L1-SINR; or
an SINR difference.

11. A method comprising:
receiving, by a wireless device from a base station, a radio resource control (RRC) message comprising one or more configuration parameters for a first channel state information (CSI) report, wherein the one or more configuration parameters comprise:
a first configuration parameter indicating the first CSI report being initiated by the wireless device; and
a second configuration parameter indicating that a report quantity of the first CSI report is a predicted layer 1 reference signal received power (L1-RSRP), wherein the predicted L1-RSRP is determined using an artificial intelligence (AI) model;
determining a priority value of the first CSI report, using:
a first parameter having a value of zero based on the first CSI report being initiated by the wireless device;
a second parameter associated with the report quantity, wherein the second parameter has a value of zero based on the first CSI report comprising the predicted L1-RSRP;
a third parameter that is an index of a serving cell; and
a fourth parameter that is a configuration identifier of the first CSI report; and
transmitting, to the base station, the first CSI report, wherein the transmitting is based on:
the priority value being smaller than a second priority value of a second CSI report; and
a transmission, via a first resource, of the first CSI report overlapping in time with a transmission, via a second resource, of the second CSI report.

12. The method of claim 11, further comprising determining to initiate the first CSI report based on an event.

13. The method of claim 11, wherein the first parameter has a value greater than zero based on the first CSI report being one of:
a semi-persistent CSI report; or
a periodic CSI report.

14. The method of claim 11, wherein the one or more configuration parameters indicate:
resources for a plurality of first reference signals (RSs); and
resources for a plurality of second RSs.

15. The method of claim 11, wherein the predicted L1-RSRP is associated with an inference result, of the AI model, based on one or more measurements on a plurality of reference signals (RSs).

16. The method of claim 11, further comprising determining, by inference of the AI model and using one or more measurements of a plurality of reference signals (RSS) as inputs, the predicted L1-RSRP.

17. The method of claim 11, wherein the second parameter has a value of one based on the first CSI report comprising a first report quantity other than the predicted L1-RSRP.

18. The method of claim 17, wherein the first report quantity comprises at least one of:
a channel quality indicator (CQI);
a precoding matrix indicator (PMI);
a CSI reference signal (CSI-RS) resource indicator (CRI);
a synchronization signal physical broadcast channel (SS/PBCH) block resource indicator (SSBRI);
a layer indicator (LI); or
a rank indicator (RI).

19. The method of claim 11, wherein the second parameter has a value of zero based on the first CSI report comprising at least one of:

an L1-RSRP; or an L1 signal to interference plus noise ratio (L1-SINR).

20. A non-transitory computer-readable medium comprising instructions that, when executed by one or more processors of a wireless device, cause the wireless device to:

receive, from a base station, a radio resource control (RRC) message comprising one or more configuration parameters for a first channel state information (CSI) report, wherein the one or more configuration parameters comprise:

a first configuration parameter indicating the first CSI report being initiated by the wireless device; and a second configuration parameter indicating that a report quantity of the first CSI report is a predicted layer 1 reference signal received power (L1-RSRP), wherein the predicted L1-RSRP is determined using an artificial intelligence (AI) model;

determine a priority value of the first CSI report, using:

a first parameter having a value of zero based on the first CSI report being initiated by the wireless device;

a second parameter associated with the report quantity, wherein the second parameter has a value of zero based on the first CSI report comprising the predicted L1-RSRP;

a third parameter that is an index of a serving cell; and a fourth parameter that is a configuration identifier of the first CSI report; and transmit, to the base station, the first CSI report based on:

the priority value being smaller than a second priority value of a second CSI report; and a transmission, via a first resource, of the first CSI report overlapping in time with a transmission, via a second resource, of the second CSI report.

* * * * *